(12) United States Patent
Nikitin

(10) Patent No.: US 10,666,138 B2
(45) Date of Patent: *May 26, 2020

(54) APPARATUS FOR CONTROLLING SWITCHING POWER SUPPLIES

(71) Applicant: Avatekh, Inc., Lawrence, KS (US)

(72) Inventor: Alexei V. Nikitin, Manhattan, KS (US)

(73) Assignee: Avatekh, Inc., Lawrence, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,246

(22) Filed: Dec. 10, 2018

(65) Prior Publication Data

US 2019/0123643 A1 Apr. 25, 2019

Related U.S. Application Data

(60) Continuation of application No. 15/258,573, filed on Sep. 7, 2016, now Pat. No. 10,153,694, which is a continuation of application No. 14/800,006, filed on Jul. 15, 2015, now Pat. No. 9,467,046, which is a division of application No. 14/333,373, filed on Jul. 16, 2014, now Pat. No. 9,130,455.

(60) Provisional application No. 62/003,119, filed on May 27, 2014, provisional application No. 61/952,408, filed on Mar. 13, 2014, provisional application No. 61/925,515, filed on Jan. 9, 2014, provisional application No. 61/847,424, filed on Jul. 17, 2013.

(51) Int. Cl.
| | |
|---|---|
| *H02M 3/156* | (2006.01) |
| *H02M 3/157* | (2006.01) |
| *H02M 1/08* | (2006.01) |
| H02M 3/158 | (2006.01) |
| H02M 1/00 | (2006.01) |

(52) U.S. Cl.
CPC ............. *H02M 3/156* (2013.01); *H02M 1/08* (2013.01); *H02M 3/157* (2013.01); *H02M 3/1582* (2013.01); *H02M 3/1588* (2013.01); *H02M 2001/0009* (2013.01); *H02M 2001/0025* (2013.01); *Y02B 70/1466* (2013.01)

(58) Field of Classification Search
None
See application file for complete search history.

(56) References Cited

U.S. PATENT DOCUMENTS

| | | | |
|---|---|---|---|
| 2005/0206359 A1* | 9/2005 | Daniels | ................ H02H 7/1213 323/282 |
| 2007/0108953 A1 | 5/2007 | Latham | |
| 2013/0033248 A1 | 2/2013 | Granger | |

(Continued)

OTHER PUBLICATIONS

Ken Marasco, How to Apply DC-to-DC Step-Up (Boost) Regulators—Analog Devices, Application Note AN-1132, Rev. O, www.analog.com.

(Continued)

*Primary Examiner* — Jeffrey A Gblende
(74) *Attorney, Agent, or Firm* — Erickson Kernell IP, LLC

(57) ABSTRACT

A switching converter includes a power stage that receives an input voltage for converting it into an output voltage and provides a load current to a load operably coupled to the power stage. The power stage includes a switch providing a switching voltage and a controller comprising an integrator and a comparator with hysteresis and configured to regulate the output voltage to a level proportional to a reference voltage by controlling the switching voltage.

12 Claims, 49 Drawing Sheets

(56) References Cited

U.S. PATENT DOCUMENTS

2013/0043852 A1* 2/2013 Marsili ............ H02M 3/157 323/283
2014/0265929 A1 9/2014 Gossehelweg et al.

OTHER PUBLICATIONS

W.H. Lei & T.K. Man, A General Approach for Optimizing Dynamic Response for Buck Converter—ON Semiconductor, AND8143-O, Jan. 2011, Rev. 1, http://onsemi.com.

Ken Marasco, How to Apply DC-to-DC Step-Up (Boost) Regulators Successfully—Analog Dialogue 45-09 Back Burner, Sep. 2011, www.analog.com/analogdialogue.

Yao Yao, Fidegnon Fassinou, Yingshu Hu, Stability and Robust Regulation of Battery Driven Boost Converter with Simple Feedback—2011 American Control Conference, Jun. 29-Jul. 1, 2011.

Ken Marasco, How to Apply DC-to-DC Step-Up (Boost) Regulators Successfully—Analog Dialogue 45-12 Back Burner, Dec. 2011, www.analog.com/analogdialogue.

Frank De Stasi, Mathew Jacob, Magnetic Buck Converters for Portable Applications—National Semiconductor Corporation (2003).

Ken Marasco, How to Apply DC-to-DC Step-Up (Boost) Regulators Successfully—Analog Dialogue 45-06 Back Burner, Jun. 2011, www.analog.com/analogdialogue.

Muhammad Saad Rahman, Buck Converter Design Issues—Master Thesis No. LITH-ISY-EX-06/3854-SE, Linkoping Institute of Technology, Jul. 17, 2007.

R.D. Middlebrook & Slobodan Cuk, A General United Approach to Modelling Switching-Converter Power Stages—IEEE Power Electronics Specialists Conference, Jun. 8, 1976, Cleveland OH.

Liping Guo, Design and Implementation of Digital Controllers for Buck and Boost Converters Using Linear and Nonlinear Control Methods—Thesis, Auburn, AL Aug. 7, 2006.

Sanjaya Maniktala, Voltage-Mode, Current-Mode (and Hysteretic Control)—Microsemi Technical Note TN-203, Rev. 6 (Nov. 2012).

ON Semiconductor, Linear & Switching Voltage Regulator Handbook—Rev. 4, Feb. 2002 (HB206/D), http://onsemi.com.

Herbertt Sira-Ramirez & Marija Ilic-Spong, Exact Linearization in Switched-Mode DC-to-DC Power Converters—Int. J. Control, 1989 vol. 50, No. 2,511-524, Taylor & Francis Ltd.

Eric David Meyer, New Technologies to Improve the Transient Response of Buck Converters—Thesis, Queen's University, Kingston, Ontario, Canada, Jan. 2010.

Muhammad H. Rashid (Editor), Power Electronics Handbook, Devices, Circuits and Applications, Third Edition 2011, Butterworth-Heinemann.

Dongbing Zhang, AN-1484 Designing a SEPIC Converter, Application Report, SNVA168E, May 2006, Rev. Apr. 2013, Texas Instruments, www.ti.com.

Everett Rogers, Understanding Buck Power Stages in Switchmore Power Supplies, SLVA057, Mar. 1999, Texas Instruments.

(Author unknown), Power Management, Chapter 9, pp. 9.1-9.96.

* cited by examiner

Equivalent SCC $V_{in}$, $V_0$, and $V^\star$ voltages for $V_{ref} = V_0$

Schmitt trigger input for $V_{ref} = V_0$ $V_{in}$, $V_0$, and $V^\star$ voltages for $V_{ref} = V_0[1+4\pi \sin\left(2\pi \frac{V_0}{T\Delta h} t\right)]$ Schmitt trigger input for $V_{ref} = V_0[1+4\pi \sin\left(2\pi \frac{V_0}{T\Delta h} t\right)]$ $V_{in}$, $V_0$, and $V^\star$ voltages for $V_{ref} = V_0$ Schmitt trigger input for $V_{ref} = V_0$ $V_{in}$, $V_0$, and $V^\star$ voltages for $V_{ref} = V_0\{1+5\,\text{sgn}[\sin(\frac{2\pi V_0}{T\Delta h}t)]\}$ Schmitt trigger input for $V_{ref} = V_0\{1+5\,\text{sgn}[\sin(\frac{2\pi V_0}{T\Delta h}t)]\}$

STEP-DOWN (buck)
Switched-Mode Voltage Follower (SMVF)

STEP-DOWN (buck)
Switched-Mode Voltage Follower (SMVF)

APPARATUS FOR CONTROLLING SWITCHING POWER SUPPLIES

CROSS REFERENCES TO RELATED APPLICATIONS

This application is a continuation of the U.S. patent application Ser. No. 15/258,573, filed on 7 Sep. 2016, which is a continuation of application Ser. No. 14/800,006 (now U.S. Pat. No. 9,467,046), filed on 15 Jul. 2015, which is a division of application Ser. No. 14/333,373 (now U.S. Pat. No. 9,130,455), filed on 16 Jul. 2014. This application also claims the benefit of the U.S. provisional patent applications 61/847,424 filed on 17 Jul. 2013, 61/925,515 filed on 9 Jan. 2014, 61/952,408 filed on 13 Mar. 2014, and 62/003,119 filed on 27 May 2014.

STATEMENT REGARDING FEDERALLY SPONSORED RESEARCH OR DEVELOPMENT

None.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to nonlinear and time-variant signal processing, and, in particular, to methods and apparatus for adaptive filtering and control applicable to switched mode power regulators. This invention also relates to methods and corresponding apparatus for mitigation of electromagnetic interference, and further relates to improving properties of electronic devices and to improving electromagnetic compatibility and/or enabling coexistence of a plurality of electronic devices.

BACKGROUND

A switched-mode power supply (SMPS) is typically chosen for an application when its weight, efficiency, size, or wide input range tolerance make it preferable to linear power supplies, and thus SMPSs are ubiquitous in consumer electronics, laboratory and medical equipment, scientific instruments, land, air (including the unmanned aerial vehicles (UAVs)), space, and naval vehicles, LED lighting, and central power distribution systems. Many of the SMPS markets are extremely high-volume (for example, tens of billions of units for portable low-power applications alone) and thus are very cost-sensitive, and the demands for both power efficiency requirements and cuts in the bill of materials (BOM) drive the use of the SMPSs and converters instead of linear power supplies.

An SMPS composed of ideal elements dissipates no power, and may also be substantially smaller and lighter than a respective linear supply. While having great advantages over linear regulators in efficiency, weight, size, and wide input range tolerance, switched-mode power supplies and converters, however, face a number of challenges that increase their complexity and cost, reduce reliability, complicate regulation, and limit their use in noise-sensitive applications.

An SMPS may be viewed as an electronic power supply ("converter") that incorporates an active switch ("power switch") that regulates either output voltage, or current, or power by switching storage elements, like inductors and capacitors, among different electrical configurations. The desired relation between the input (source) and the output of the supply may then be achieved by controlling the duration of the time intervals during which the switch is in its different positions.

In particular, a basic SMPS [6, 9, 12] may be viewed as an electronic power supply that incorporates a two-position power switch (e.g. a single pole double-throw switch (SPDT)) that alternates between positions 1 and 2 and regulates either output voltage or current by switching storage elements, like inductors and capacitors, between two different electrical configurations. The desired relation between the input (source) and the output of an SMPS may then be achieved by controlling the duration of the time intervals during which the switch is in position 1 or 2.

Let us denote the time instances at which the switch makes the transition from position 2 ("down") to 1 ("up") as "even" instances, and denote them as $t_{2i}$, where i is an integer. Respectively, the time instances at which the switch makes the transition from position 1 ("up") to 2 ("down") would be "odd" instances, and may be denoted as $t_{2i+1}$. Then the "up" (switch position 1) and "down" (switch position 2) time intervals may be expressed as $\Delta t_{2i} = t_{2i+1} - t_{2i}$ ("even") and $\Delta t_{2i+1} = t_{2(i+1)} - t_{2i+1}$ ("odd"), respectively. For convenience, we may denote an ith full switching interval $\Delta t_{2i} + \Delta t_{2i+1}$ as $\Delta T_i$, and may further define the respective "duty cycle" $D_i$ as $$D_i = \frac{\Delta t_{2i}}{\Delta t_{2i} + \Delta t_{2i+1}} = \frac{\Delta t_{2i}}{\Delta T_i}. \tag{1}$$

The switch may be controlled by a two-level switch control signal such that one level of the control signal (e.g., the upper level) puts the switch in position 1, and the other level (e.g., the lower level) puts the switch in position 2. It may be shown that a properly defined duty cycle of the control signal would be equal to the duty cycle of the switch.

For example, for a "desired" (ideal) switching voltage regulator, the relation between the output voltage $V_{out}(t)$ and a constant input (source) voltage $V_{in}(t) = V_{in} = \text{const}$, for a time-invariant (constant) load in a steady state such that $\Delta T_i = \Delta T = \text{const}$ and $D_i = D = \text{const}$, may be expressed as $$\langle V_{out}(t) \rangle_{\Delta T_i} = f(D_i) V_{in}, \tag{2}$$

where $f(D_i)$ is a known function of the duty cycle $D_i$, and the angular brackets denote the time averaging over a full switching interval. In words, for every full switching interval, the average output voltage of an ideal switching voltage regulator would be proportional to the source voltage, and the coefficient of proportionality would be a known function of the duty cycle of this interval.

FIG. 1 provides examples of such basic SMPS topologies (buck, boost, and buck-boost). For these topologies, $f(D_i)$ in equation (2) would be equal to $D_i$ for a buck (step-down) regulator, to $D_i^{-1}$ for a boost (step-up) regulator, and to $D_i/(1-D_i)$ for a buck-boost.

One may notice that the voltage at the pole of the switch in FIG. 1 is denoted as $V^*(t)$. This voltage may be called a switching voltage, or a modulated voltage. Indeed, this voltage alternates between $V_{in}$ and zero in the buck converter (panel I), between $V_{out}$ and zero in the boost converter (panel II), and between $-V_{in}$ and $V_{out}$ in the buck-boost converter (panel III). Depending on a physical implementation of a switch (e.g., one of the throws of a switch may be a nonlinear component such as a diode), the values of the alternating voltages may differ from the "ideal" values. However, the voltage at the pole of a switch may still be called a switching voltage, or a modulated voltage.

One skilled in the art will recognize that the SMPS topologies shown in FIG. 1 may be varied in many ways, and that they provide a basis for constructing most of isolated and non-isolated SMPSs [6, 9, 12]. For example, by adding a second inductor, the Cuk [3] and SEPIC [11] converters may be implemented, or, by adding additional active switches, various bridge converters may be realized.

While equation (2) may hold for the average output voltage over a full switching period, the instantaneous value of the output voltage $V_{out}(t)$ may be pulsating or even "discontinuous" (e.g., for the boost and buck-boost converters in FIG. 1). However, most practical applications would require that the instantaneous value of the output voltage $V_{out}(t)$ does not significantly deviate from some desired (designed) output, for example, a constant DC voltage.

For the steady conditions outlined above, equation (2) may be rewritten as $$V_{out}(t)=f(D_i)V_{in}+\delta V(t), \quad (3)$$

where $\delta V(t)$ is a residual ("ripple") voltage that, for a given switching frequency, may be negligible for sufficiently large capacitance values in the topologies shown in FIG. 1, and/or a sufficiently large inductance value in the buck converter.

For example, the current supplied to the parallel RC circuits in the boost and buck-boost topologies in FIG. 1 would be discontinuous (zero during the "up" positions of the switch, and generally non-zero during the "down" positions). The current through the load resistance R, for a constant load, would be equal to this discontinuous current filtered with a 1st order lowpass filter having the time constant RC, and thus the output voltage would satisfy equation (3), and the residual (ripple) voltage may be negligible for sufficiently large values of RC.

In the buck topology, the LCR circuit forms a 2nd order lowpass filter which may convert the discontinuous supply voltage ($V_{in}$ during the "up" positions of the switch, and zero during the "down" positions) into a continuous output voltage that would satisfy equation (3). For zero capacitance, the remaining RL circuit would be a 1st order lowpass filter with the time constant L/R, and thus the output voltage would still satisfy equation (3).

In the buck topology, it may be convenient to refer to the LC sub-circuit of the total LCR circuit formed by the inductor, the capacitor, and the load as a "lowpass filter formed by the inductor and the capacitor". For light loads (i.e. $R \to \infty$), such an LC sub-circuit would be effectively equivalent to the total LCR circuit.

FIG. 2 provides an example of steady-state outputs of the basic idealized converters shown in FIG. 1, operating at a 50% duty cycle. One may see that these steady-state outputs may indeed satisfy equation (3).

For a constant duty cycle, a steady-state output of a converter would be proportional to the input voltage. For a time-variant input voltage, the output voltage of a converter would also be time-variant, but it will not be, in general, proportional to the input voltage. In addition, for a time-variant load $R=R(t)$ the output voltage would generally depend on the load resistance $R(t)$ and its time derivative $\dot{R}(t)$, and would be time-variant even for a constant load. A combined effect of the variability of the source voltage and the load may result in a significant deviation of the output from the desired steady-state conditions, as illustrated in FIG. 3. In the figure, the input voltage deviating from the average input voltage $V_0$ is shown in the upper panel, and the time-variant load resistance is shown in the middle panel. The lower panel shows the output voltages of the buck, boost, and buck-boost converters shown in FIG. 1, operating at a 50% duty cycle, and the respective "would-be" steady-state outputs (that is, the outputs for $V_{in}(t)=V_0$ and a constant load) are shown by the dashed lines. The switching frequency and the inductor and capacitor values are the same for all three converters.

Time variance of the output for time-variant input voltages and loads may be exacerbated by non-idealities of the components of an SMPS, such as finite switch conductances and/or voltage drops and/or switching times, equivalent series resistances of inductors and capacitors, parasitic inductances and capacitances of the components, and other non-idealities of components and non-linearities of their behavior (e.g. dependences of the component values on voltages and/or currents).

The output voltage may be regulated to be within a specified range in response to changes in the source voltage and/or the load current by adjusting the duty cycle to make the output voltage follow the desired (or "designed", or "reference") voltage $V_{ref}$. This would be typically done by, first, constructing a small signal model of the converter linearized around some chosen operating point. Then a compensator may be designed based on the small signal model.

Such a compensator, however, may not ensure adequate performance when the conditions change significantly from the design operating point, for example, due to wide-range and/or significantly rapid changes in the source voltage and/or the load conductance. Thus one of the main limitations of such regulation, contributing to its complexity and/or inadequate performance under certain conditions, may be viewed as arising from the fact that the regulation is performed by a single means (e.g., a change in the duty cycle), while the output voltage (for a given duty cycle) may depend on two independently varying signals, the source voltage and the load (their magnitude and/or time variance).

SUMMARY

The present invention overcomes the shortcomings of the prior art through the introduction of the switched-mode voltage mirror (SMVM) topologies for constructing switched-mode voltage regulators that may effectively address various SMPS limitations. An SMVM controller imposes a constraint on the switching (modulated) voltage (i.e., the voltage at the pole of the switch) in an SMPS in such a way that for a time-invariant load the output voltage of the SMPS may be effectively independent from the value and time variations in the input (source) voltage, and may be equal to the desired (reference) voltage. Then, to regulate the output voltage in response to dynamic changes in the load, only simple "derivative" compensation may need to be additionally performed to ensure the desired SMPS output.

Further, in an SMVM controller such a derivative compensation may be performed without obtaining a derivative of an output and/or other voltages in an SMPS. Also, an SMVM-based controller may not require measuring, calculating, or otherwise obtaining currents through the load and/or through the inductor or other components of an SMPS. In addition, the switching frequency and its spectral composition of an SMVM controller may be adjusted and/or controlled, in a wide range, effectively independent from other SMPS parameters.

The SMVM regulation topologies offer a wide range of technical and commercial advantages over the state-of-art SMPS solutions. In particular, the SMVM-based converters of the current invention may improve physical, commercial, and/or operational properties of switched-mode voltage regulators by providing various effective advantages that may include, but are not limited to, the following:

(i) high efficiency combined with control advantages; (ii) simplicity of construction and use, and low cost (e.g. low BOM and number of external components); (iii) wider choice for external components; (iv) no oscillator/clocking circuitry, simplified internal compensation, no startup circuits; (v) no additional dissipating elements such as current sensors; (vi) wider range of choice for L&C; (vii) unconditional stability with use of ultra-low ESR caps (i.e. no output ripples needed); (viii) same robust efficient compensation for various configurations/modes (e.g. for synchronous/continuous and/or asynchronous/discontinuous, and/or for Low Drop-Out and Extreme Down-Conversion ("Wide $V_{in}$")); (ix) no transient and/or startup overshoots/undershoots beyond ripple, for any load change; (x) wide range of $V_{in}/V_{out}$ and their differentials, output currents, switching frequencies; (xi) built-in Power Save Mode; (xii) fine continuous-manner control over switching frequency/spectrum, EMI/EMC, and ripples; (xiii) tolerance to wide range/fast line and load changes; (xiv) inherent rejection of line disturbances; (xv) enhanced yet simplified internal regulation for significantly and/or rapidly changing loads; (xvi) independence of regulation from operating point, and tolerance to L&C choices (e.g. same for heaviest and lightest/open circuit loads in full $V_{in}$ range, and for all switching frequencies); (xvii) no "minimum controllable ON time" limitation; (xviii) large acceptable tolerances and long-term drifts; (xix) robustness and stability.

Further scope and the applicability of the invention will be clarified through the detailed description given hereinafter. It should be understood, however, that the specific examples, while indicating preferred embodiments of the invention, are presented for illustration only. Various changes and modifications within the spirit and scope of the invention should become apparent to those skilled in the art from this detailed description. Furthermore, all the mathematical expressions, and the examples of hardware implementations are used only as a descriptive language to convey the inventive ideas clearly, and are not limitative of the claimed invention.

ABBREVIATIONS

Figure 1:
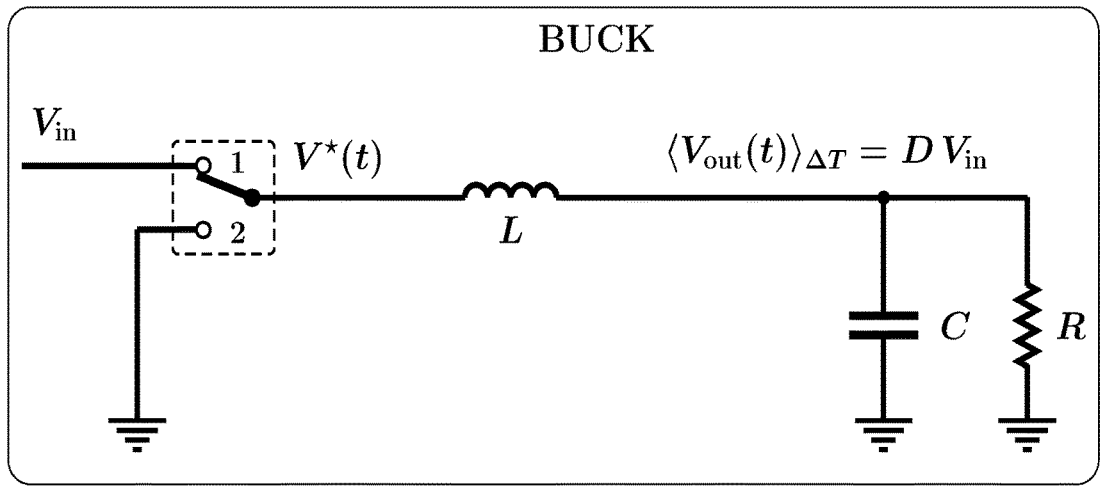
FIG. 1. Idealized basic SMPS topologies (boost, buck, and buck-boost).
Figure 1:
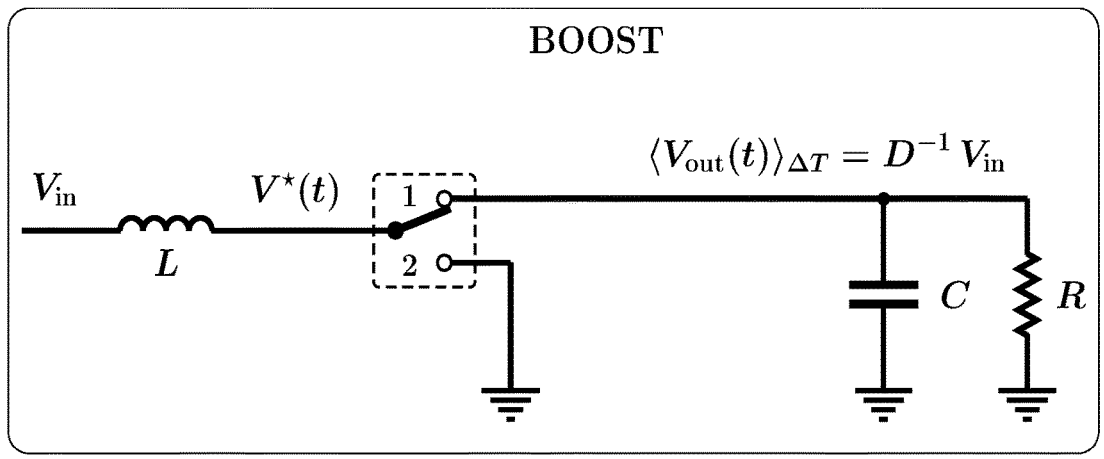
Figure 1:
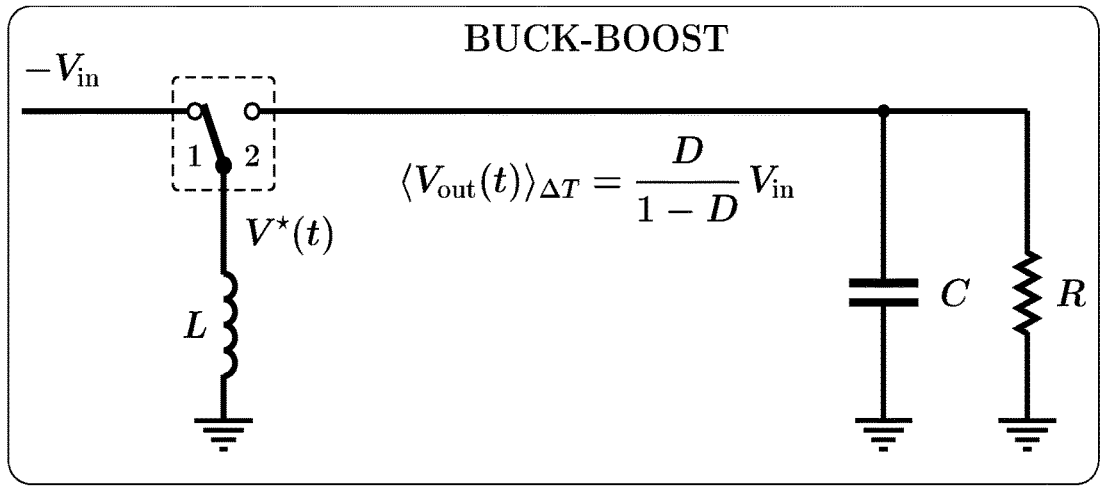
Figure 2:
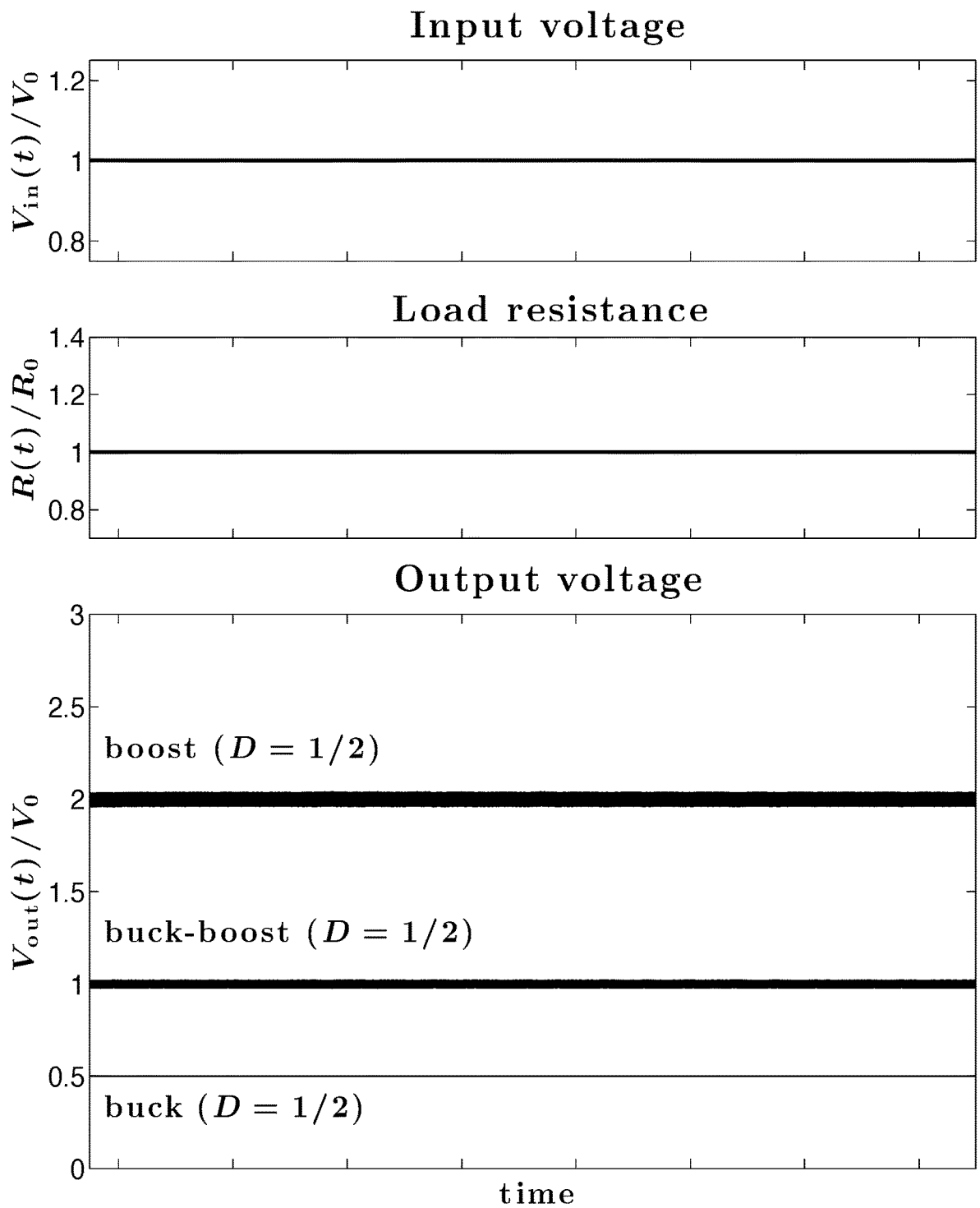
FIG. 2. Steady-state outputs of basic SMPSs.
Figure 3:
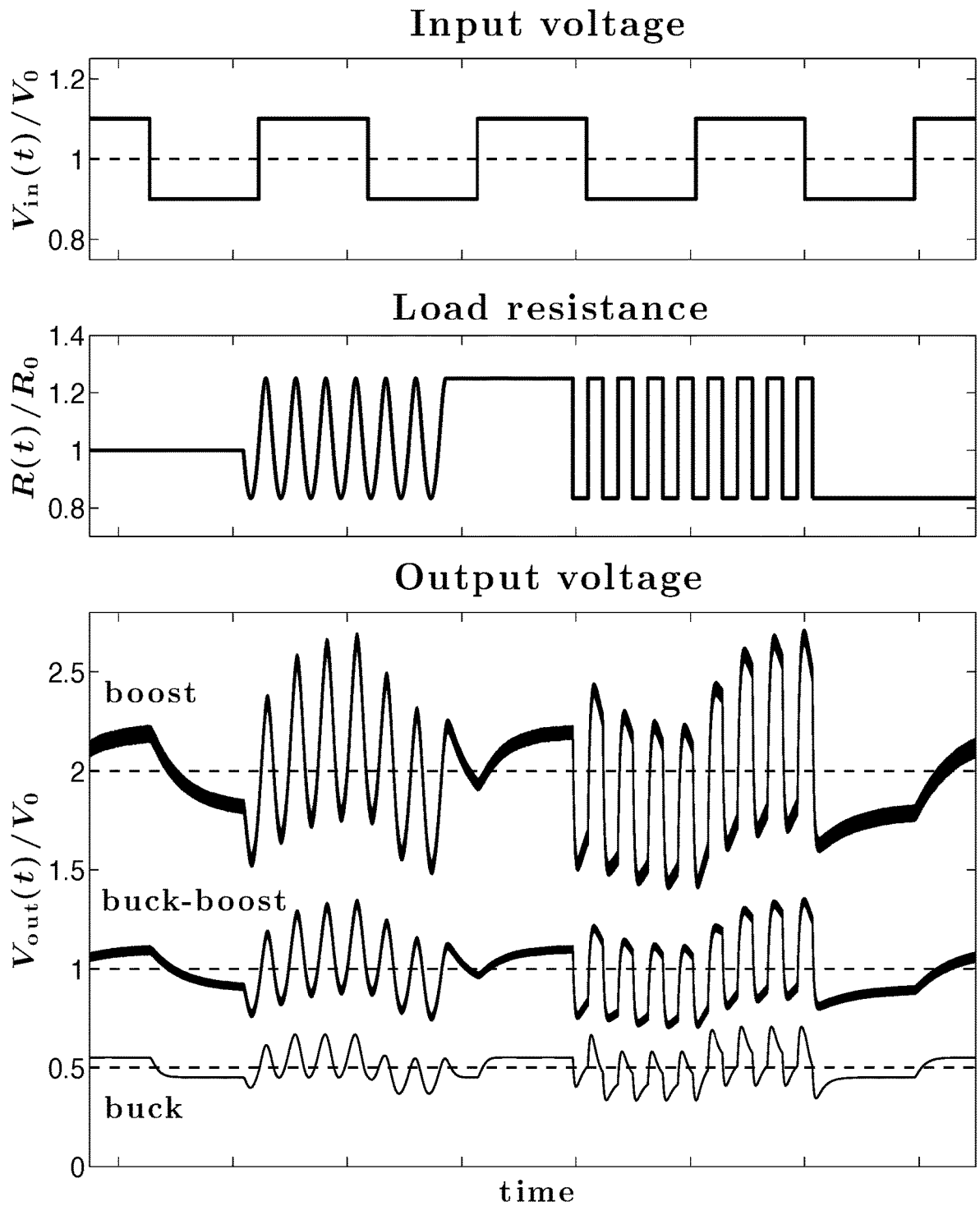
FIG. 3. Illustration of combined effect of variable load and variable input voltage on output voltage.

AC: alternating (current or voltage); A/D: Analog-to-Digital; ADC: Analog-to-Digital Converter (or Conversion); BCM: Boundary Conduction Mode; BOM: Bill Of Materials; CCM: Continuous Conduction Mode; CM: Common Mode; COT: Constant On Time; COTS: Commercial Off-The-Shelf;

DC: direct (current or voltage), or constant polarity (current or voltage); DCM: Discontinuous Conduction Mode; DCR: DC Resistance of an inductor; DM: Differential Mode; DSP: Digital Signal Processing/Processor;

EMC: electromagnetic compatibility; EMF: electromotive force; e.m.f.: electromotive force; EMI: electromagnetic interference; ESR: Equivalent Series Resistance;

FCS: Frequency Control Signal; FIR: Finite Impulse Response; FPGA: Field Programmable Gate Array;

IGBT: Insulated-Gate Bipolar Transistor; LCD: Liquid-Crystal Display; LDO: low-dropout regulator; LED: Light-Emitting Diode;

MATLAB: MATrix LABoratory (numerical computing environment and fourth-generation programming language developed by MathWorks); MOS: Metal-Oxide-Semiconductor; MOSFET: Metal Oxide Semiconductor Field-Effect Transistor; MTBF: Mean Time Between Failures;

NDL: Nonlinear Differential Limiter; PF: Power Factor; PFC: Power Factor Correction; PoL: Point-of-Load; PSD: Power Spectral Density; PSM: Power Save Mode; PSRR: Power-Supply Rejection Ratio; PWM: Pulse-Width Modulator;

RFI: Radio Frequency Interference; RMS: Root Mean Square;

SCC: Switch Control Circuit; SCS: Switch Control Signal; SEPIC: Single-Ended Primary-Inductor Converter; SiC: Silicon carbide; SMPS: Switched-Mode Power Supply; SMVF: Switched-Mode Voltage Follower; SMVM: Switched-Mode Voltage Mirror; SNR: Signal to Noise Ratio;

UAV: Unmanned Aerial Vehicle; ULISR: Ultra Linear Isolated Switching Rectifier; ULSR(U): Ultra Linear Switching Rectifier (Unit);

VN: Virtual Neutral; VRM: Voltage Regulator Module;

ZVS: Zero Voltage Switching; ZVT: Zero Voltage Transition;

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of components as suitable or preferred for a given purpose in connection with the invention implies that mixtures or combinations of any two or more members of the group or class may be equally suitable or preferred.

The detailed description of the invention is organized as follows.

Section 1 ("Outline description of an idealized concept of a switched-mode voltage mirror for a buck converter stage"), along with its subsections § 1.1 ("Non-ideal switch"), § 1.2 ("Switching frequency of basic SMVM-based buck converter"), and § 1.3 ("Controlling switching frequency of SMVM-based buck converters"), provides an outline description of an idealized concept of a switched-mode voltage mirror (SMVM) for regulation of a non-isolated buck (step-down) converter, discusses its "free-running" switching frequency, and control of the switching frequency by adding a periodic signal with a desired period.

Section 2 ("Basic principles of SMVM regulation"), along with its subsections § 2.1 ("Switch Control Circuit (SCC)") and § 2.2 ("Supplying additional control signals to an SCC") discusses basic principles of a switch control circuit (SCC) that may be used for SMVM regulation.

Section 3 ("Regulated SMVM-based buck converter") provides a specific example and description of a regulated SMVM-based buck converter, and § 3.1 ("Additional control of switching frequency/spectrum") discusses additional control of its switching spectrum.

Section 4 ("Simplified active compensation for time variability of the load"), along with its subsections § 4.1 ("Additional control of switching frequency/spectrum"), § 4.2 ("Asynchronous configuration"), § 4.3 ("Non-zero ESRs of components"), § 4.3.1 ("Compensation for inductor DCR"), and § 4.4 ("Example of implementation of an SMVM-based buck converter in an electronic circuit"), provides a description of particular SMVM controller embodiments along with discussion of additional regulation of the switching spectrum, asynchronous SMVM configurations, compensation for non-idealities of components, and an example of implementation of an SMVM-based buck converter in an electronic circuit.

Section 5 ("SMVM controllers for boost and buck-boost converters") discusses the adaptations of the SMVM regulation topologies for control of other types of switching DC/DC converters, such as boost and buck-boost converters.

Section 6 ("Synchronization of multiple SMVM-based converters among themselves or with other devices") describes a variety of synchronization modes that may be used to achieve desired timing relations among the switching voltages of multiple SMVM-based converters.

1 Outline Description of an Idealized Concept of a Switched-Mode Voltage Mirror for a Buck Converter Stage A particular detailed emphasis in this disclosure is initially placed on the regulation of a non-isolated buck (step-down) converter. Other converter types (such as boost and buck-boost) are addressed in Section 5.

The vast majority of applications may not require DC isolation between input and output voltages. For example, battery-based systems that do not use the AC power line would represent a major application for non-isolated converters. Point-of-Load (PoL) converters that draw input power from an isolated converter, such as a bus converter, may represent another widely used non-isolated application.

A non-isolated buck converter may be the most widely used converter topology in microprocessor voltage regulator modules (VRMs), in smartphones, tablets, digital cameras, navigation systems, medical equipment, and other low-power portable devices [10, 8]. Those applications typically require fast load and line transient responses and high efficiency over a wide load current range.

Let us assume that a switched-mode voltage regulator provides an output to a constant (or a sufficiently slowly varying) load in such a way that the output voltage approximates the desired output, with an addition of some residual (ripple) voltage that is sufficiently small and/or within specifications. When the input (source) voltage varies with time, $V_{in}=V_{in}(t)$, this may be achieved by appropriately controlling the positions of the power switch.

Let us now construct a switch control circuit that takes the switching voltage $V^*(t)$ and a reference voltage $V_{ref}(t)$ as two inputs, and outputs a switch control signal with the duty cycle $D_i$ such that $$D_i \approx f^{-1}\left[\frac{\langle V_{ref}(t)\rangle_{\Delta T_i}}{\langle V_{in}(t)\rangle_{\Delta T_i}}\right] \tag{4}$$

for a full switching interval. Such a circuit may further comprise a two-position switch ("control circuit switch") controlled by a feedback of the control signal, with the switching behavior effectively equivalent to the power switch. The control circuit switch would alternate between two different configurations of the control circuit that would "mirror", in terms of their input and output voltages, the essential voltage relations of the two electrical configurations of the power circuit. Then, the output of the regulator would "mirror" the reference voltage, $$\langle V_{out}(t)\rangle_{\Delta T_i} \approx \langle V_{ref}(t)\rangle_{\Delta T_i}, \tag{5}$$

as the average values of the output $V_{out}(t)$ and the reference $V_{ref}(t)$ would be approximately equal to each other for a full switching interval.

To illustrate this concept, let us further introduce the modulating signals $Q(t)$ and $\tilde{Q}(t)=1-Q(t)$ corresponding to the behavior of the switch, where $Q(t)$ may be expressed as $$Q(t) = \sum_{all\ i}[\theta(t-t_{2i}) - \theta(t-t_{2i+1})], \tag{6}$$

and where $\theta(x)$ is the Heaviside unit step function [2]. When $Q(t)=1$, the switch is in position "1", and when $Q(t)=0$, the switch is in position "2".

Figure 4:
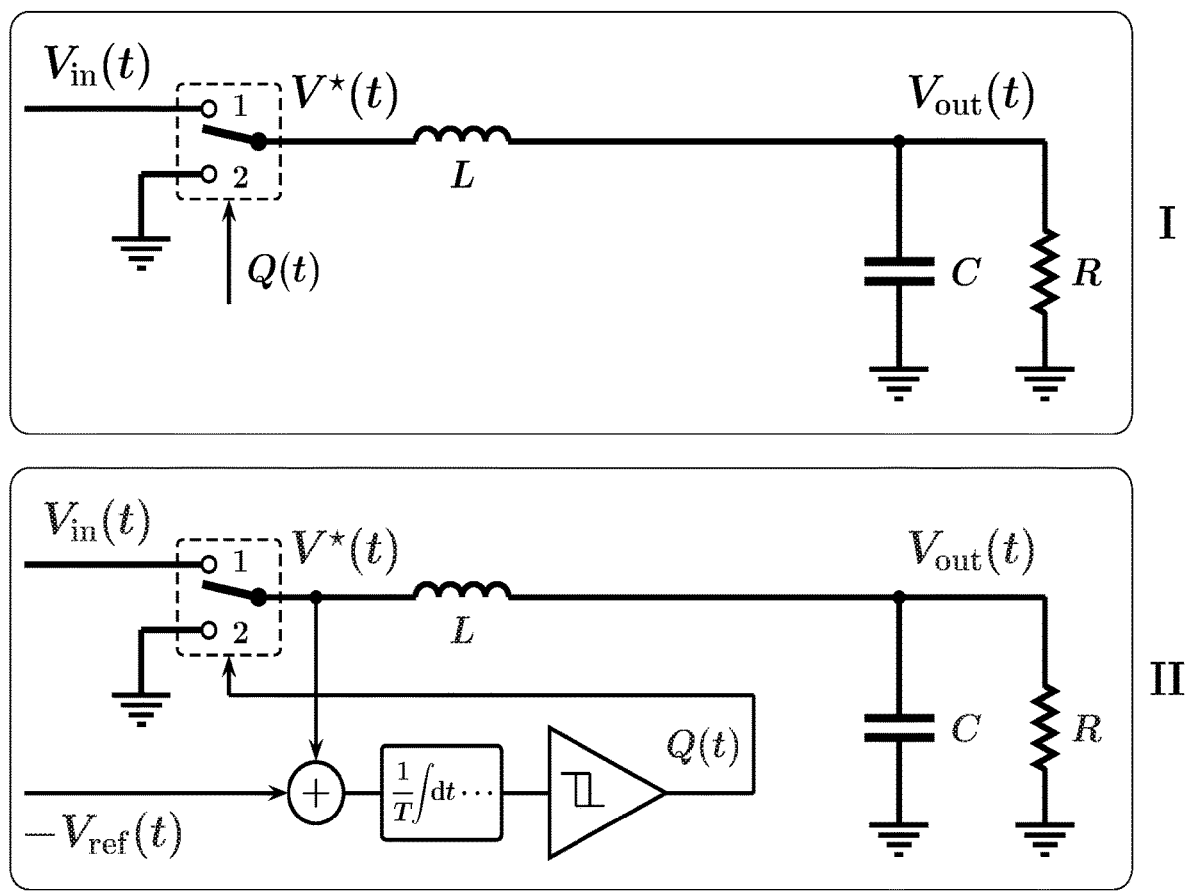
FIG. 4. Panel I: A step-down (buck) stage wherein the switch is controlled by a modulating (control) signal Q(t). Panel II: A step-down (buck) stage wherein the modulating signal Q(t) is provided by a reference (switch control) circuit comprising an integrator followed by a comparator with hysteresis (a Schmitt trigger).

Let us now consider a converter comprising a step-down (buck) stage schematically shown in the upper panel (panel I) of FIG. 4. For this topology, the voltage across the inductor may be related to the inductor current $I(t)$ as follows:

$$\int_{t_{2i}}^{t_{2(j+1)}} dt[V_{in}(t)Q(t) - V_{out}(t)] = L[I(t_{2(j+1)}) - I(t_{2i})], \tag{7}$$

where $j \geq i$, and $I(t_{2i})$ and $I(t_{2(j+1)})$ are the inductor current at the beginning of the first and at the end of the last full switching intervals, respectively.

Let us now construct a reference (switch control) circuit for this topology such that the following condition is satisfied:

$$\int_{t_{2i}}^{t_{2(i+1)}} dt[V_{in}(t)Q(t)-V_{ref}(t)]=0, \quad (8)$$

where $V_{ref}(t)$ is a reference voltage. Such a reference circuit may be constructed as schematically shown in the lower panel (panel II) of FIG. 4, where an integrated difference between the input and the reference signals is an input to a comparator with hysteresis (a Schmitt trigger) outputting the switch control signal Q(t).

Figure 5:
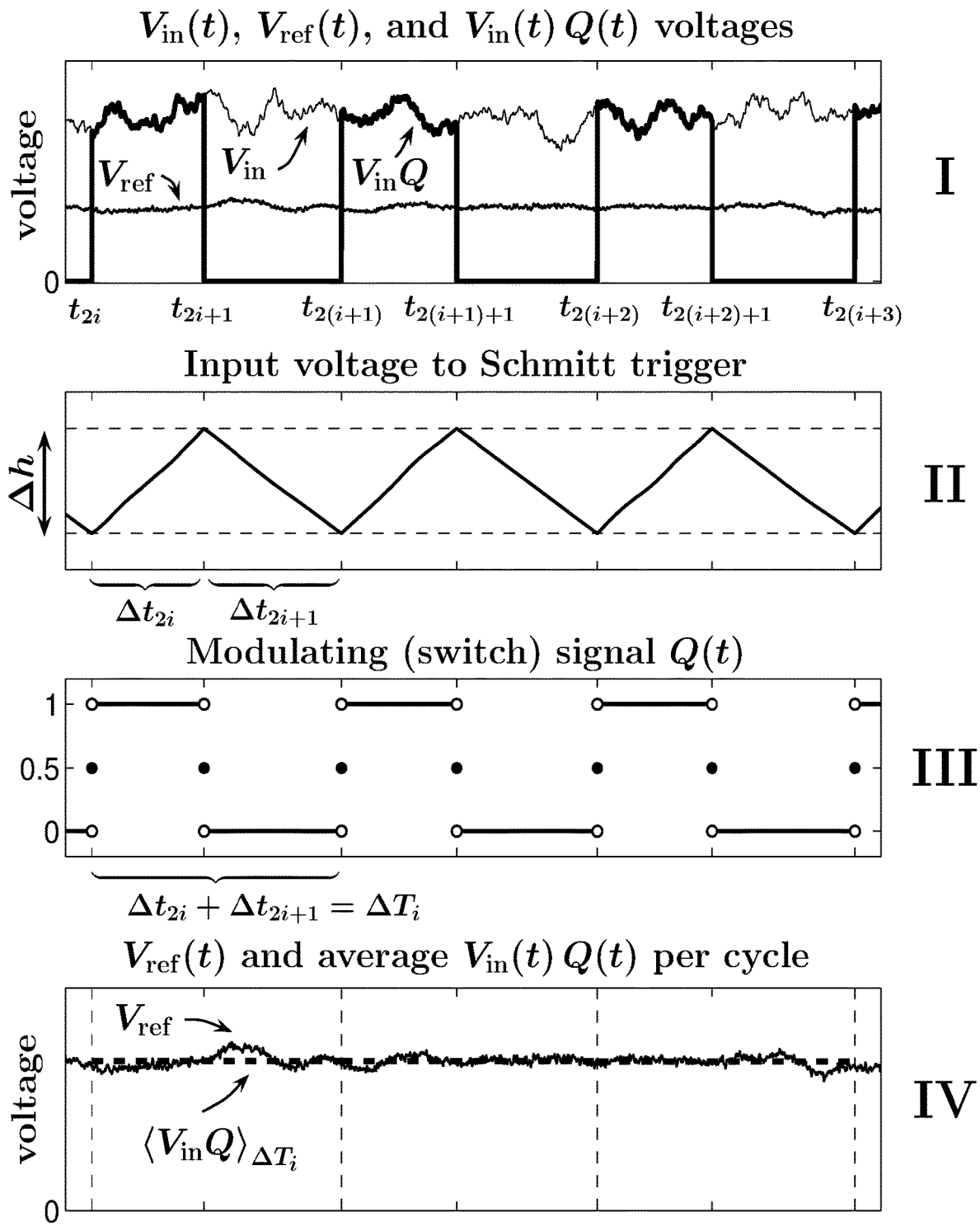
FIG. 5. Illustration of the signal and timing relations in the switch control circuit (SCC) shown in FIG. 4 (ideal switch).

FIG. 5 provides an illustration of the signal and timing relations in the switch control circuit. If the source voltage $V_{in}(t)$ is larger than the reference voltage $V_{ref}(t)$, then the output of the integrator would be a monotonically increasing function of time when switch is in position 1, and a monotonically decreasing function of time when switch is in position 2. Then the "up" ($t_{2i}$) and "down" ($t_{2i+1}$) switching times may be given implicitly by $$\frac{1}{T}\int_{t_{2i}}^{t_{2i+1}} dt[V_{in}(t)-V_{ref}(t)] = \Delta h \quad (9)$$

and $$-\frac{1}{T}\int_{t_{2i+1}}^{t_{2(i+1)}} dt V_{ref}(t) = -\Delta h, \quad (10)$$

where $\Delta h$ is the hysteresis gap of the Schmitt trigger, and thus equation (8) would indeed hold.

From equation (8), a reference circuit may be described as a circuit that ensures a zero average value of a difference between two signals over a full switching interval. In the example above, the first signal is a modulated ("switching") input voltage, and the second signal is a reference voltage. It may be further said that if a reference circuit is operable to output a switch control signal to the power switch such that the behavior of the power switch may be described by the respective modulating signals, such a reference circuit may be designated as a switch control circuit (SCC).

Using the equality of equation (8), equation (7) may be re-written as $$\int_{t_{2i}}^{t_{2(i+1)}} dt[V_{ref}(t)-V_{out}(t)]=L[I(t_{2(j+1)})-I(t_{2i})]. \quad (11)$$

By inspection of equation (11) one skilled in the art will recognize that, for a constant or slowly varying load, the average values of the output and the reference voltages would be equal to each other for a sufficiently large averaging time interval, and thus the output voltage would approximate ("mirror") the reference voltage, $$\langle V_{out}(t)\rangle_{\Delta T_i} \approx \langle V_{ref}(t)\rangle_{\Delta T_i}. \quad (12)$$

Note that, as follows from equation (12), for a constant or slowly varying load the output voltage would effectively mirror the reference voltage regardless of the magnitude and/or the time variations of the source voltage, as long as the condition of equation (8) is satisfied. Since an average value of a modulating signal over a full switching interval would be below unity, the input voltage may need to be larger than the reference voltage in equation (8) (hence buck, or step-down, converter).

Also note that, in general, for a time-variant load the output may not follow the reference voltage and equation (12) may not hold. However, equation (8) signifying the equality of average values of the reference voltage and the modulated input voltage over a full switching interval would remain valid by construction of the switch control circuit. As detailed further in this disclosure, the equality of equation (8) would be an important property of the disclosed switched-mode mirror (SMVM) concept.

In an SMVM, an average of the input voltage provided to the lowpass filter formed by the inductor, the capacitor, and the load (i.e. the modulated (switching) input voltage $V_{in}(t)$ Q(t)) over a full switching interval would be equal to an average of the reference voltage over the same switching interval.

One skilled in the art will recognize that, as follows from equation (8), the modulated input voltage $V_{in}(t)Q(t)$ may be expressed as $$V_{in}(t)Q(t)=V_{ref}(t)+\Delta V(t), \quad (13)$$

where $\Delta V(t)$ is a zero-mean residual component that may be effectively suppressed by a lowpass filter.

Using equation (8), the output voltage $V_{out}(t)$ of a buck converter shown in the lower panel (panel II) of FIG. 4 may be represented by the following differential equation:

$$V_{out}(t) = V_{ref}(t) + \Delta V(t) - L\frac{d}{dt}\frac{V_{out}(t)}{R(t)} - LC\ddot{V}_{out}(t), \quad (14)$$

which for a constant load R(t)=R=const would become $$V_{out}(t) = V_{ref}(t) + \Delta V(t) - \frac{L}{R}\dot{V}_{out}(t) - LC\ddot{V}_{out}(t), \quad (15)$$

where $\Delta V(t)$ is a zero-mean voltage. One skilled in the art will recognize that equation (15) represents an output of a 2nd order lowpass filter given an input $V_{ref}(t) \Delta V(t)$, and thus the output voltage may be expressed as $$V_{out}(t)=h(t)*V_{ref}(t)+\delta V(t), \quad (16)$$

where h(t) is the impulse response of the filter, the asterisk denotes convolution, and $\delta V(t)=h(t)*\Delta V(t)$ is a residual ("ripple") zero-mean voltage that may be negligible for a sufficiently high switching frequency (e.g., $\langle f \rangle \gg (2\pi\sqrt{LC})^{-1}$). Thus, as long as the lowpass filter formed by the inductor, the capacitor, and the resistive load keeps the ripple voltage negligible, the output voltage would effectively mirror the filtered reference voltage regardless of the magnitude and/or the time variance of the source voltage.

It may be convenient to refer to the LC sub-circuit of the total RLC circuit formed by the inductor, the capacitor, and the load as a "lowpass filter formed by the inductor and the capacitor". Such an LC sub-circuit would be effectively equivalent to the total RLC circuit for light loads (i.e. R→∞).

1.1 Non-Ideal Switch

Figure 6:
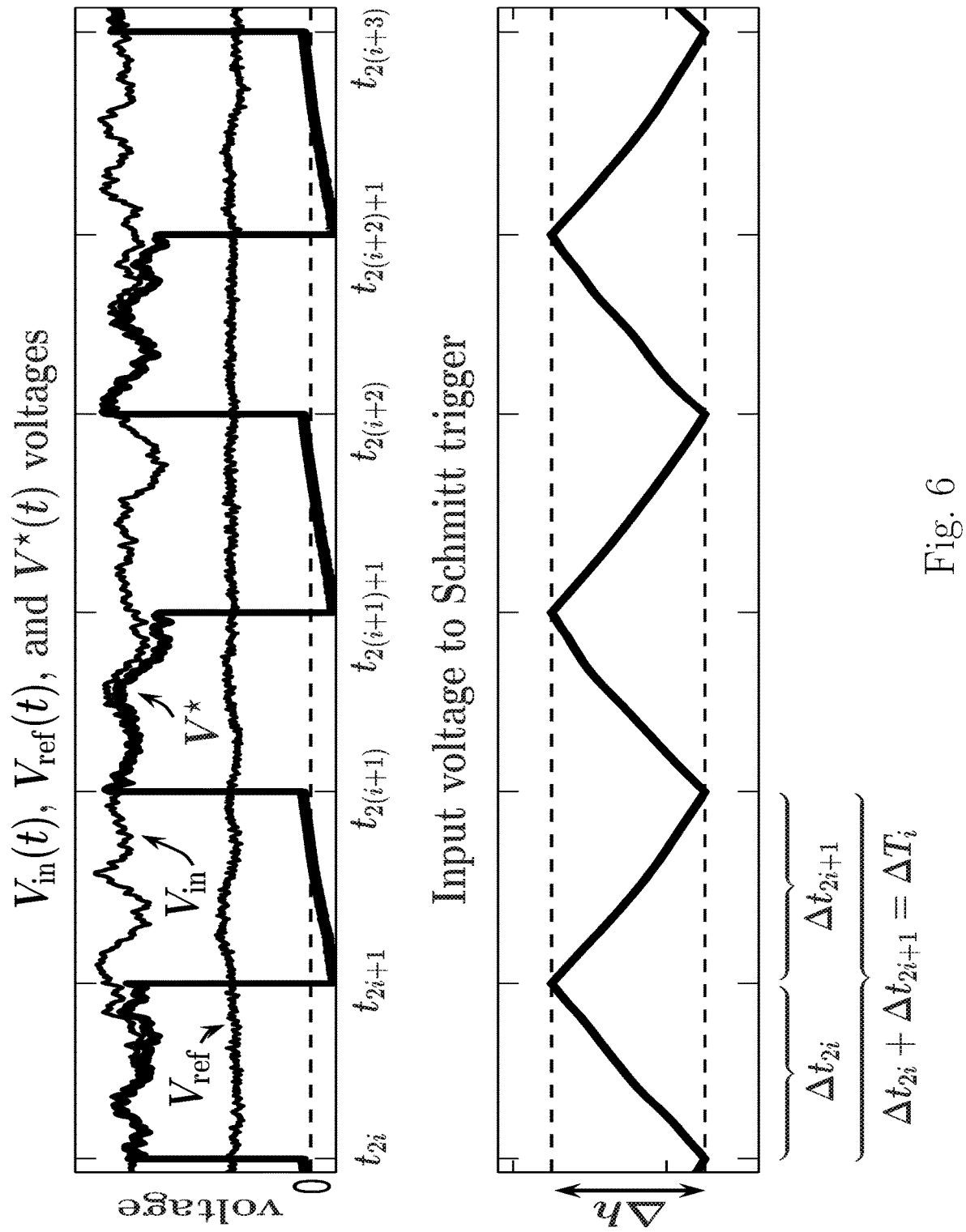
FIG. 6. Illustration of the signal and timing relations in the switch control circuit (SCC) shown in FIG. 4 (non-ideal switch).

When the switch is a non-ideal switch (for example, there are finite ohmic voltage drops across the high and/or low sides of the switch, or the low side of the switch is a nonlinear component such as a diode), the voltage at the pole of the switch would not be equal to the ideal modulated source voltage $V_{in}(t)Q(t)$, and equation (13) should be replaced by $$V^*(t)=V_{ref}(t)+\Delta V(t), \quad (17)$$

where V*(t) is the switching voltage (the voltage at the pole of the switch), as indicated in FIG. 4 (that is, the "actual" modulated source voltage). FIG. 6 provides an illustration of the signal and timing relations in the switch control circuit when there are finite ohmic voltage drops across the high and the low sides of the switch. One may see from the figure that $$\int_{t_{2i}}^{t_{2(i+1)}} dt [V^*(t) - V_{ref}(t)] = 0, \quad (18)$$

and thus equation (17) would indeed hold.

1.2 Switching Frequency of Basic SMVM-Based Buck Converter

Explicitly, from equations (9) and (10), the "up" (switch position 1) and "down" (switch position 2) time intervals $\Delta t_{2i} = t_{2i+1} - t_{2i}$ and $\Delta t_{2i+1} = t_{2(i+1)} - t_{2i+1}$ may be expressed in terms of the average voltages over the respective time intervals as $$\Delta t_{2i} = T \frac{\Delta h}{\langle V_{in}(t) - V_{ref}(t) \rangle_{\Delta t_{2i}}} \quad (19)$$

and $$\Delta t_{2i+1} = T \frac{\Delta h}{\langle V_{ref}(t) \rangle_{\Delta t_{2i+1}}}, \quad (20)$$

where T is the time constant of the integrator in the switch control circuit, and $\Delta h$ is the hysteresis gap of the Schmitt trigger. From equations (19) and (20), an ith full switching interval $\Delta T_i$ of a buck SMVM may be expressed as $$\Delta T_i = \Delta t_{2i} + \Delta t_{2i+1} = T \left[ \frac{\Delta h}{\langle V_{in}(t) - V_{ref}(t) \rangle_{\Delta t_{2i}}} + \frac{\Delta h}{\langle V_{ref}(t) \rangle_{\Delta t_{2i+1}}} \right]. \quad (21)$$

While there are several options for expressing an average switching frequency ⟨f⟩ based on (21), for sufficiently slowly varying source and reference voltages a convenient approximation in terms of the average source and reference voltages may be given as $$\langle f \rangle \approx \frac{1}{T} \frac{\langle V_{ref} \rangle}{\Delta h} \left( 1 - \frac{\langle V_{ref} \rangle}{\langle V_{in} \rangle} \right), \quad (22)$$

where the ratio ⟨$V_{ref}$⟩/⟨$V_{in}$⟩ may be viewed as an average duty cycle.

It should be clearly seen from equations (21) and (22) that the switching frequency may be easily controlled, in a continuous manner, by adjusting the integrator time constant T and/or the hysteresis gap of the Schmitt trigger $\Delta h$. One should also be able to see from equations (21) and (22) that any time variance in the source and/or the reference voltage would introduce a "natural" spread in the electromagnetic emissions spectrum of the regulator. An easily adjustable switching frequency, combined with a control over the spread emissions spectrum, may be a valuable electromagnetic interference reduction tool that would allow to move the supply noise away from sensitive spectral regions, for example, the regions of low power supply rejection ratios of the powered electronics.

Figure 7:
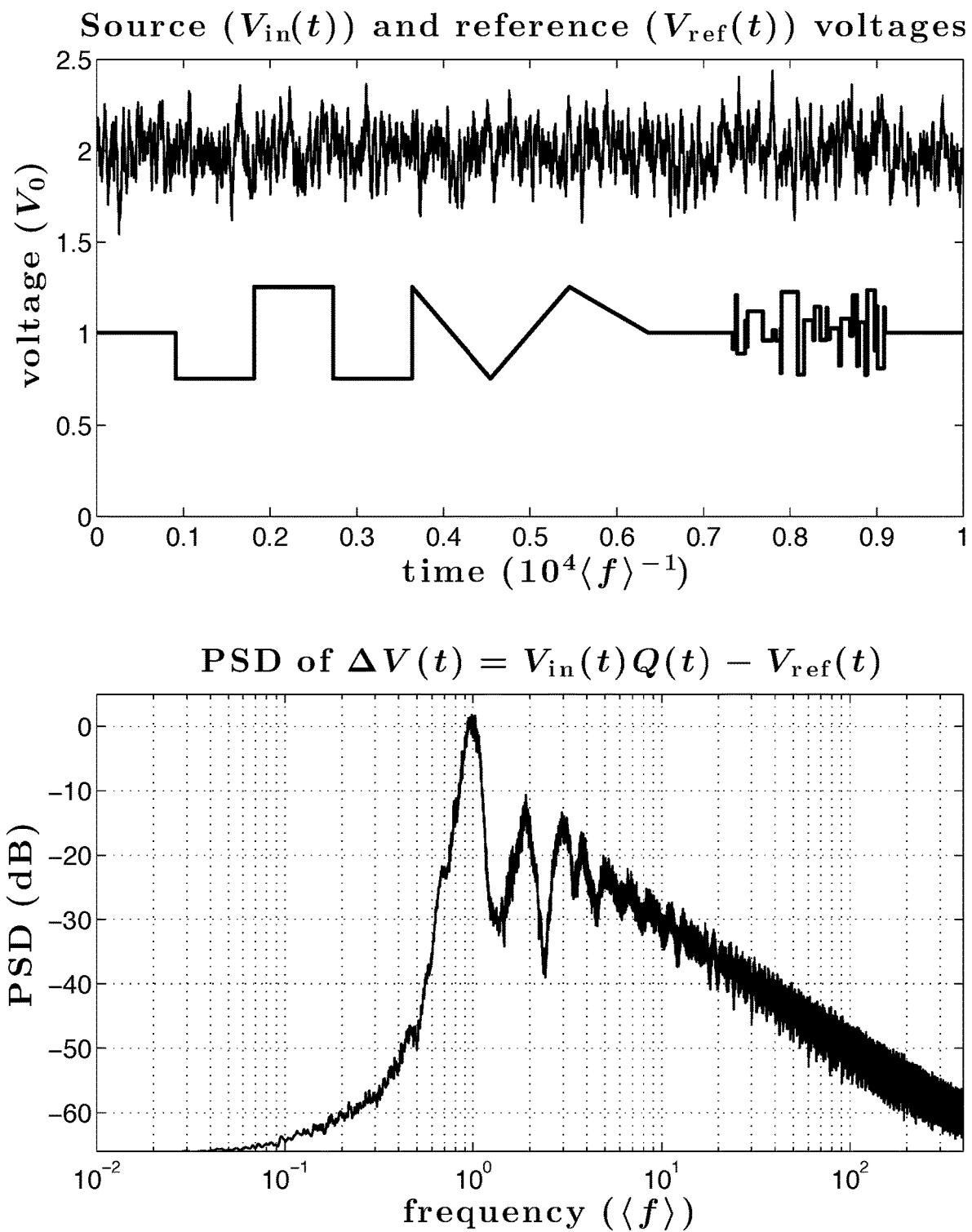
FIG. 7. The source ($V_{in}(t)$) and reference ($V_{ref}(t)<V_{in}(t)$) voltages (upper panel), and a power spectral density of the zero-mean residual voltage $\Delta V(t)=V_{in}(t)Q(t)-V_{ref}(t)$ (lower panel), for the buck converter shown in the lower panel (panel II) of FIG. 4.

FIG. 7 shows the source ($V_{in}(t)$) and reference ($V_{ref}(t)$ <$V_{in}(t)$)) voltages (upper panel), and a power spectral density of the zero-mean residual voltage $\Delta V(t) = V_{in}(t) Q(t) - V_{ref}(t)$ (lower panel), for the buck converter shown in the lower panel (panel II) of FIG. 4. Since the total power of the residual voltage $\Delta V(t)$ is of the same order of magnitude as the power of $V_{ref}(t)$, one may see that the power spectral density (PSD) of the residual voltage $\Delta V(t)$ becomes negligible at low frequency, and thus indeed the residual voltage may be viewed as a zero-mean voltage according to equation (13) that may be effectively suppressed by a lowpass filter.

Figure 8:
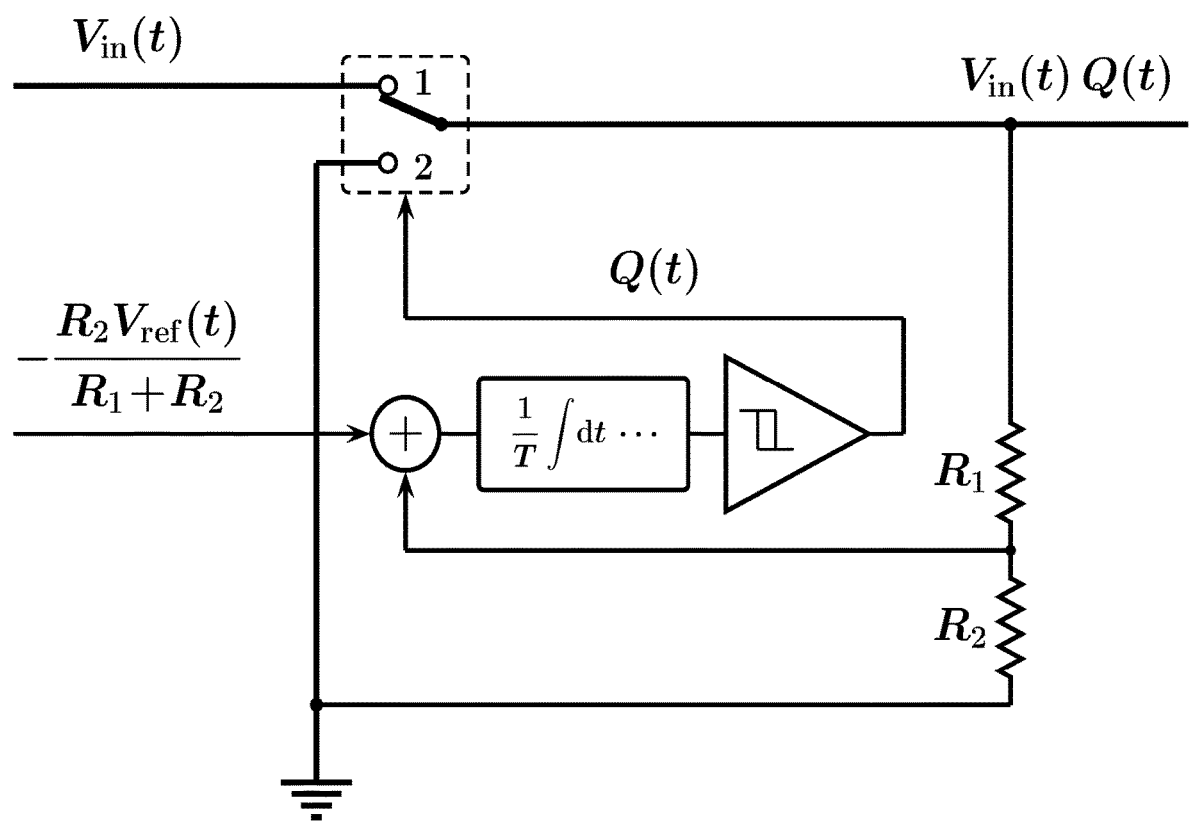
FIG. 8. Example of an SCC wherein the magnitude of the reference voltage supplied to the SCC is reduced by a factor of $R_2/(R_1+R_2)$.

It will be obvious to one skilled in the art that the switch control circuit shown in FIG. 4 may be varied in many ways according to requirements and constraints of practical implementations. For example, FIG. 8 shows an SCC wherein the magnitude of the reference voltage supplied to the SCC is reduced by a factor of $R_2/(R_1+R_2)$ (and it may be assumed that the integrator time constant and/or the hysteresis gap may be reduced as well to maintain the same switching frequency).

In general, based on particular implementations and on the consideration of non-idealities of the circuit components (e.g. non-zero switch drops), the actual reference voltage $V_{ref}^*(t)$ provided to an SCC may be different from the reference voltage $V_{ref}(t)$ related to the modulated voltage $V_{in}(t) Q(t)$ according to equation (13). It would be convenient, however, to equate $V_{ref}^*(t)$ and $V_{ref}(t)$ in this disclosure provided that they are equivalent under appropriate scaling and/or translation, $$V_{ref}(t) = a V_{ref}^*(t) + b, \quad (23)$$

$$V_{ref}^*(t) = \frac{V_{ref}(t) - b}{a},$$

where a and b are some coefficients, and $a \neq 0$.

1.3 Controlling Switching Frequency of SMVM-Based Buck Converters

While equation (22) may be adequate for expressing an average switching frequency ⟨f⟩ for sufficiently slowly varying source and reference voltages, it may not accurately represent the switching frequency when, for example, the reference voltage contains a high-frequency component with sufficiently high amplitude. While adding a zero-mean component to the reference voltage would not affect the validity of equations (17) and (18), such a component may significantly affect the switching frequency of the converter.

Figure 9:
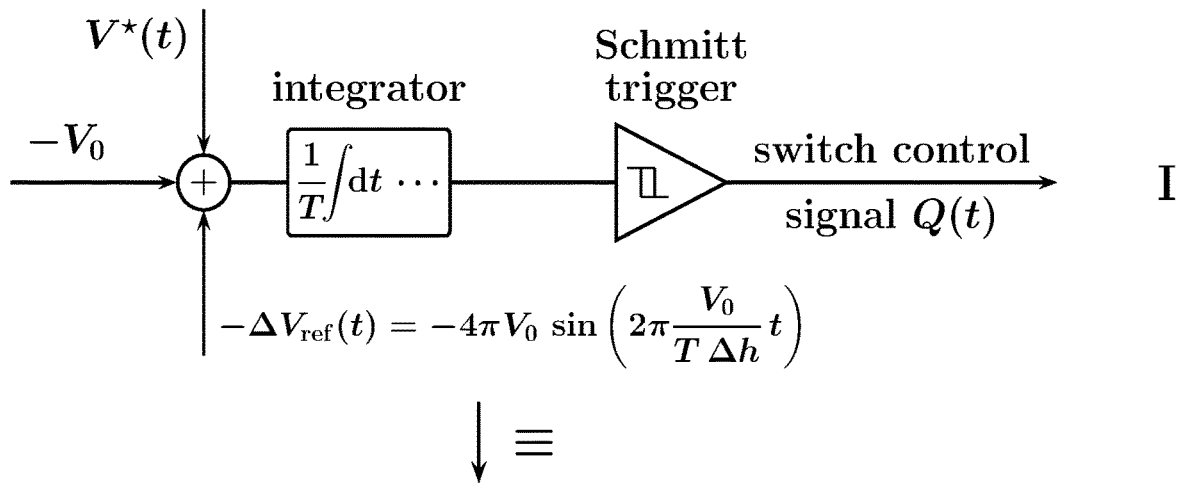
FIG. 9. Example of controlling switching frequency of SMVM-based buck converters.
Figure 9:
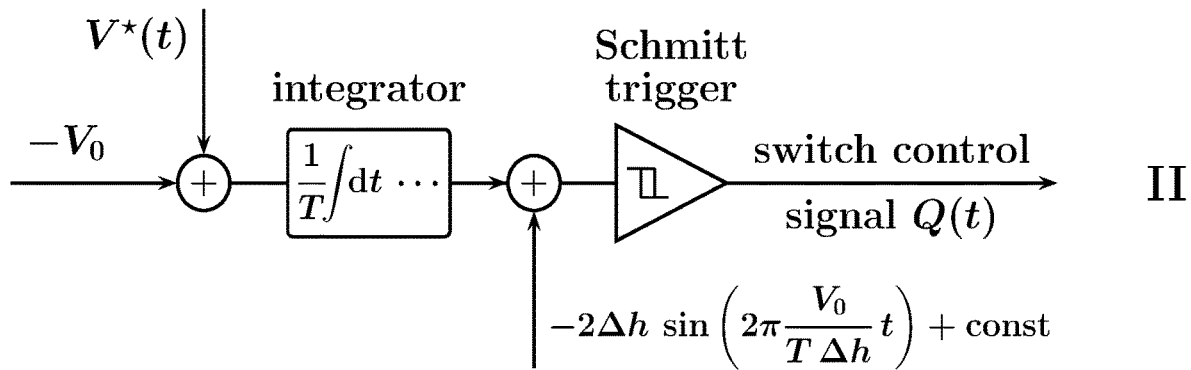

As an example, let us consider a reference voltage as indicated in panel I of FIG. 9, $$V_{ref}(t) = V_0 + \Delta V_{ref}(t), \quad (24)$$

where $V_0$=const, $\Delta V_{ref}(t) = 4\pi V_0 \sin(2\pi f_0 t)$ is a zero-mean component, and $$f_0 = \frac{V_0}{T \Delta h}.$$

One should note that adding the component $-\Delta V_{ref}(t) = -4\pi V_0 \sin(2\pi f_0 t)$ to the input of the integrator (panel I) would be equivalent, as shown in panel II, to adding the component $-2\Delta h \sin(2\pi f_0 t)$ (with or without an arbitrary DC offset) directly to the input of the Schmitt trigger.

Figure 10:
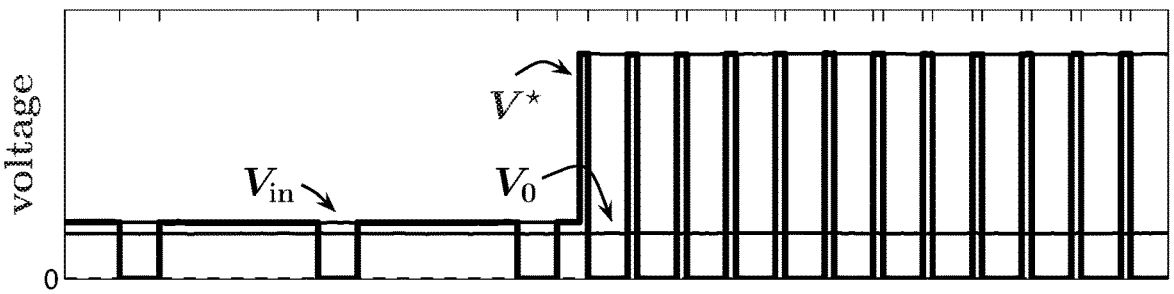
FIG. 10. Illustration of the signal and timing relations in the SCC shown in FIG. 9.
Figure 10:
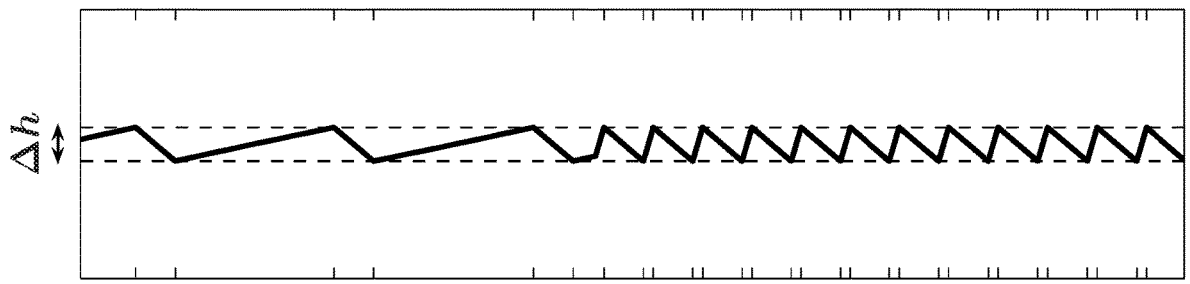
Figure 10:
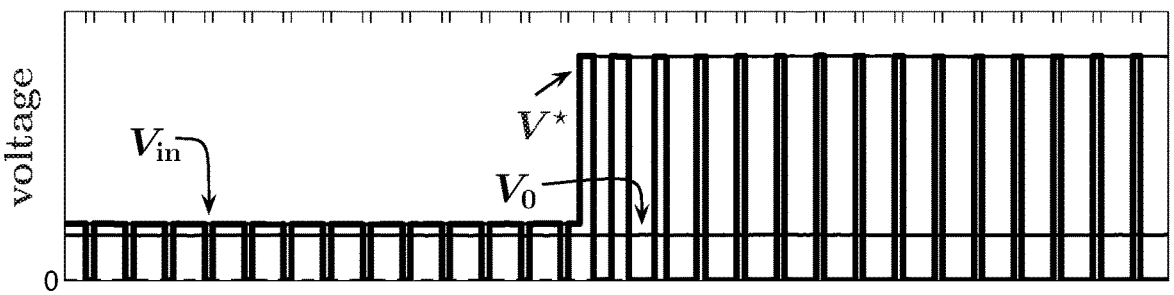
Figure 10:
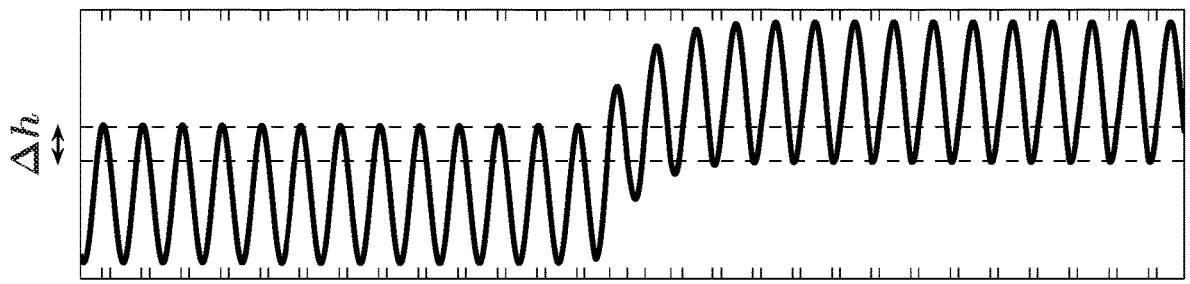

FIG. 10 provides a comparison of the signal and timing relations in the SCC when $\Delta V_{ref}(t)$ is zero, and when $\Delta V_{ref}(t)$ is a sine wave $$\Delta V_{ref}(t) = 4\pi V_0 \sin\left(2\pi \frac{V_0}{T \Delta h} t\right).$$

One should be able to see in the figure that while the switching frequency of the basic SMVM-based buck converter changes with the change in the input voltage, the switching frequency of the converter with the sine wave $\Delta V_{ref}(t)$ remains equal to the frequency of the sine wave.

Figure 11:
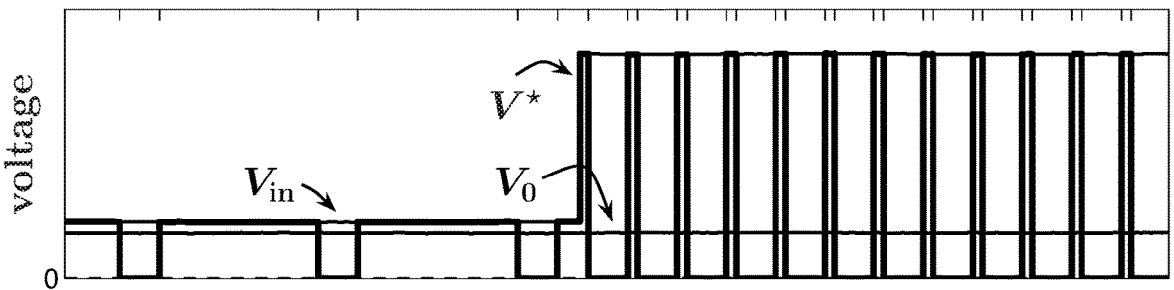
FIG. 11. Illustration of the signal and timing relations in the SCC with a square wave $\Delta V_{ref}(t)$.
Figure 11:
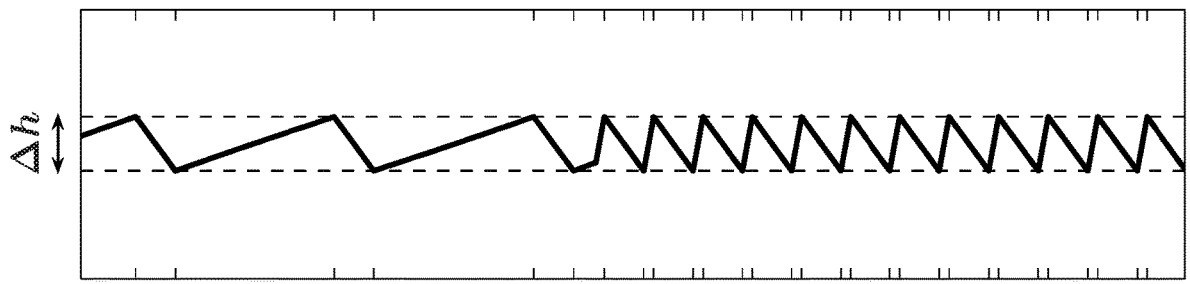
Figure 11:
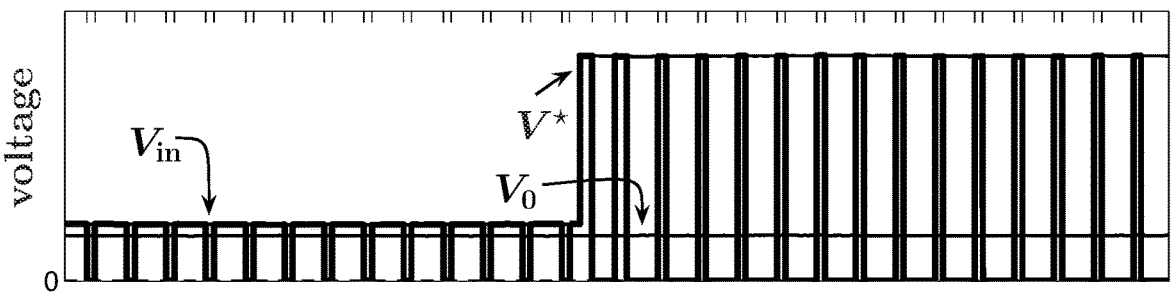
Figure 11:
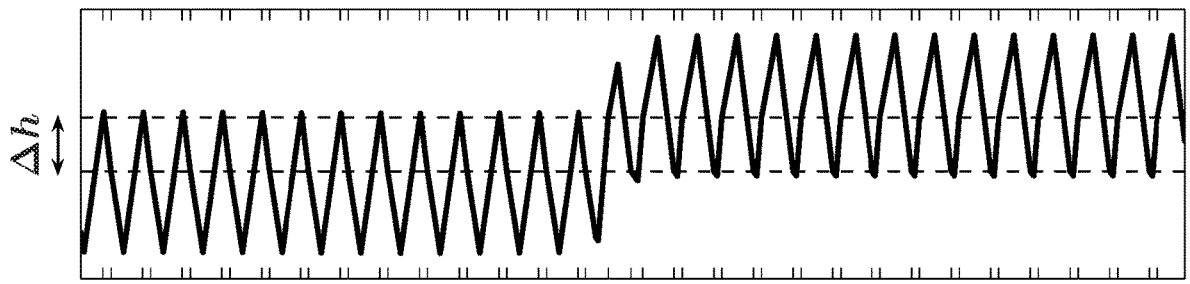

One skilled in the art will recognize that a variety of other periodic signals with a desired fundamental frequency may be used for setting the switching frequency of SMVM-based converters. For example, FIG. 11 provides an illustration of the signal and timing relations in the SCC when $\Delta V_{ref}(t)$ is a square wave $$\Delta V_{ref}(t) = 5V_0 sgn\left[\sin\left(2\pi \frac{V_0}{T\Delta h}t\right)\right].$$

One should note that adding such a square wave component to the input of the integrator would be equivalent to adding a triangle wave component, with the peak-to-peak amplitude 2.5Δh and of the same fundamental frequency (with or without an arbitrary DC offset), directly to the input of the Schmitt trigger.

2 Basic Principles of SMVM Regulation

2.1 Switch Control Circuit (SCC)

Figure 12:
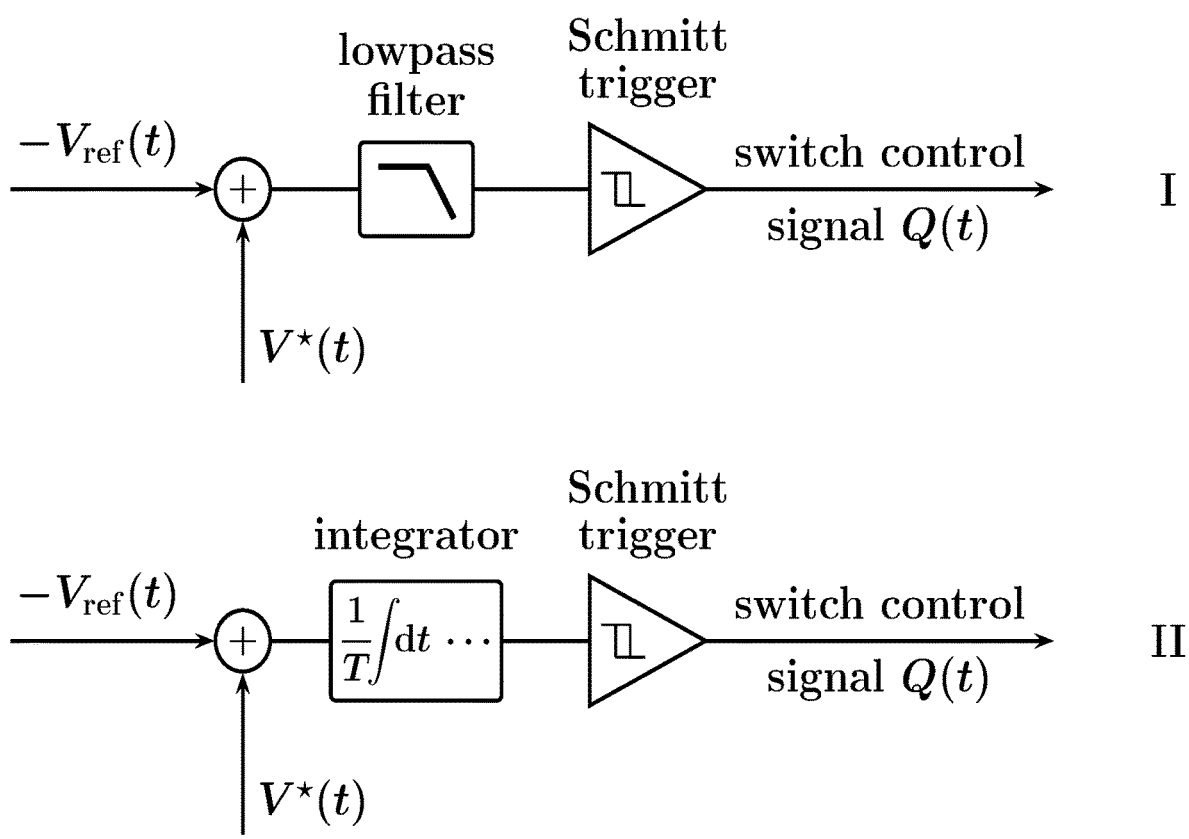
FIG. 12. Switch control circuits comprising a lowpass filter (panel I) and an integrator (panel II) followed by a Schmitt trigger.

As given by equation (17), the modulated input voltage V*(t) (that is, the voltage at the pole of the switch, or switching voltage) may be represented by a sum of the reference voltage $V_{ref}(t)$ and a zero-mean component $\Delta V(t)$. Then, by applying a lowpass filter with an appropriately chosen impulse response g(t) and a sufficiently narrow bandwidth so that $|g(t)*\Delta V(t)| \leq \varepsilon$ to both sides of equation (17), the latter may be re-written as $$g(t)*V^*(t) = g(t)*[V_{ref}(t) + \Delta V(t)] \approx g(t)*V_{ref}(t), \quad (25)$$

where the asterisk denotes convolution, and the approximate equality signifies that ε is sufficiently small. Equation (25) may be further re-written as $$-\varepsilon \leq g(t)*[V^*(t) - V_{ref}(t)] \leq \varepsilon, \quad (26)$$

and a corresponding SCC may be described as illustrated in the upper panel (panel I) of FIG. 12.

In panel I of FIG. 12, the difference between the modulated input voltage V*(t) and the reference voltage $V_{ref}(t)$ is filtered with a lowpass filter with an appropriately chosen impulse response g(t) and a sufficiently narrow bandwidth, and the output of the filter $g(t)*[V^*(t)-V_{ref}(t)]$ is the input to a comparator with the hysteresis gap±Δh/2 (indicative of ±ε) around zero. When the comparator input exceeds (upward crosses) the upper threshold Δh/2, the comparator outputs a "down" level signal that puts the switch in position 2.

The comparator output would remain at the "down" level (keeping the switch in position 2) until its input drops below the lower threshold -Δh/2 (which would eventually happen since the filter is a lowpass filter, and the input to the filter would be negative). When the comparator input downward crosses the lower threshold -Δh/2, the comparator outputs an "up" level signal that puts the switch in position 1. The input to the filter then becomes positive (since $V_{in} > V_{ref}$), which would eventually cause the comparator input to exceed the upper threshold Δh/2, thus putting the switch in position 2 ("down") and completing a switching cycle.

The dynamics of the oscillations of the comparator input around zero, and thus the accuracy, speed, and stability of such an SCC shown in panel I of FIG. 12 would be affected by the shape of the impulse response of the lowpass filter, the DC gain of this filter, and by the hysteresis gap of the comparator.

One may deduce from the above discussion that a large variety of lowpass filters may be used in an SCC, including higher-order integrators. However, the output voltage $V_{out}(t)$ of the converter may also be viewed as the modulated input voltage V*(t) filtered with a 2nd order lowpass filter formed by the inductor, the capacitor, and the resistive load. Thus, while the condition of equation (26) may be satisfied for a higher-order SCC lowpass filter, it may not result in satisfying the condition of equation (16). Therefore, unless the basic converter configuration contains additional components that increase the order of the filter formed by all components of the converter, the order of an SCC lowpass filter should not be larger than 2.

In addition, since in practice the hysteresis gap Δh of the Schmitt trigger may exceed the desired (designed) deviation of the output voltage from the desired (designed) output, one may prefer a 1st order SCC lowpass filter. This way, for a sufficiently high switching frequency, satisfying equation (26) may indeed result in satisfying the condition of equation (16) (e.g. a sufficiently small ripple voltage).

Thus a particularly attractive choice for a lowpass filter in a switch control circuit would be a 1st order lowpass filter (e.g. an RC integrator) with a sufficiently large time constant (narrow bandwidth) and high DC gain. When used in an SCC, such a high-gain, narrow-bandwidth 1st order lowpass filter may be viewed as an ideal integrator, as shown in panel II of FIG. 12.

The impulse response of an RC integrator with the DC gain $g_0$=RC/T may be expressed as $$g(t) = \frac{g_0}{RC}\exp\left(-\frac{t}{RC}\right)\theta(t) \quad (27)$$
$$= \frac{1}{T}\exp\left(-\frac{t}{RC}\right)\theta(t),$$

where θ(x) is the Heaviside unit step function [2, for example]. This impulse response becomes $$g(t) = \frac{1}{T}\theta(t) \quad (28)$$

for an ideal integrator, representing a 1st order lowpass filter with infinite DC gain and infinitesimally narrow bandwidth.

An integrator used as a lowpass filter in an SCC may ensure high accuracy, speed, and unconditional stability of an SCC. An integrator-based SCC may also be relatively easy to analyze and implement, and, as discussed later in this disclosure, would greatly simplify suppression of the inductive ("di/dt") noise in the output signal of a buck regulator. In addition, since the DC gain of an integrator would be high (e.g. infinitely high for an ideal integrator), the nominal threshold of a comparator would become effectively irrelevant (i.e. it may not need to be zero), and only the total hysteresis gap Δh of the comparator would be important.

In FIG. 12, it may be implied that a high output of the comparator puts the switch in position 1, and thus the Schmitt triggers are inverting Schmitt triggers.

2.2 Supplying Additional Control Signals to an SCC

As was discussed earlier, an SCC may provide effective independence of the output from the source voltage, which for constant and/or slowly varying loads may make any additional regulation unnecessary (see, for example, equations (15) and (16)). Thus, apart from a small ripple voltage, for a constant or a sufficiently slowly varying load such a basic buck converter may be akin to a voltage source ("battery") with the internal resistance equal to the equivalent series resistance of the inductor, regardless the temporal variations and/or the noise in the source voltage.

When the load varies with time, the filter formed by the inductor, the capacitor, and the load would be time-variant (see, for example, equation (14)), and the output voltage would depend on the magnitude of the load and on its time derivatives. To ensure that the output voltage still follows the desired (designed) voltage, one may, for example, provide an additional control voltage to the SCC that compensates for the time variability of the load.

This may be done, for example, by adding a "correction", or "compensation" term $\Delta V_{ref}(t)$ to the reference voltage, indicative of the time variance of the load and such that the output of the converter would follow the "uncorrected" reference voltage $V_{ref}(t)$ effectively regardless the time variations in the load.

Note that when a compensation term $\Delta V_{ref}(t)$ is added to the reference voltage $V_{ref}(t)$ to compensate for the time variability of the load, the output would follow the "uncorrected" reference voltage $V_{ref}(t)$ rather than $V_{ref}(t)+\Delta V_{ref}(t)$. However, as would follow from equation (12), the average value of the switching voltage V*(t) over a full switching interval would still approximate the average value of the "compensated" reference voltage $V_{ref}(t) \Delta V_{ref}(t)$ over the same switching interval.

Alternatively, given a compensation term $\Delta V_{ref}(t)$ such that, when added to the reference voltage, the output of the converter would follow the "uncorrected" reference voltage $V_{ref}(t)$ effectively regardless the time variations in the load, one may instead add a compensation term equal to an antiderivative (an indefinite integral) of the compensation term $\Delta V_{ref}(t)$, divided by the time constant of the integrator T, to the input of the Schmitt trigger in the SCC.

Figure 13:
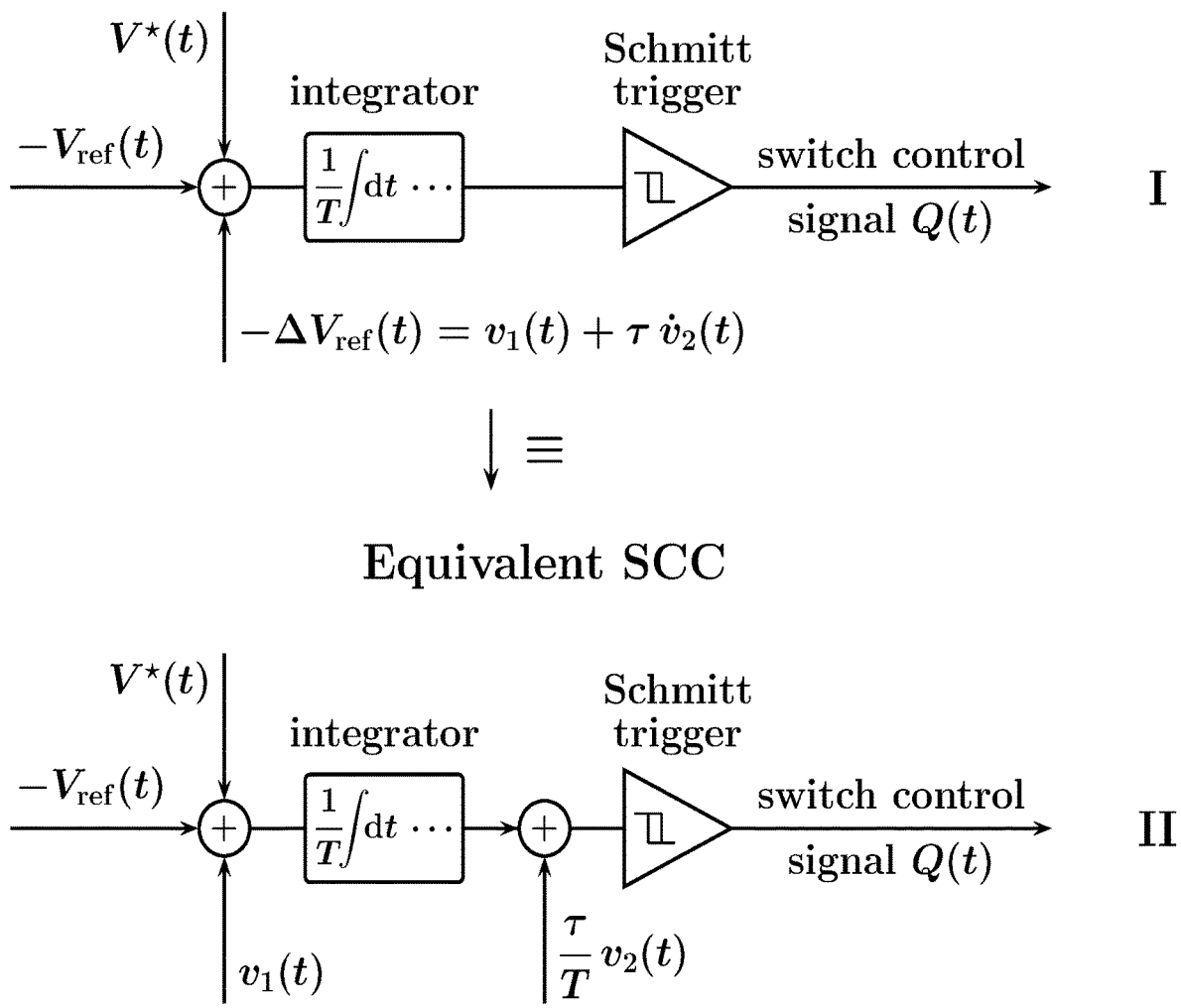
FIG. 13. Illustration of equivalent SCC compensation configurations with compensation signals supplied to the inputs of the integrator and/or the Schmitt trigger.

In general, as illustrated in FIG. 13, adding a compensation term to a reference voltage at the input of the integrator in an SCC, such that this compensation term may be expressed as a sum of a first voltage and a component proportional to a time derivative of a second voltage, would be equivalent to adding the first voltage to the reference voltage at the input of the integrator, and adding a component proportional to the second voltage to the input of the Schmitt trigger in the SCC.

Figure 14:
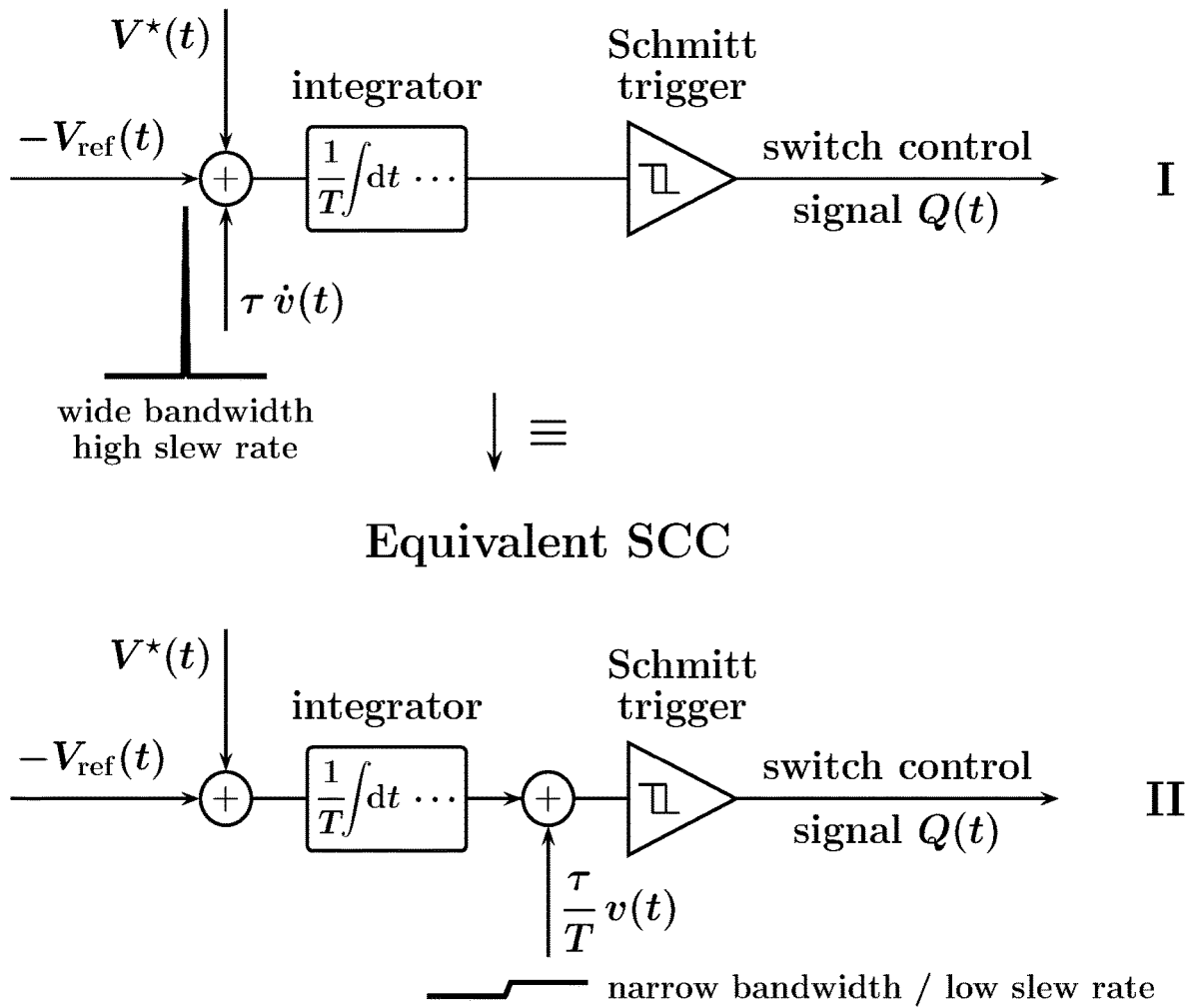
FIG. 14. Additional illustration of equivalent SCC compensation configurations with compensation signals supplied to the inputs of the integrator and/or the Schmitt trigger.

Note that adding a constant voltage directly to the input of the Schmitt trigger would not change the behavior of an SCC, since such voltage would be counteracted by an infinitesimally small change in the integrator input. On the other hand, as illustrated in FIG. 14, adding a step voltage to the input of the Schmitt trigger may be equivalent to adding an impulse voltage to the integrator input. In general, adding some control voltage $v_c(t)$ to the input of the Schmitt trigger would be equivalent to adding a time derivative of this control voltage multiplied by the integrator time constant, $T\dot{v}_c(t)$, to the input of the integrator. For example, if a component of a desired control signal that may be supplied to the integrator input is representative of a time derivative of the output signal (e.g., $\tau \dot{V}_{out}(t)$), one may instead supply a component representative of the output signal (e.g., $\tau V_{out}(t)/T$) directly to the input of the Schmitt trigger.

The relations between control signals supplied (or added) to the inputs of the integrator and/or the Schmitt trigger of an SCC disclosed herein may provide a basis for enhanced yet simplified regulation and/or compensation of SMVM-based power supplies.

3 Regulated SMVM-Based Buck Converter

It should be understood that the specific example of a mathematical description of a regulated SMVM-based buck converter given below is presented for illustration only, as a descriptive language intended to convey the inventive idea clearly, and is not limitative of the claimed invention. Various changes and modifications within the spirit and scope of the invention should become apparent to those skilled in the art from this illustrative description.

Figure 15:
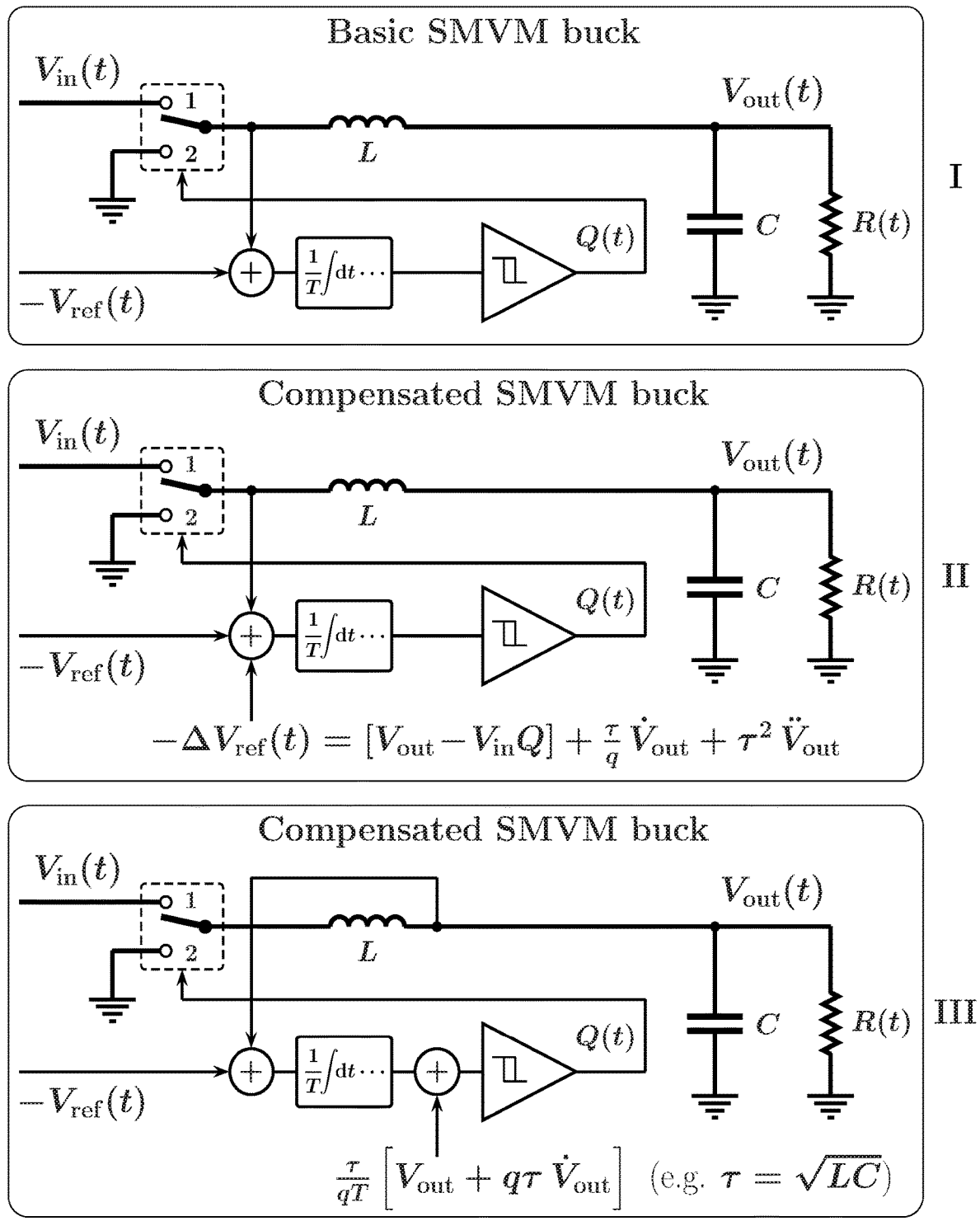
FIG. 15. A basic SMVM-based converter (panel I) and two equivalent configurations (panels II and III) compensating for time variance of the load.

Let us refer to the basic SMVM buck topology shown in the upper panel (panel I) of FIG. 15. In all panels of this figure, Q(t) is the modulating signal corresponding to the behavior of the switch (see equation (6)). When Q(t)=1, the switch is in position "1", and when Q(t)=0, the switch is in position "2".

As was discussed earlier, for a time-variant resistive load R(t) the "actual" output voltage $V_{out}(t)$ of this converter may be represented by the following differential equation:

$$V_{out}(t) = V_{ref}(t) + \underset{(actual)}{\Delta V(t)} - L\frac{d}{dt}\frac{V_{out}(t)}{R(t)} - LC\ddot{V}_{out}(t), \qquad (29)$$

where $\Delta V(t)$ is a zero-mean voltage. If the switching frequency is sufficiently high, the contribution of this term into the output ("ripple") may be negligible.

For a constant load, if $\Delta V(t)$ does not have a significant component at the resonant frequency of the LC circuit, and/or the ratio L/R is sufficiently large, the output voltage may well approximate the reference voltage filtered with the 2nd order lowpass filter formed by the inductor, the capacitor, and the resistive load.

Let us now express a "desired" (or "designed") output as follows:

$$V_{out}(t) = V_{ref}(t) + \underset{(desired)}{\Delta V(t)} - \frac{\tau}{q}\dot{V}_{out}(t) - \tau^2 \ddot{V}_{out}(t), \qquad (30)$$

where q is a desired quality factor of the filter, and the time parameter T is proportional to $\sqrt{LC}$, $\tau = \alpha\sqrt{LC}$. One should be able to see that such a desired output would not depend on the time variability of the load, and, for $\alpha=1$, would be equal to the actual output of the basic SMVM converter for a constant load $R(t)=q\sqrt{L/C}$=const.

Let us further modify the reference signal by adding a control signal $\Delta V_{ref}(t)$ to the reference signal, in order to achieve the desired output corresponding to equation (30). Then the modified actual output of the converter may be represented by the following differential equation:

$$V_{out}(t) = V_{ref}(t) + \Delta V_{ref}(t) + \Delta V'(t) - L\frac{d}{dt}\frac{V_{out}(t)}{R(t)} - LC\ddot{V}_{out}(t), \qquad (31)$$
(modified actual)

where $\Delta V'(t)$ is a zero-mean voltage.

Equating the desired (equation (30)) and the modified actual (equation (31)) outputs, and neglecting the change in the ripple voltage, one may arrive to the following expression for the control signal $\Delta V_{ref}(t)$:

$$\Delta V_{ref}(t) = [V_{in}(t)Q(t) - V_{out}(t)] - \frac{\tau}{q}\dot{V}_{out}(t) - \tau^2 \ddot{V}_{out}(t), \quad (32)$$

where $Q(t)$ is the modulating signal corresponding to the behavior of the switch (see equation (6)). Adding this control signal to the reference voltage, as shown in the middle panel (panel II) of FIG. 15, would ensure that the output voltage satisfies equation (30) and would follow the filtered reference voltage.

Referring to the basic SMVM regulation principles discussed in Section 2 (see, for example, FIG. 13), a regulated SMVM-based buck converter may thus be constructed as schematically shown in the lower panel (panel III) of FIG. 15.

Figure 16:
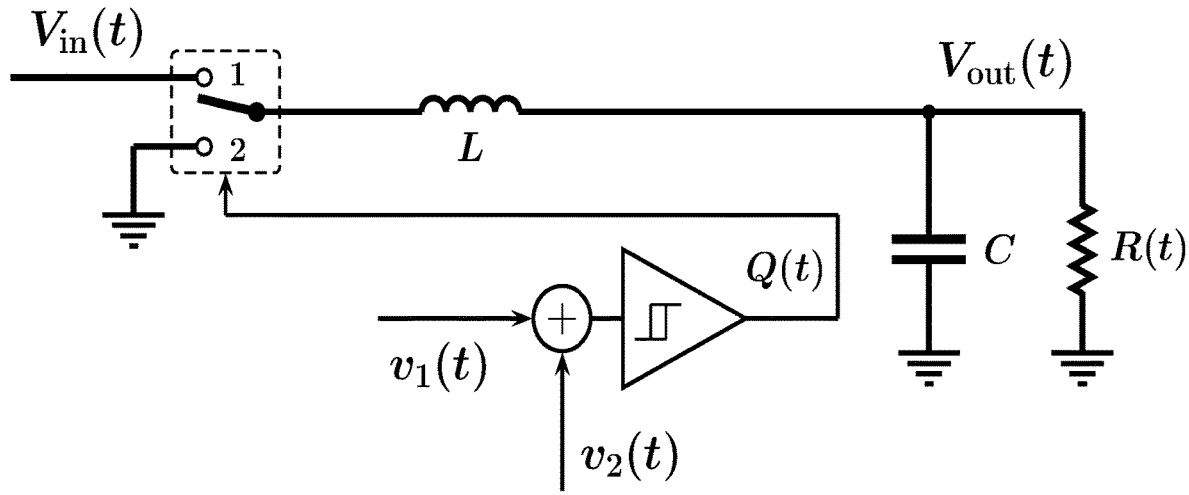
FIG. 16. Illustrative example of idealized circuit implementations of the integrator and the control signal circuit for a regulated SMVM-based buck converter shown in panel III of FIG. 15.
Figure 16:
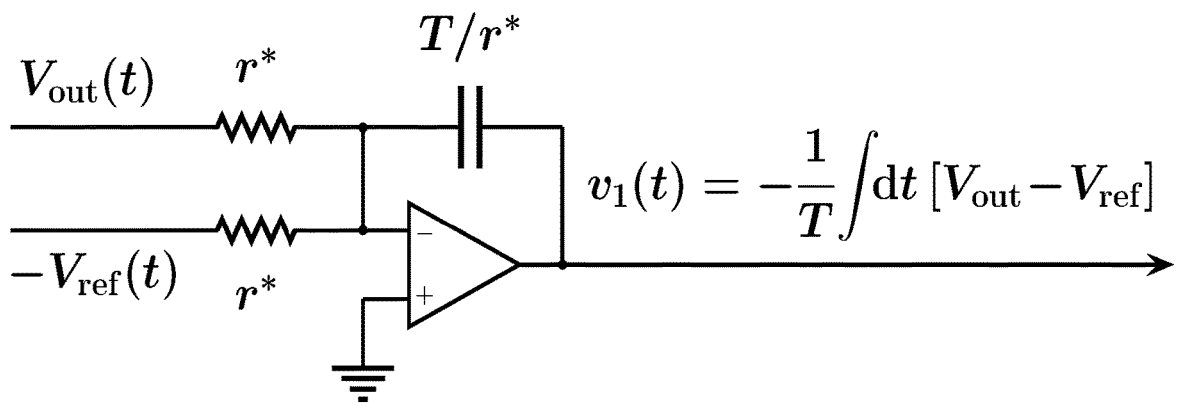
Figure 16:
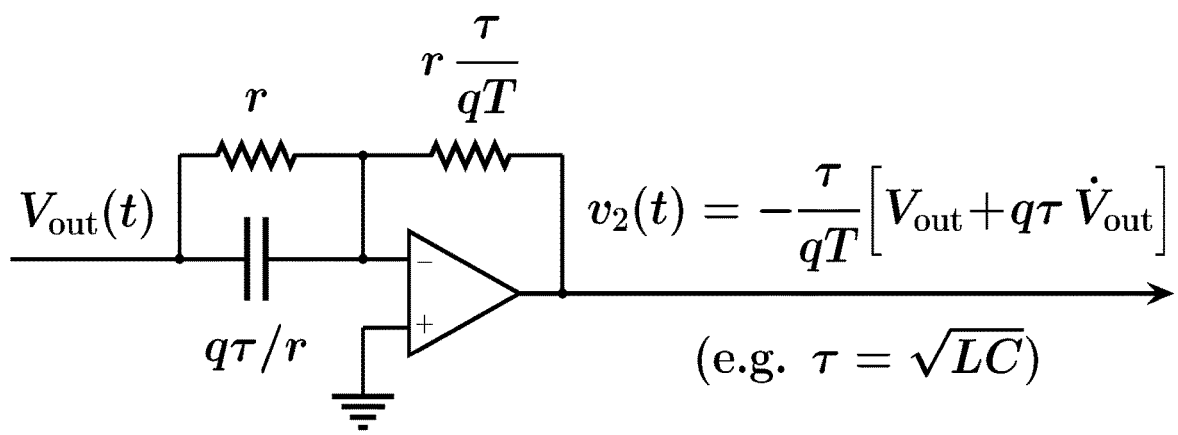

FIG. 16 provides an illustrative example of (idealized) circuit implementations of the integrator and the control signal circuit for a regulated SMVM-based buck converter disclosed in this section. One skilled in the art will recognize that the actual practical implementations of the integrator and the control signal circuit shown in FIG. 16 may be varied in many ways, and that the sum of $v_1(t)$ and $v_2(t)$ may be produced by a single circuit. One should also note that, in order to be consistent with the conventions and/or notations used in this disclosure, the hysteretic comparator shown in FIG. 16 is a non-inverting Schmitt trigger.

In this embodiment of the present invention, the basic distinguishing feature of the disclosed regulated SMVM-based buck converter may be that, neglecting the ripple voltage, the output of the converter may follow the reference voltage filtered with a 2nd order linear lowpass filter with a given time parameter $\tau = \alpha\sqrt{LC}$ and a given quality factor $q$, both set by a control circuit, regardless of the magnitude and/or time variations of the input voltage and/or the conductance of the load. For example, for $q=1/\sqrt{3}$ such a 2nd order linear lowpass filter would be a 2nd order lowpass Bessel filter, and for $q=1/\sqrt{2}$ such a 2nd order linear lowpass filter would be a 2nd order lowpass Butterworth filter.

Figure 17:
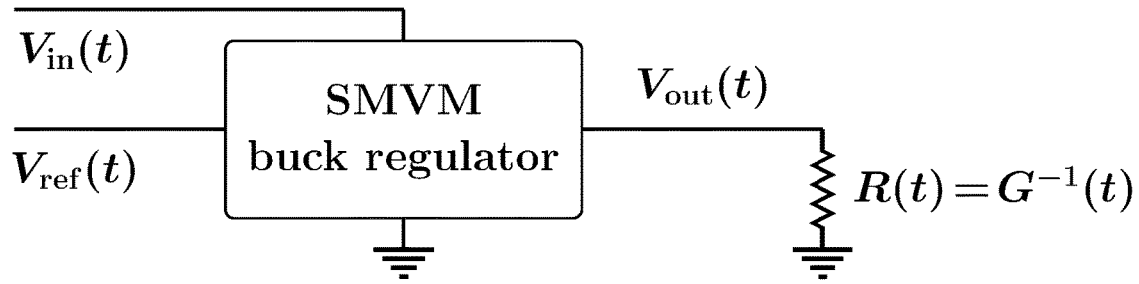
FIG. 17. Illustration of SMVM-based buck regulator used in a Switched-Mode Voltage Follower (SMVF) configuration.
Figure 17:
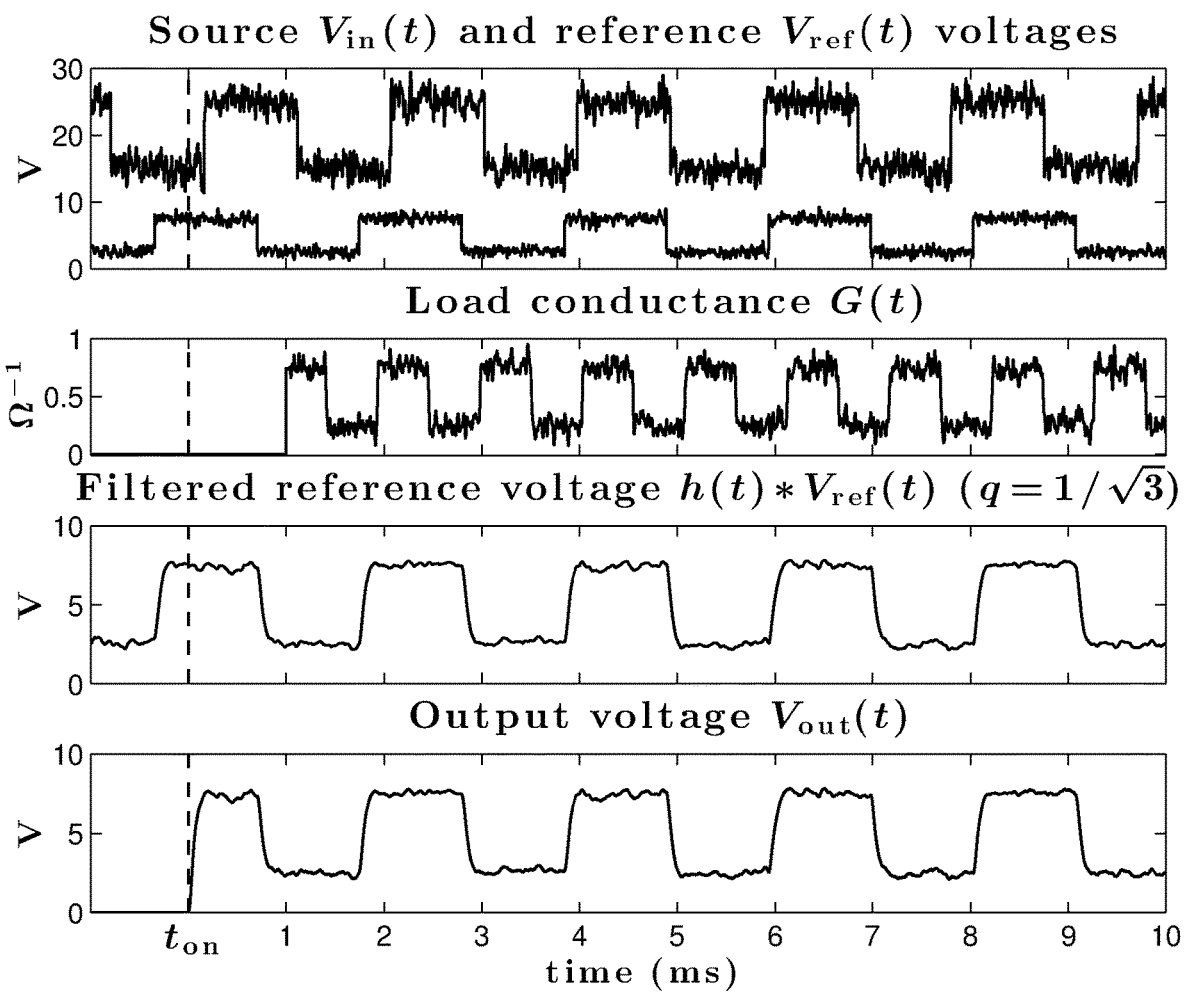

This is illustrated in FIG. 17, where an SMVM-based buck regulator is used in a Switched-Mode Voltage Follower (SMVF) configuration, providing a time-variant output voltage $V_{out}(t)$ to a time-variant load $R(t)=G^{-1}(t)$, as schematically shown at the top of the figure. The time-variant source voltage $V_{in}(t)$ and the time-variant reference voltage $V_{ref}(t) < V_{in}(t)$ are shown in the top panel of the four panels showing the signal traces. The time-variant load conductance $G(t)$ is plotted in the panel just below the top panel, and, as can be seen in this panel, the initial conductance before and after the time the circuit is switched "on" ($t_{on}$) is zero (open circuit load). The panel just above the lower panel shows the reference voltage filtered by a 2nd order lowpass filter with the time parameter $\tau = \sqrt{LC}$ and the quality factor $q=1/\sqrt{3}$ (Bessel). The lower panel shows the SMVF output voltage $V_{out}(t)$. One should be able to see that, after the circuit is switched on, the output voltage rapidly converges to the filtered reference voltage, and then continues to follow the filtered reference voltage, regardless the magnitudes and the time variations of the input and the reference voltages, and the load conductance.

Figure 18:
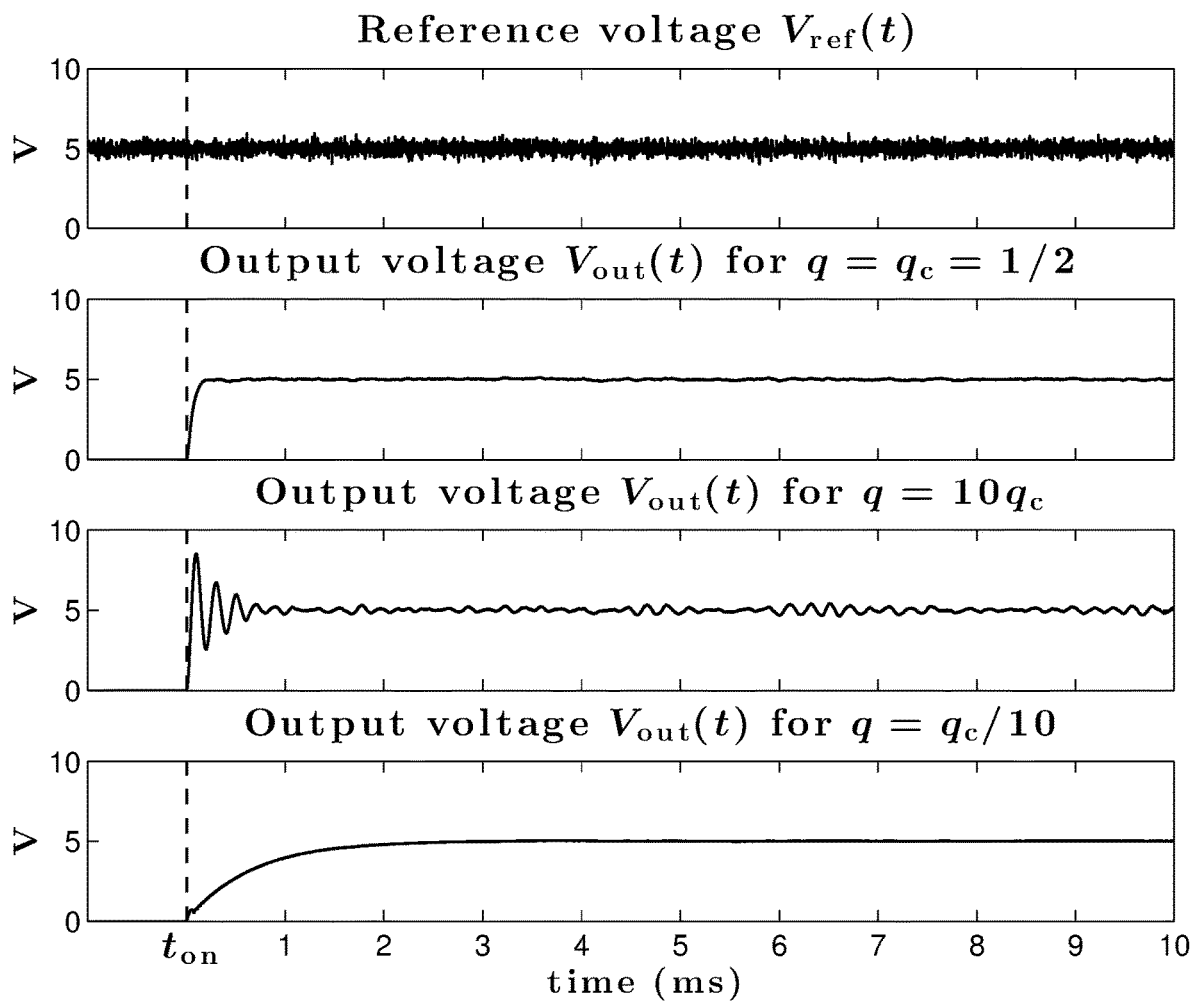
FIG. 18. The reference voltage (a noisy constant voltage), and the outputs of the SMVF circuit for $\tau=\sqrt{LC}$ and three different quality factors, for the same input voltage and the load conductance as used in FIG. 17.

It is important to note that the output/performance of the regulated SMVM-based buck converter, neglecting the non-idealities of the components, may be independent from any particular inductor and capacitance values for the same LC product, for a variety of loads including an open circuit. Thus the quality factor of the RLC circuit formed by the inductor, the capacitor, and the resistive load may be irrelevant, and the output voltage gain at the resonant frequency $(2\pi\sqrt{LC})^{-1}$ would be determined only by the given (preset) quality factor $q$, which would allow to avoid the overshoots/undershoots for rapidly changing loads and/or reference voltages, including the startup overshoots/undershoots even for an open circuit startup. This is illustrated in FIG. 18 which shows, for the same input voltage and the load conductance as used in FIG. 17, a reference voltage (a noisy constant voltage), and the outputs of the SMVF circuit for $\tau = \sqrt{LC}$ and three different quality factors. One should be able to deduce from this figure that reducing the quality factor $q$ to below $q_c = \frac{1}{2}$ (corresponding to a critically damped case) would avoid any overshoots and/or undershoots at startup and/or for any load changes.

Figure 19:
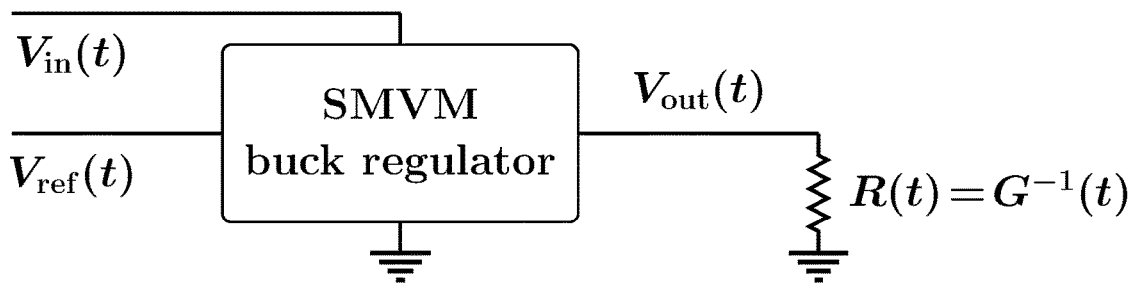
FIG. 19. A zoomed-in look at the fragments of the reference and the output voltages shown in FIG. 18.
Figure 19:
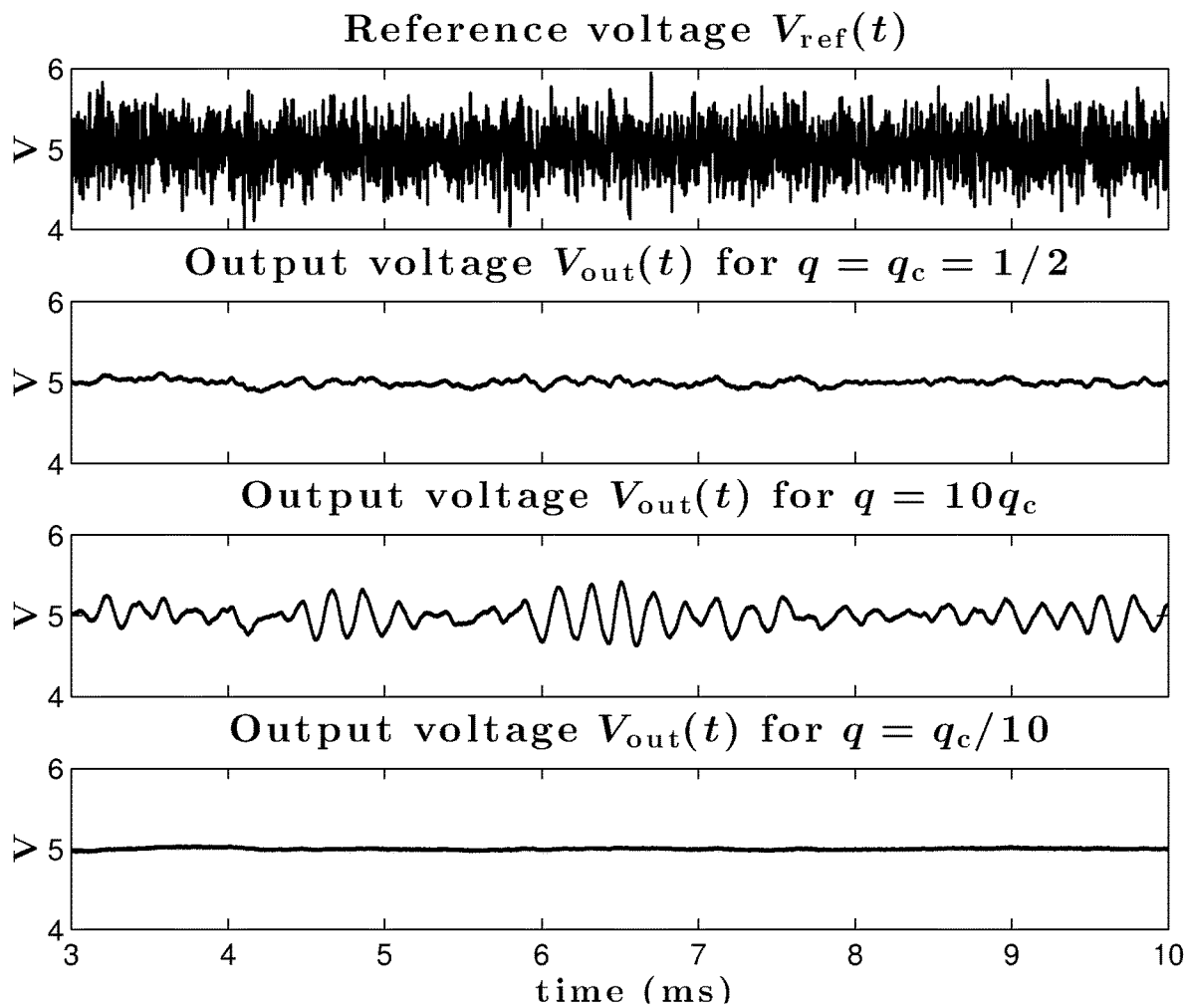

Since the output of a regulated SMVM-based converter follows the reference voltage filtered with a 2nd order lowpass filter with the time constant $\alpha\sqrt{LC}$ and a given/set quality factor $q$, the output voltage may be insensitive to high-frequency noise in the reference voltage. In addition, since the bandwidth of such a filter is a decreasing function of the quality factor, for a desired constant reference voltage this insensitivity may be further increased by decreasing the quality factor $q$. This is illustrated in FIG. 19, which provides a zoomed-in look at the fragments of the reference and the output voltages shown in FIG. 18.

Figure 20:
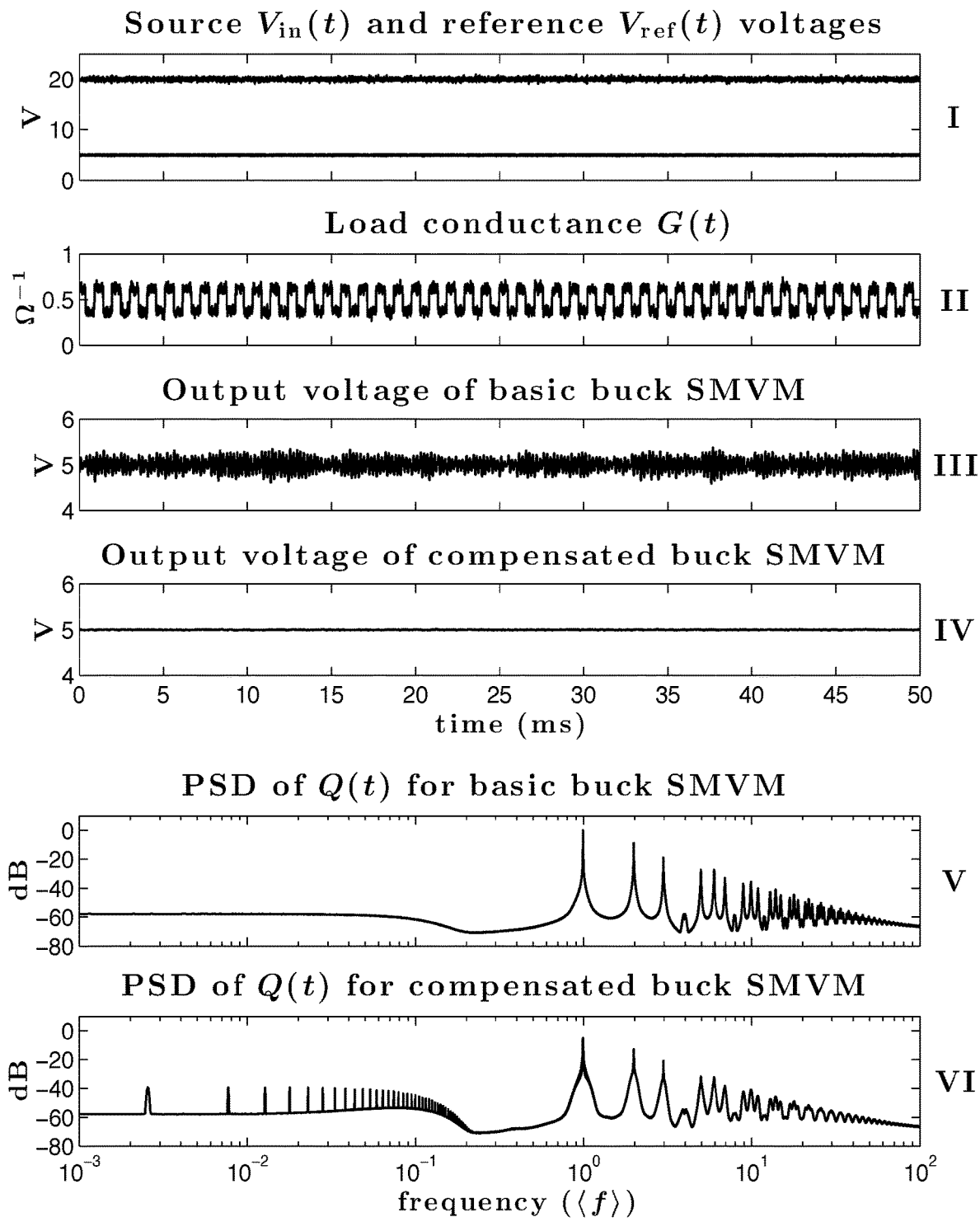
FIG. 20. Illustrative comparison, for the input and the reference voltages shown in panel I, and the load conductance shown in panel II, of the output voltages (panels III and IV) and the power spectral densities (PSDs) of Q(t) (panels V and VI) for a basic uncompensated buck SMVM (panels III and V), and for a regulated SMVM-based buck (panels IV and VI). The time parameter of the regulated SMVM-based buck is $\sqrt{LC}$ ($\alpha=1$), and the quality factor is $q=q_c=\frac{1}{2}$ (critically damped). The average switching frequency $\langle f \rangle$ is calculated according to equation (22).

One skilled in the art will notice that, for $\alpha=1$, the average switching frequency of such regulated buck SMVM may still be well approximated by equation (22), and relatively small distortions of the switching signal spectrum would be largely due to the mixed-in frequencies of the time-variant conductance, as illustrated in FIG. 20. This figure compares, for the input and the reference voltages shown in panel I, and the load conductance shown in panel II, the output voltages (panels III and IV) and the power spectral densities (PSDs) of Q(t) (panels V and VI) for a basic uncompensated buck SMVM (panels III and V), and for a regulated SMVM-based buck (panels IV and VI). The time parameter of the regulated SMVM-based buck is $\sqrt{LC}$ ($\alpha=1$), and the quality factor is $q=q_c=\frac{1}{2}$ (critically damped). The average switching frequency $\langle f \rangle$ is calculated according to equation (22).

This ability to assure a relatively stable and predictable operating (switching) frequency (e.g. constant in a time-invariant case) is yet another advantage of the disclosed regulation method over the state-of-art hysteretic control methods (see [7], for example).

For $\alpha \neq 1$, the average switching frequency of a regulated buck SMVM may be approximated by the following equation:

$$\langle f_\alpha \rangle \approx \frac{\alpha^2}{T} \frac{\langle V_{ref} \rangle}{\Delta h}\left(1 - \frac{\langle V_{ref} \rangle}{\langle V_{in} \rangle}\right) = \alpha^2 \langle f \rangle. \quad (33)$$

Figure 21:
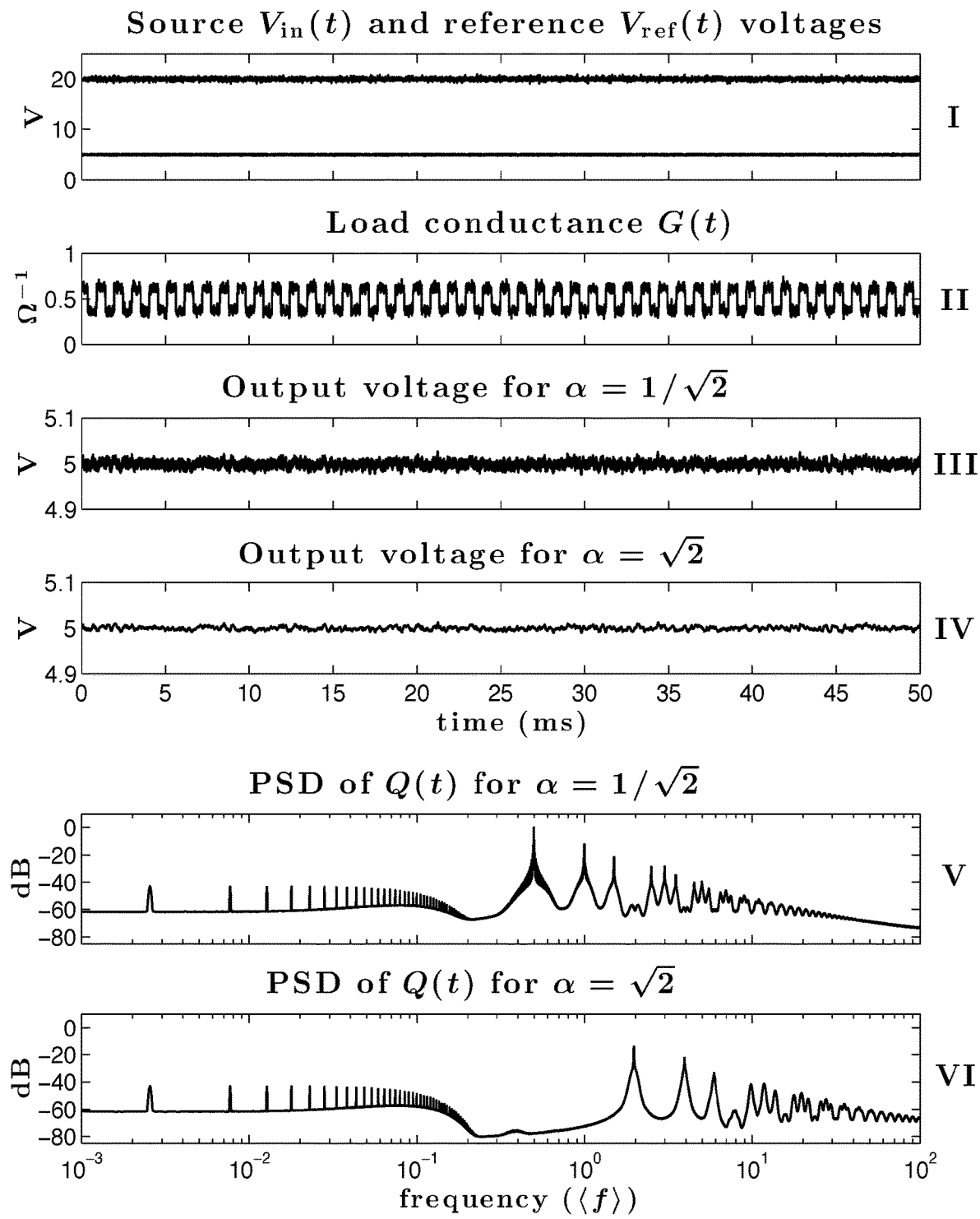
FIG. 21. Illustration of the approximation for the average switching frequency of a regulated SMVM-based buck according to equation (33).

This is illustrated in FIG. 21, where one should be able to see that the average switching frequency for $\alpha=1/\sqrt{2}$ is about $\langle f \rangle/2$, while the average switching frequency for $\alpha=\sqrt{2}$ is approximately $2\langle f \rangle$.

One should notice that, in order to consider the ripple voltage to be negligible, the switching frequency should be sufficiently high, for example, much higher than $(2\pi\sqrt{LC})^{-1}$, and thus $\alpha$ should not be too small. As a practical "rule of thumb" guideline, $\alpha$ should be of order unity or larger.

For given $\langle V_{in} \rangle$ and $\langle V_{ref} \rangle$, the dependence of the switching frequency expressed by equation (33) on the integrator time constant T, the hysteresis gap of the Schmitt trigger Δh, and the parameter α may allow one to design various procedures for a continuous-manner control of the converter operating frequency.

For example, let us assume that $\langle V_{in} \rangle$=20 V, $\langle V_{ref} \rangle$=5 V (i.e. 25% duty cycle), and τ=25 μs (e.g. 100 kΩ resistors and a 250 pF feedback capacitor in the integrator circuit shown in FIG. 16). Then for α=1 and Δh=1.5 V the average switching frequency would be $\langle f \rangle$=100 kHz. If we vary the hysteresis gap of the Schmitt trigger from 1.5 V to 0.3 V, we would be able to change the average switching frequency in the range from 100 kHz to 500 kHz.

If we double the parameter α (e.g., by doubling the values of the capacitor and the feedback resistor in the control signal circuit shown in FIG. 16), then the same variation in the hysteresis gap would result in the frequency range adjustment from 400 kHz to 2 MHz, which overlaps with the 100 kHz to 500 kHz range. Thus a combined range of a continuous switching frequency adjustment would be from 100 kHz to 2 MHz.

Further methods for controlling the converter operating frequency and/or the switching frequency spectrum are disclosed below in Section 1.3.

3.1 Additional Control of Switching Frequency/Spectrum

As was discussed earlier, the output voltage of an SMVM-based converter would approximate the reference voltage filtered with a 2nd order lowpass filter with the time parameter $\tau = \alpha\sqrt{LC}$ and the quality factor q set by the control circuit. Thus adding to the reference voltage a component with a frequency content that is negligible at low frequencies (e.g., $<(2\pi\tau)^{-1}$) and that may be noticeable at higher frequencies (e.g., $>>(2\pi\tau)^{-1}$) may not significantly affect the output voltage. Such a component, however, may noticeably affect the frequency composition of the switch control signal, as one skilled in the art will recognize by examining equations (21) and (22).

Figure 22:
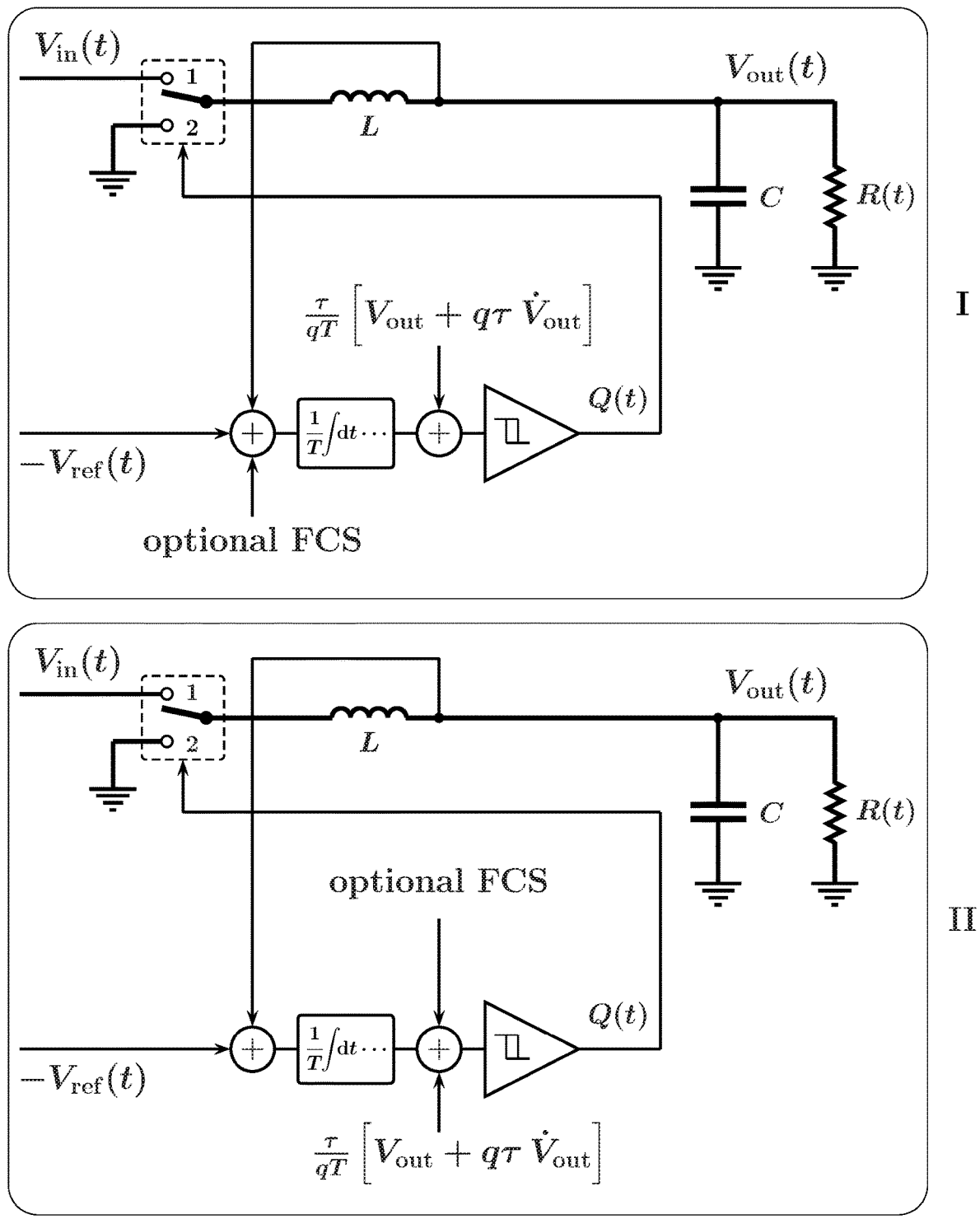
FIG. 22. Schematic illustration of the control of the switching frequency/spectrum by adding a frequency control signal (FCS) to the input of the integrator and/or of the Schmitt trigger in an SCC.

Thus the switching frequency/spectrum (and the resulting EMI) may be controlled, effectively without affecting the output voltage, by adding a frequency control signal (FCS) to the input of the integrator and/or of the Schmitt trigger in an SCC, as schematically illustrated in FIG. 22.

Figure 23:
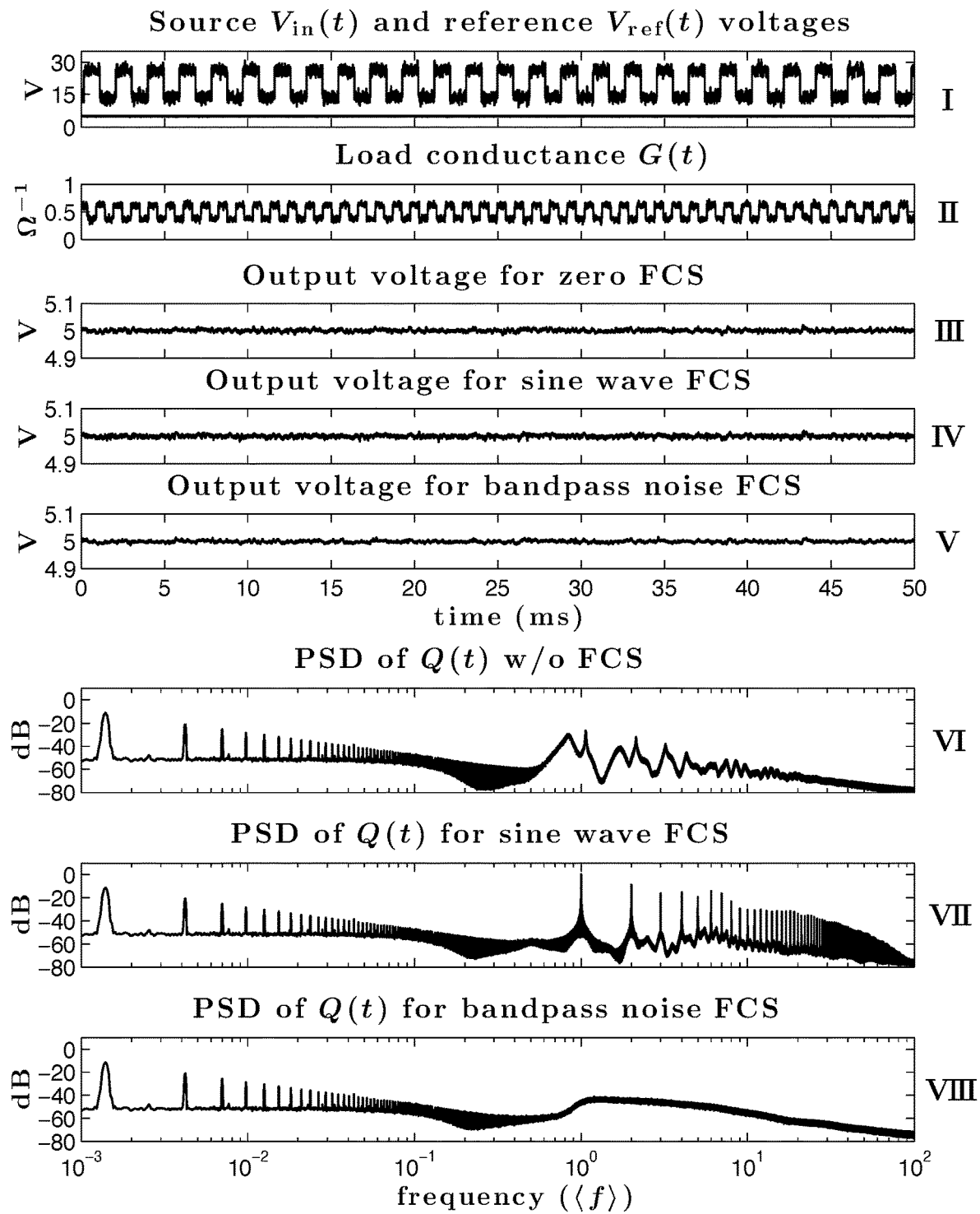
FIG. 23. Illustrative comparison of the performance, and of the switching signal spectra, for SMVM-based converters without an FCS, and with two different FCSs supplied to the input of the Schmitt trigger in an SCC (as shown in panel II of FIG. 22).

FIG. 23 provides illustrative comparison of the performance, and of the switching signal spectra, for SMVM-based converters without an FCS, and with two different FCSs supplied to the input of the Schmitt trigger in an SCC (as shown in panel II of FIG. 22). Panel I of FIG. 23 shows the input and the reference voltages. Note that the input voltage varies rapidly and significantly with time, while the reference voltage is approximately constant (a constant voltage with some band-limited white noise added). Panel II shows the load conductance, which varies rapidly and significantly with time.

Panels III and VI show the output voltage and the PSD of Q(t), respectively, for a converter without an FCS. Panels IV and VII show the output voltage and the PSD of Q(t), respectively, for the case when the FCS is a sine wave with the peak amplitude 2Δh and the frequency $\langle f \rangle$, supplied to the input of the Schmitt trigger in the SCC. Panels V and VIII show the output voltage and the PSD of Q(t), respectively, for the case when the FCS is a random white noise filtered with a bandpass filter with a center frequency around $\langle f \rangle$ and a bandwidth of approximately $\langle f \rangle/2$, supplied to the input of the Schmitt trigger in the SCC. The standard deviation of the bandpass noise FCS is about Δh/2.

One may see in panel VI of FIG. 23 that without an FCS the higher-frequency part of the switching signal spectrum comprises "harmonics" of the frequencies determined, according to equation (22), by the low and high levels of the input voltage, broadened by the noise present in the input voltage. With a sine wave FCS (panel VII), the higher-frequency part of the switching signal spectrum largely consists of harmonics of the fundamental frequency (f), and with a bandpass noise FCS (panel VIII) the higher-frequency part of the switching signal spectrum is a continuous ("diffuse") spectrum.

Figure 24:
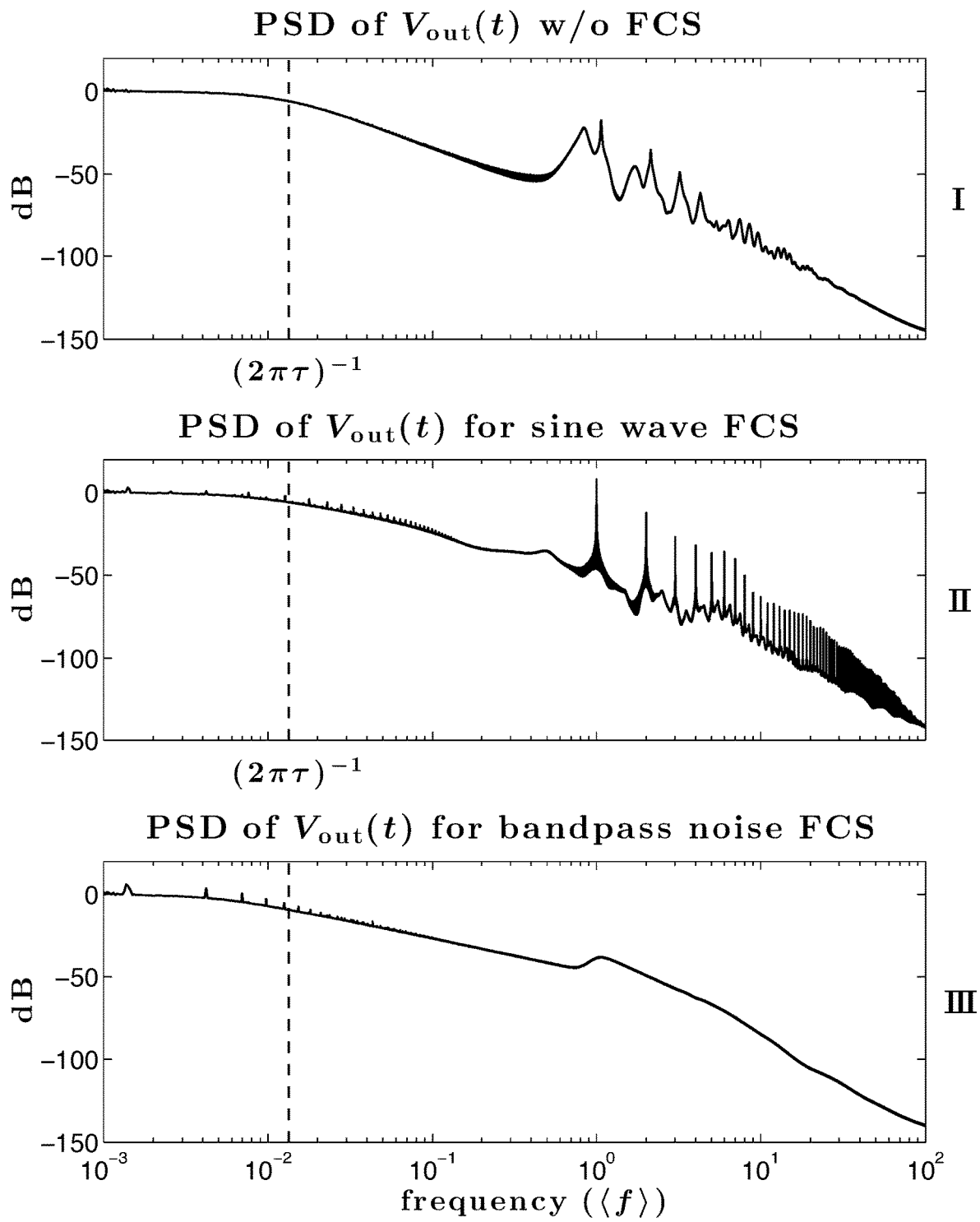
FIG. 24. The PSDs of the output voltages shown in panels III through V in FIG. 23.

Note that the lower-frequency content of the switching frequency spectrum in FIG. 23 would be determined by the time variances of the input voltage and the load conductance, and would be effectively independent of the frequency control signal and/or the absence thereof. While the power in this part of the switching spectrum may be relatively significant (e.g. for large and rapid variations in the input voltage and/or the load), these switching frequencies would be suppressed by the compensating SCC signal and would not effectively appear in the output voltage. This is illustrated in FIG. 24, which shows the PSDs of the output voltages shown in panels III through V in FIG. 23.

4 Simplified Active Compensation for Time Variability of the Load

It should be understood that the specific example of a mathematical description of an SMVM-based buck controller with simplified compensation for time variability of the load given below is presented for illustration only, as a descriptive language intended to convey the inventive idea clearly, and is not limitative of the claimed invention. Various changes and modifications within the spirit and scope of the invention should become apparent to those skilled in the art from this illustrative description.

Figure 25:
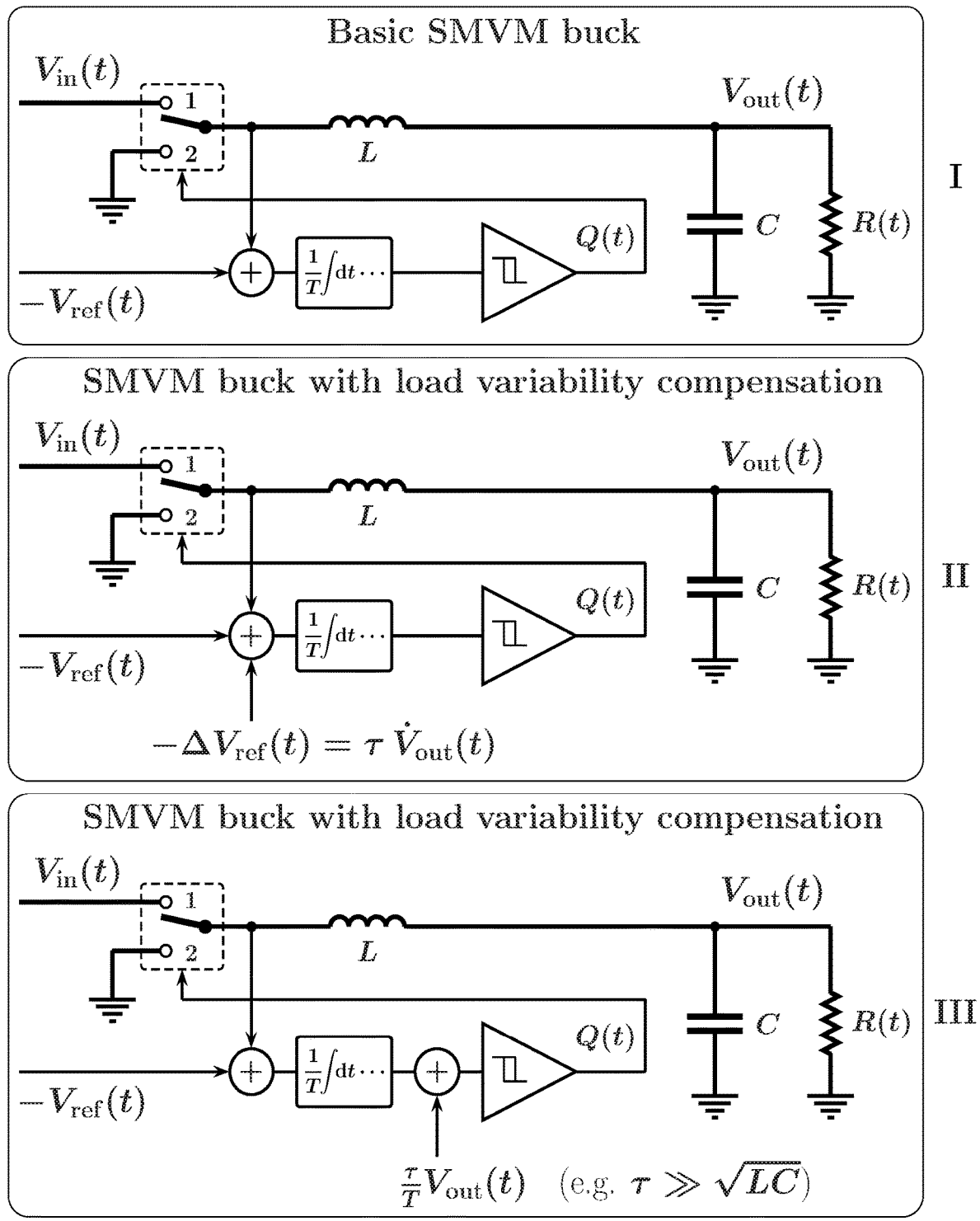
FIG. 25. A basic SMVM-based converter (panel I) and two equivalent configurations (panels II and III) compensating for time variance of the load.

Let us refer to the basic SMVM buck topology shown in the upper panel (panel I) of FIG. 25. In all panels of this figure, Q(t) is a two-level signal corresponding to the behavior of the switch (see, for example, equation (6)). When Q(t) is at a first level, the switch is in position "1", and when Q(t) is at a second level, the switch is in position "2".

As was discussed earlier, for a time-variant resistive load R(t) the "actual" output voltage $V_{out}(t)$ of this converter may be represented by the following differential equation:

$$V_{out}(t) = V_{ref}(t) + \underset{(actual)}{\Delta V(t)} - L\frac{d}{dt}\frac{V_{out}(t)}{R(t)} - LC\ddot{V}_{out}(t), \quad (34)$$

where ΔV(t) is a zero-mean voltage. If the switching frequency is sufficiently high, the contribution of this term into the output ("ripple") may be negligible.

Figure 27:
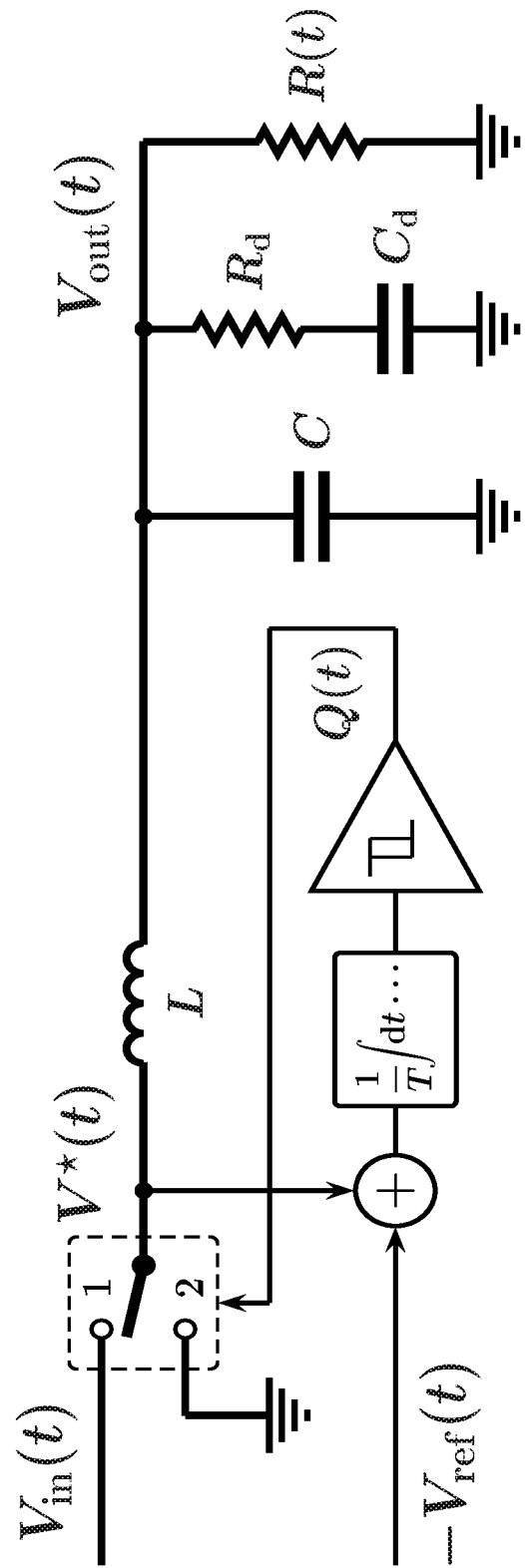
FIG. 27. An SMVM-based buck converter with passive compensation for time variance of the load.

When the load changes significantly and/or rapidly, the output voltage may contain transients that may be unacceptably strong. A simple way to ensure that the output filtering circuit remains overdamped and thus to reduce ("dampen") the unwanted transients may be by connecting, in parallel to the load, a simple passive circuit consisting of a large capacitor in series with an appropriately chosen resistor, as illustrated in FIG. 27. However, the value of the additional "damping" capacitor $C_d$ would need to be relatively large (e.g., at least 16 times larger than C), the value of the resistor $r_d$ would need to be chosen in a proper range determined by the values of C and $C_d$, and, while the transients may be "dampen", their magnitude may still be unacceptably large.

Let us now express a "desired" (or "designed") output as follows:

$$V_{out}(t) = V_{ref}(t) + \underset{\text{(desired)}}{\Delta V(t)} - \frac{d}{dt}\left\{\left[\frac{L}{R(t)} + \tau\right]V_{out}(t)\right\} - LC\ddot{V}_{out}(t), \quad (35)$$

where $\tau$ is a desired minimal time parameter of the filter. One should be able to see that, for a constant load of any value and for $\tau > 2\sqrt{LC}$, $V_{out}(t)$ would approximate the output of an overdamped 2nd order lowpass filter given the input $V_{ref}(t) + \Delta V(t)$.

One should be able to see from equation (35) that, if the total range of change in L/R(t) is of order of a full switching interval (for example, for the load change from 1Ω to an open circuit, for a 1 μH inductance and 1 MHz switching frequency), then the magnitude of a transient response to a change in the load would be of order of magnitude, or smaller, than the magnitude of the ripple voltage, regardless of the rate of change in the load. One should also be able to see that as $\tau$ increases, the output $V_{out}(t)$ would become less sensitive to time variability of the load R(t).

Let us further modify the reference signal by adding a control signal $\Delta V_{ref}(t)$ to the reference signal, in order to achieve the desired output corresponding to equation (35). Then the modified actual output of the converter may be represented by the following differential equation:

$$V_{out}(t) = V_{ref}(t) + \underset{\text{(modified actual)}}{\Delta V_{ref}(t) + \Delta V'(t)} - L\frac{d}{dt}\frac{V_{out}(t)}{R(t)} - LC\ddot{V}_{out}(t), \quad (36)$$

where $\Delta V'(t)$ is a zero-mean voltage.

Equating the desired (equation (35)) and the modified actual (equation (36)) outputs, and neglecting the change in the ripple voltage, one may arrive to the following expression for the control signal $\Delta V_{ref}(t)$:

$$\Delta V_{ref}(t) = -\tau \dot{V}_{out}(t). \quad (37)$$

Adding this control signal to the reference voltage, as shown in the middle panel (panel II) of FIG. 25, would ensure that the output voltage satisfies equation (35) and would follow the filtered reference voltage.

Figure 26:
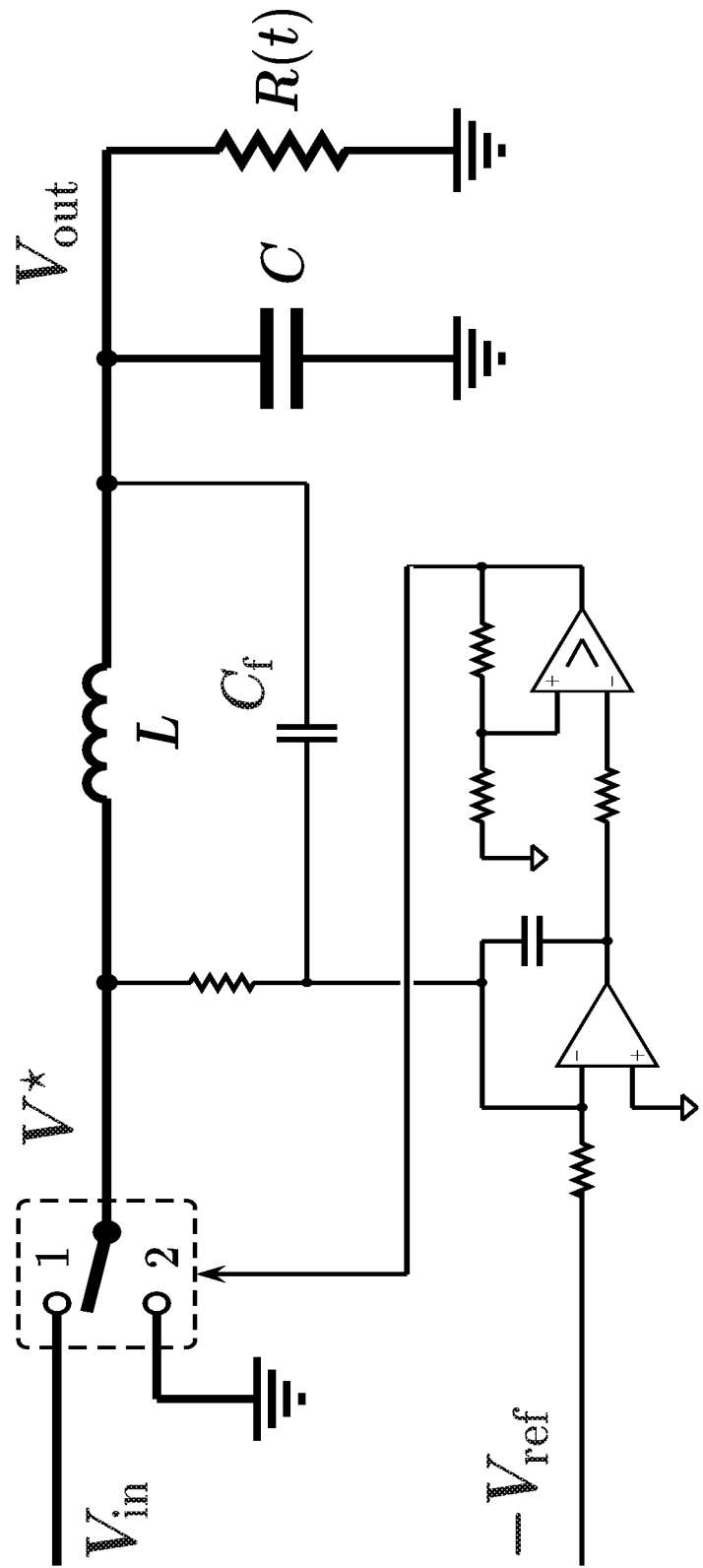
FIG. 26. Simplified example of an electronic circuit implementation of an SMVM buck converter with compensation for time variance of the load.

FIG. 26 provides a simplified example of an electronic circuit implementation of an SMVM buck converter with compensation for time variance of the load. In this figure, a signal proportional to a time derivative of the output voltage is supplied, by means of the capacitor $C_f$, to the integrator input. Thus compensation for time variability of the load is performed in a manner illustrated in panel II of FIG. 25.

Referring to the basic SMVM regulation principles discussed in Section 2 (see, for example, FIG. 13), an SMVM-based buck controller with simplified compensation for time variability of the load may also be constructed as schematically shown in the lower panel (panel III) of FIG. 25.

Note that, as schematically shown in the lower panel (panel III) of FIG. 25, compensation for time variability of the load may be simply achieved by adding a feedback of the output voltage ($\tau V_{out}(t)/T$) to the input of the Schmitt trigger.

One skilled in the art will recognize that, in practice, an integrator may be a simple active integrator, and, in some cases, a passive RC integrator. A slew rate of such an integrator may be relatively low (for example, <1 V/μs).

One skilled in the art will further recognize that, in a Schmitt trigger, only hysteresis gap Δh would be important, and the nominal threshold value and/or its long-term drifts may be irrelevant.

Further, a feedback of the output voltage provided to the input of the Schmitt trigger may be produced by a simple DC voltage amplifier with a relatively low bandwidth and/or slew rate (for example, <1 V/μs), and a relatively low gain τ/T (for example, of order 10, or of order 1 or smaller). In some cases, a passive resistive network may be used instead of an active amplifier. Since adding a constant bias voltage (e.g., $V_0$=const) to this feedback (e.g., adding $\tau[V_{out}(t)-V_0]/T$ instead of $\tau V_{out}(t)/T$ to the input of the Schmitt trigger) would not affect the output, such bias voltage may be used to ensure a proper output range of the amplifier. One skilled in the art will also recognize that the output may be tolerant to long-term drifts in the gain and/or the bias voltage.

4.1 Additional Control of Switching Frequency/Spectrum

As was discussed above, the output voltage of an SMVM-based converter disclosed in Section 4 would approximate the reference voltage filtered with a lowpass filter according to equation (35), with the time parameter T set by the control circuit. Thus adding to the reference voltage a component with a frequency content that is negligible at low frequencies (e.g., $<(2\pi\tau)^{-1}$) and that may be noticeable at higher frequencies (e.g., $>>(2\pi\tau)^{-1}$) may not significantly affect the output voltage. One skilled in the art will recognize, however, that such a component may noticeably affect the frequency composition of the switch control signal.

Figure 28:
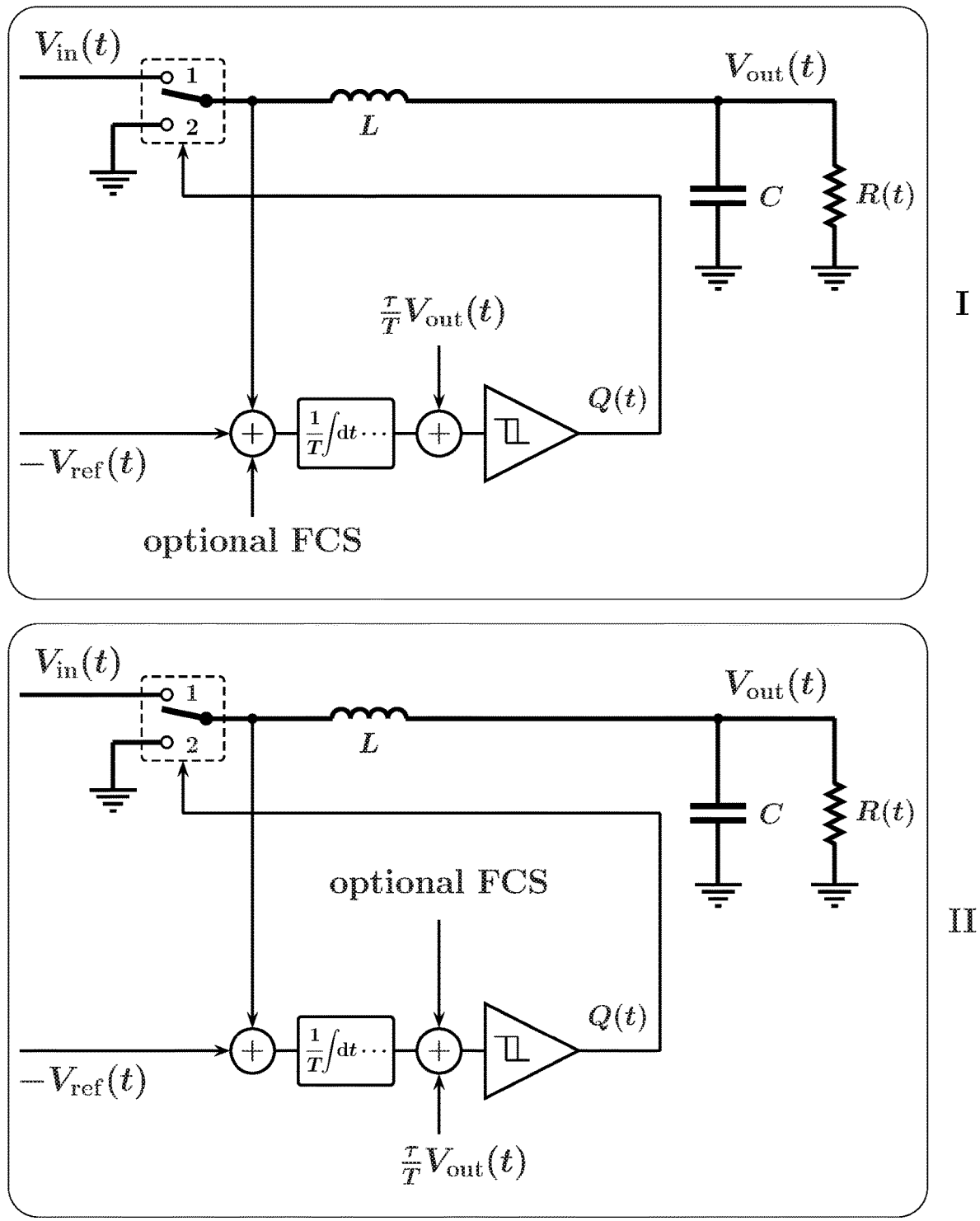
FIG. 28. Schematic illustration of the control of the switching frequency/spectrum by adding a frequency control signal (FCS) to the input of the integrator and/or of the Schmitt trigger in an SCC.

Thus the switching frequency/spectrum (and the resulting EMI) may be controlled, without effectively affecting the output voltage, by adding a frequency control signal (FCS) to the input of the integrator and/or of the Schmitt trigger in an SCC, as schematically illustrated in FIG. 28.

One skilled in the art will recognize that when an FCS is supplied to the input of the Schmitt trigger to fix, synchronize (e.g., with the frequency of an external device), or dither the switching frequency, said switching frequency may no longer depend on the integrator time constant T and the hysteresis gap Δh of the Schmitt trigger.

Figure 29:
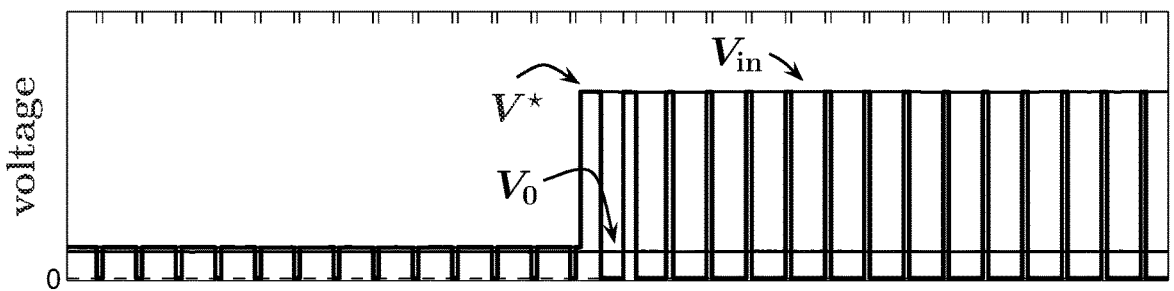
FIG. 29. Illustration of the signal and timing relations in SCCs where the FCSs provide switching with a period $T_0$, while the hysteresis gap $\Delta h$ is small so that the asymptotic value of $\langle f \rangle$ given by equation (22) is of order of magnitude larger than $T_0^{-1}$.
Figure 29:
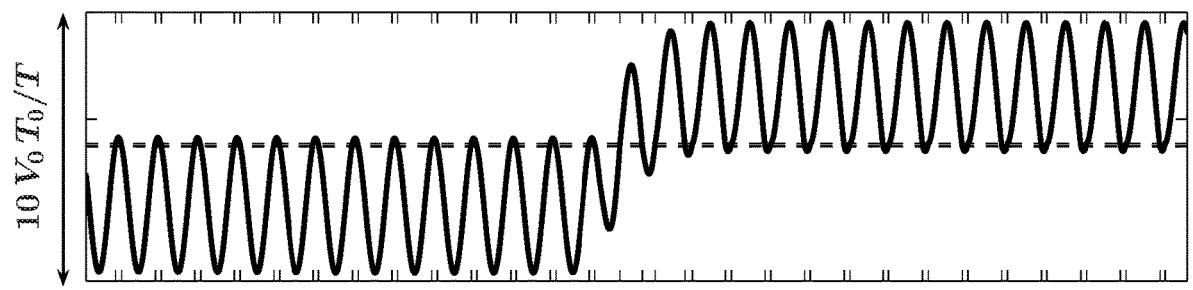
Figure 29:
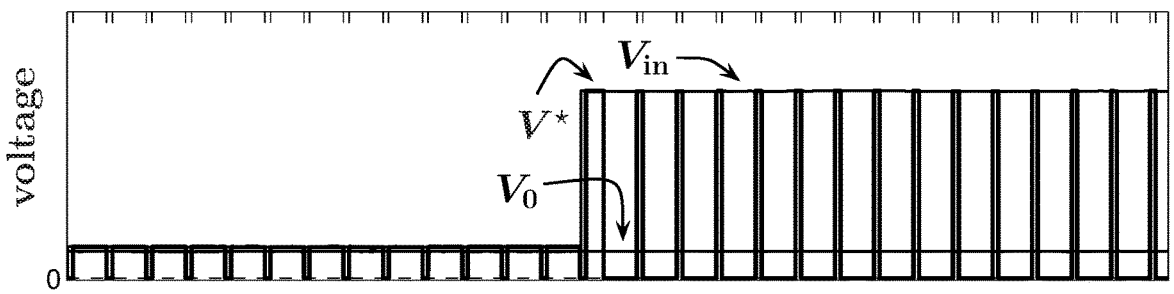
Figure 29:
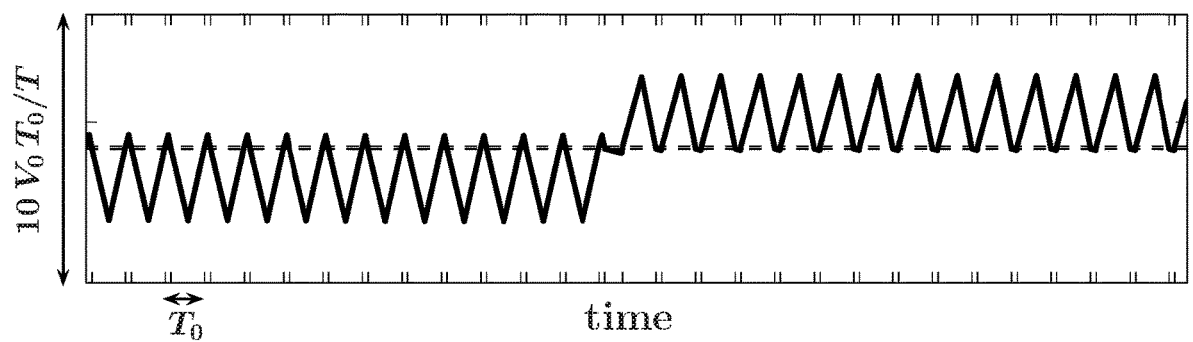

In particular, when an FCS is used, the hysteresis gap Δh may be made much smaller than otherwise would be needed, given the integrator time constant T and the source and reference voltages, to achieve the switching frequency of the FCS. This is illustrated in FIG. 29, where the FCSs provide switching with a period $T_0$, while the hysteresis gap Δh is small so that the asymptotic value of $\langle f \rangle$ (in the limit of large $V_{in}$) given by equation (22) is of order of magnitude larger than $T_0^{-1}$.

One skilled in the art will recognize that, if a periodic FCS with a period $T_0$ is used to set the switching frequency, the amplitude of such an FCS supplied to the input of the Schmitt trigger would be of order of several times $V_{ref}T_0/T$ to ensure a proper operation for wide $V_{in}/V_{out}$ differentials, and a DC offset of such an FCS, and/or long-term drifts of such an offset, would not be important.

When the hysteresis gap Δh in a Schmitt trigger is sufficiently small and/or is no longer a parameter affecting the performance of an SMVM-based controller, we may refer to such a Schmitt trigger simply as a comparator. In practice, a comparator would typically incorporate some hysteresis (for example, a small hysteresis of a few millivolts is integrated into many modern comparators, typically for desensitizing them from input noise and preventing the output oscillation). However, since such hysteresis may not be a parameter affecting the performance of an SMVM-based controller, using the term "comparator" instead of "Schmitt trigger" may be more appropriate.

While the integrator time constant T remains a parameter affecting an SMVM, its value may not need to be precisely/accurately defined, and, provided that other SMVM parameters incorporate appropriate error margins, its rather large variations from a nominal value (for example, ±50% variations) may not significantly affect the controller performance.

Figure 30:
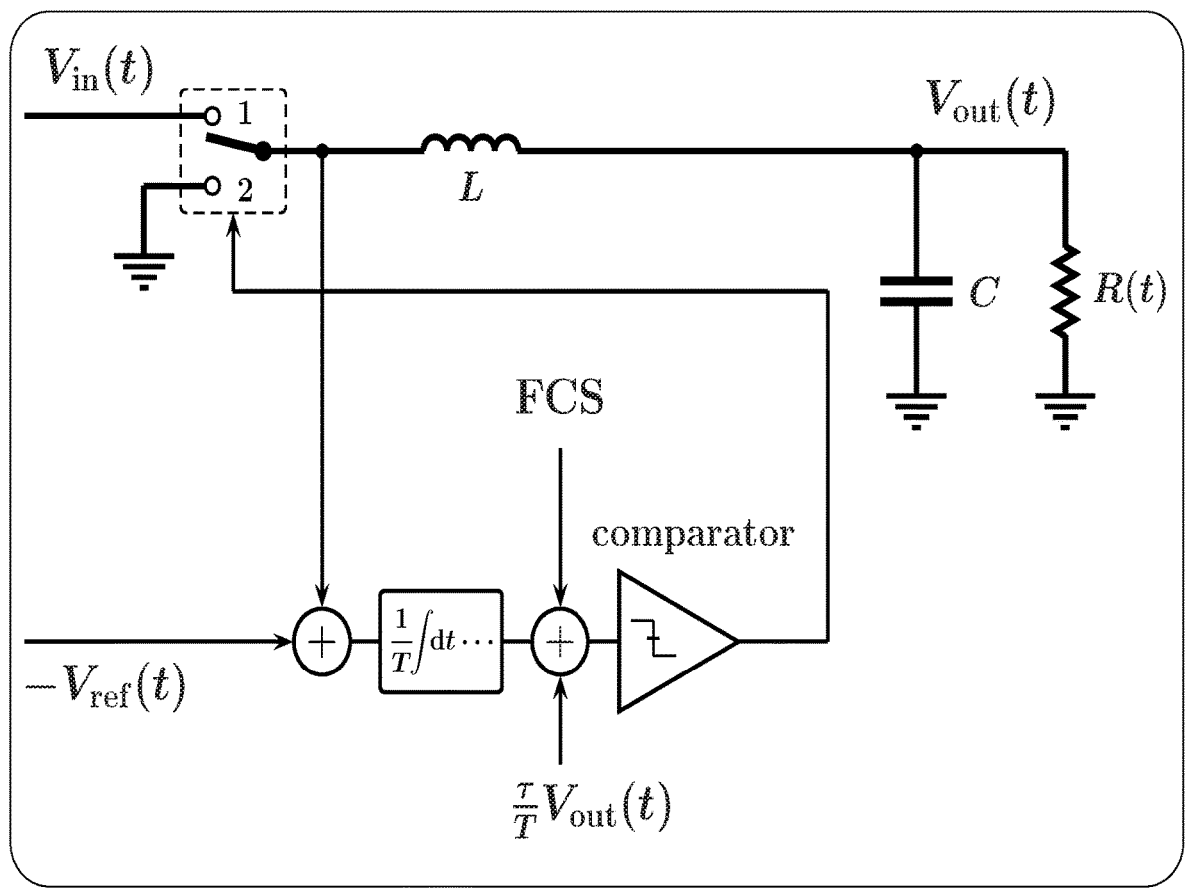
FIG. 30. SMVM-based buck controller with an FCS, and a comparator replacing the Schmitt trigger.

One skilled in the art will recognize that when a comparator rather than a Schmitt trigger characterized by a hysteresis is used in an SMVM, an FCS may no longer be an optional signal and may be required. This is illustrated in FIG. 30, where a Schmitt trigger is replaced by a comparator, and an FCS is no longer an optional signal.

4.2 Asynchronous Configuration

Figure 31:
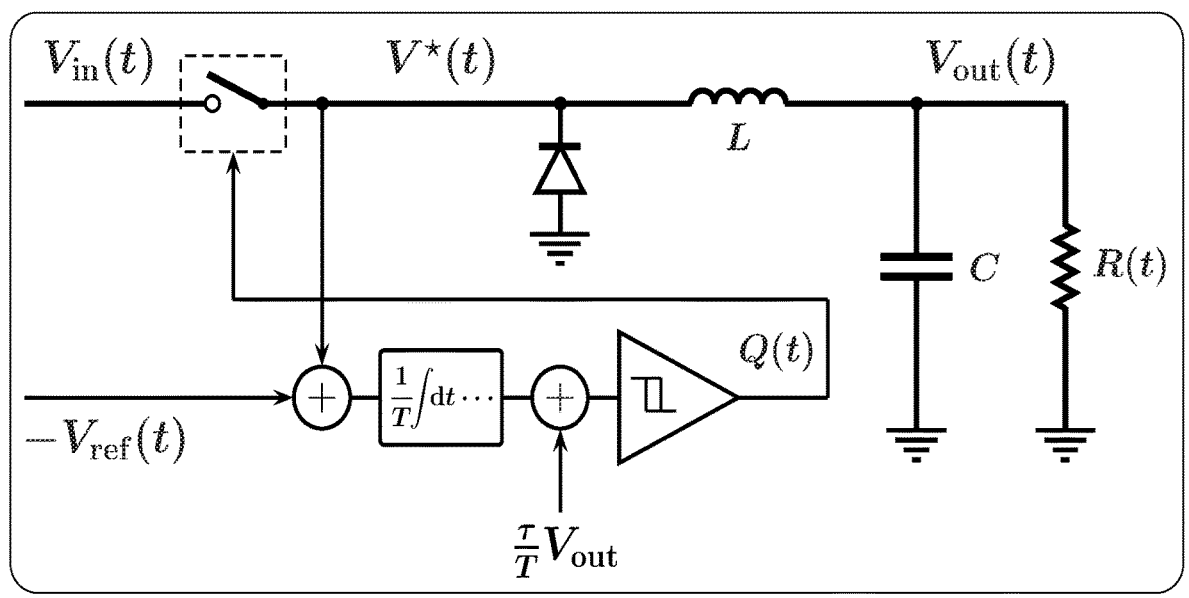
FIG. 31. Controller topology disclosed in Section 4 used for an asynchronous converter configuration.

It may be easily shown that the controller topology disclosed herein would remain unchanged for an asynchronous configuration illustrated in FIG. 31, and, neglecting the change in the ripple voltage, the main relations between the output and the reference voltages would still hold.

However, when the inductor current falls to zero, the diode would become reversed-biased and the switching voltage $V^*(t)$ would not fall to the forward "threshold" voltage of the diode during an "off" position of the switch. This would extend the "off" time of the switch, and thus at low/zero load currents (in discontinuous mode) such a controller would slow down/stop switching, entering a Power Save Mode (PSM).

4.3 Non-Zero ESRs of Components

Figure 32:
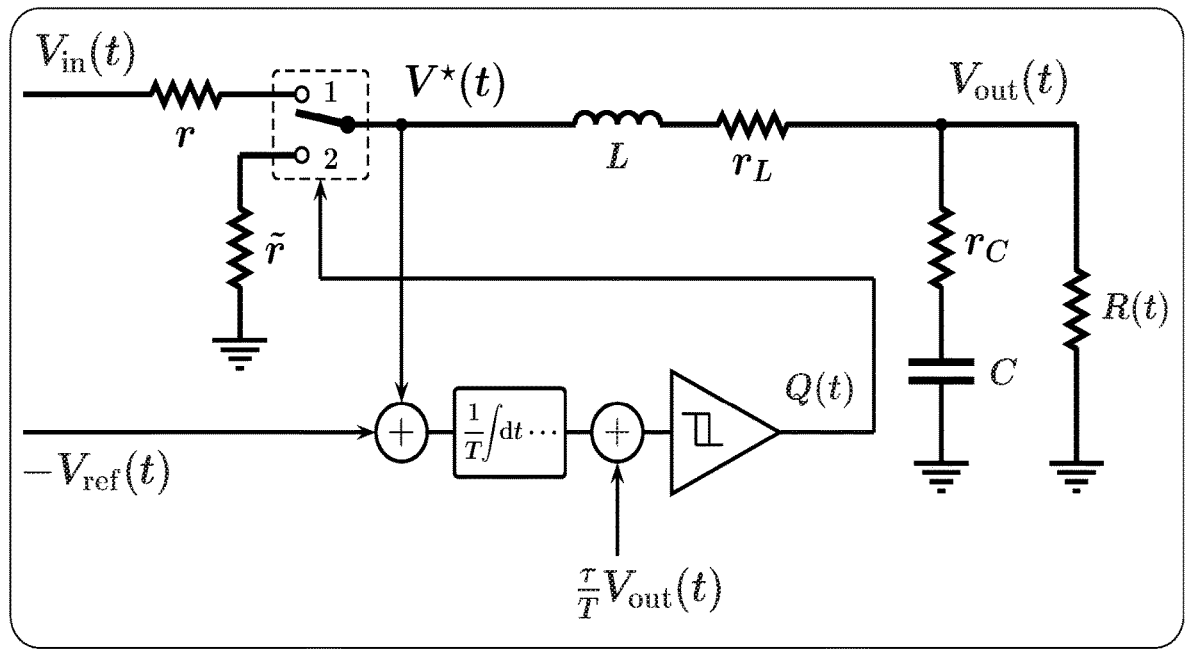
FIG. 32. Inclusion of non-zeros values of equivalent series resistances (ESRs) of the inductor, the capacitor, and the switch.

As one skilled in the art will recognize, the above analysis may be easily extended to include non-idealities of circuit components, for example, non-zeros values of equivalent series resistances (ESRs) of the inductor, the capacitor, and the switch, as illustrated in FIG. 32.

It may be shown that in this example, without added compensation signal $\tau V_{out}(t)/T$ for time variability of the load, the switching voltage $V^*(t)$ and the output voltage $V_{out}(t)$ may be related by the following differential equation:

$$\left(1 + r_C C \frac{d}{dt}\right) V^*(t) = A_0(t) V_{out}(t) + A_1(t) \dot{V}_{out}(t) + A_2(t) \ddot{V}_{out}(t), \tag{38}$$

where $$A_0(t) = 1 + r_L G(t) + (r_L r_C C + L) \dot{G}(t) + r_C LC \ddot{G}(t), \tag{39}$$

$$A_1(t) = (r_L + r_C)C + (r_L r_C C + L)G(t) + 2r_C LC \dot{G}(t), \tag{40}$$

and $$A_2(t) = [1 + r_C G(t)]LC, \tag{41}$$

and where $G(t) = R^{-1}(t)$ is the conductance of the load.

Since the switching voltage $V^*(t)$ relates to the reference voltage $V_{ref}(t)$ according to equation (17), the left-hand side of equation (38) may be expressed as $$\left(1 + r_C C \frac{d}{dt}\right) V^*(t) = V_{ref}(t) + \Delta V'(t), \tag{42}$$

where $\Delta V'(t)$ is a zero-mean voltage component.

It may be further shown that, in this example, when the time variability of the load compensation signal $\tau V_{out}(t)/T$ is added to the input of the Schmitt trigger, the relation between the output and the reference voltages may be approximated, for $r_L \ll R(t)$ and a wide range of practically reasonable other values, as $$V_{out}(t) \approx A_0(t) V_{ref} + \Delta V''(t) - \tau \dot{V}_{out}(t) - LC \ddot{V}_{out}(t), \tag{43}$$

where $\Delta V''(t)$ is a zero-mean voltage, and $$A_0(t) \approx 1 - \frac{r_L}{R(t)}. \tag{44}$$

Thus, for example, for a constant or sufficiently slowly varying reference voltage, and neglecting the ripple voltage, $$V_{out}(t) \approx V_{ref} \times \left[1 - \frac{r_L}{R(t)}\right] \approx V_{ref} \tag{45}$$

for $r_L \ll R(t)$ and a wide range of practically reasonable other values.

As one may see from equation (45), neglecting the ripple voltage (and transient responses to changes in the load, which may be made comparable with or smaller than the ripple voltage), such an SMVM-based converter would be akin to a voltage source with the EMF $\varepsilon = V_{ref}$ and the internal resistance $r_L$. One may also see that the capacitor ESR $r_C$ would affect the ripple magnitude, but not stability of the SMVM regulation.

4.3.1 Compensation for Inductor DCR

Figure 33:
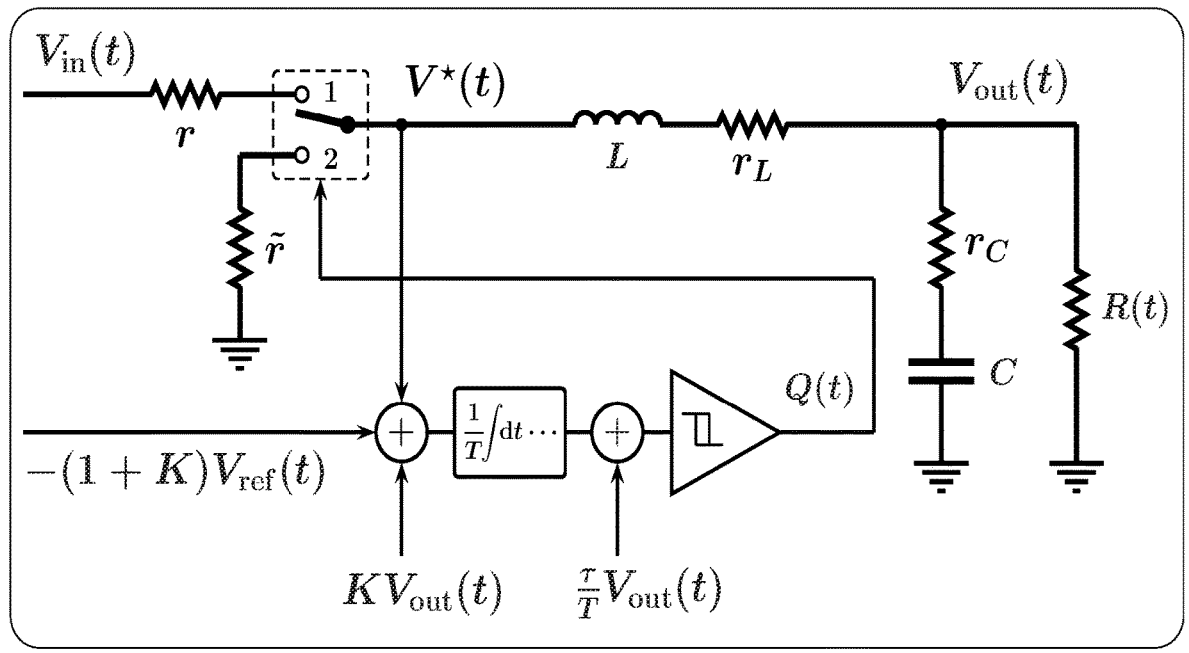
FIG. 33. Illustration of added compensation for an ohmic drop across inductor DCR to the SMVM-based buck controller shown in FIG. 32.
Figure 34:
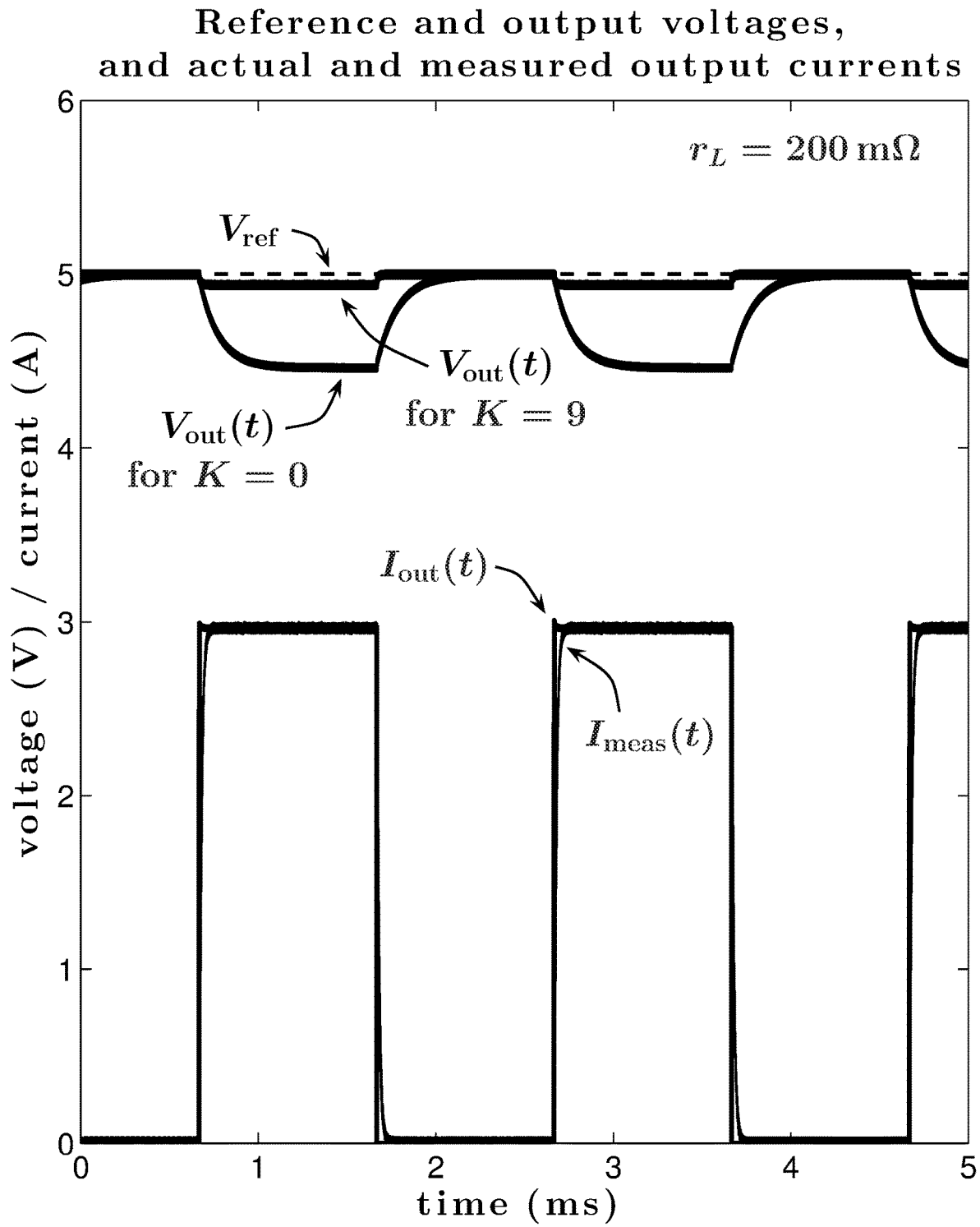
FIG. 34. Comparison of the output voltages for SMVMs with and without DCR compensation, and the actual $I_{out}(t)$ and measured $I_{meas}(t)$ load currents, for the DCR value $r_L$=200 m$\Omega$.

To compensate for an ohmic drop across inductor DCR, a voltage proportional to a difference between the output voltage $V_{out}(t)$ and the reference voltage $V_{ref}$ may be added to the integrator input, as illustrated in FIG. 33. Provided that the parameter $\tau$ is sufficiently large, the coefficient K may be relatively large, for example, much larger than unity.

Then the output voltage of the converter may still be approximated by equation (43), where the DC gain $A_0(t)$ may now be given by $$A_0(t) \approx 1 - \frac{1}{K+1} \frac{r_L}{R(t)}. \tag{46}$$

Then for a constant or sufficiently slowly varying reference voltage, and neglecting the ripple voltage, the output voltage may be approximated as $$V_{out}(t) \approx V_{ref} \times \left[1 - \alpha \frac{r_L}{R(t)}\right] \approx V_{ref}, \tag{47}$$

where $\alpha = 1/(K+1)$. As one may see from equation (47), neglecting the ripple voltage and the transient responses to changes in the load, such an SMVM-based converter would be akin to a voltage source with the EMF $\varepsilon = V_{ref}$ and the internal resistance $\alpha r_L$, where $\alpha$ may be much smaller than unity for a sufficiently large K.

One may notice that the DCR compensation term $\Delta V_{ref}(t) = K[V_{ref} - V_{out}(t)]$ is added to the reference voltage at the integrator input, and thus this voltage may be directly available internally in a hardware implementation of an SMVM controller. Then, from equation (47), one may express the load current $I_{out}(t)$ as $$I_{out}(t) = \frac{V_{out}(t)}{R(t)} \approx I_{meas}(t) = \frac{K+1}{K} \frac{h(t) * \Delta V_{ref}(t)}{r_L}, \quad (48)$$

where h(t) is an impulse response of a unity-gain lowpass filter of an appropriate bandwidth (e.g., with a cut-off frequency sufficiently below the switching frequency), and the asterisk denotes convolution. A lowpass filter would be needed to suppress large "ripples" in $\Delta V_{ref}(t)$ resulting from high values of the gain K. In practice, such a filter may be a simple passive RC filter.

Thus, in an SMVM-based buck converter with DCR compensation, an inductor with a known DCR may be used to measure the load current without extra dissipation. This may be used, for example, to disable the high-side switch for overload protection, and/or to enable discontinuous (power save) mode at light loads.

FIG. 33 compares the output voltages for SMVMs with and without DCR compensation, and the actual $I_{out}(t)$ and measured $I_{meas}(t)$ load currents, for the DCR value $r_L = 200$ mΩ. One may see in the figure that the DCR compensation with K=9 effectively reduces the apparent inductor DCR by a factor of 10 (from 200 mΩ to 20 mΩ), reducing the voltage droop and the duration of transients by the same factor (e.g. from 600 mV to 60 mV). One may also see that the current measured according to equation (48) indeed approximates the actual load current.

It may be also noted that, when a DCR compensation is used in an SMVM-based buck converter to reduce the voltage droop, the value of the parameter $\tau$ may need to be increased (for example, so that $\tau > 2(K+1)\sqrt{LC}$) in order to avoid transient overshoots/undershoots in the output voltage.

Figure 35:
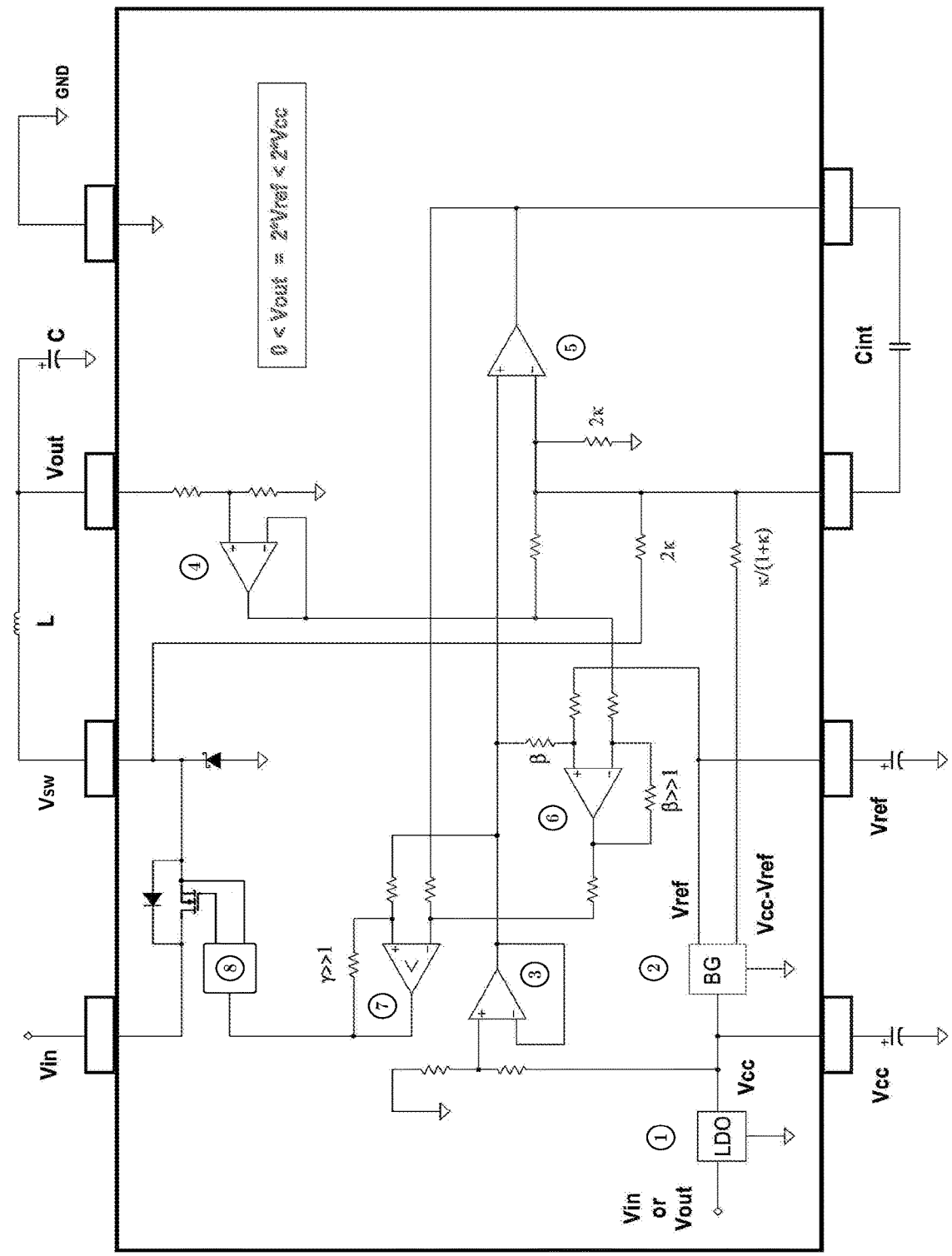
FIG. 35. Example of implementation of an SMVM-based buck converter in an electronic circuit.

4.4 Example of Implementation of an SMVM-Based Buck Converter in an Electronic Circuit FIG. 35 provides an example of implementation of an SMVM-based buck converter in an electronic circuit. This example is provided as an illustration only, and is not limitative of the claimed invention. Various changes and modifications within the spirit and scope of the invention should become apparent to those skilled in the art from this illustrative example.

In the example of FIG. 35, the operational amplifiers (op-amps) are single-supply op-amps powered from a voltage source Vcc, and the unmarked resistors may be assumed to have resistance r. When a resistor is labeled, its resistance would be modified by the factor shown next to the resistor. For example, the resistor labeled with $\beta$ would have the resistance $\beta r$.

The voltage Vcc is supplied by the low-dropout regulator 1 that may be powered by the supply voltage Vin or, if the output voltage Vout is sufficiently larger than Vcc, by the output voltage Vout. The (bandgap) voltage reference circuit 2 provides the reference voltage Vref (Vref<Vcc), and the voltage equal to the difference Vcc−Vref (Vcc−Vref>0).

The op-amp 3 provides a virtual ground equal to Vcc/2 to other components of the circuit. The op-amp 4 provides voltage equal to Vout/2 to the inputs of the op-amps 5 and 7, and enables the output voltage to be in the range 0<Vout=2Vref<2Vcc.

The op-amp 5 is configured as an active integrator, and the resistive network at its input is configured in such a way that the input to this integrator comprises (1) a difference between the switching voltage Vsw (the voltage at the pole of the switch) and twice the reference voltage 2Vref, and (2) a difference between the output voltage Vout and twice the reference voltage 2Vref. As discussed in Section 4.3, providing the latter difference to the integrator input is an optional step to compensate, if needed, for a non-zero inductor DCR. The integrator time constant T would be determined by the resistor 2κ and the value of the capacitor Cint, and may be calculated as $\tau = 2\kappa\, r\, C_{int}$.

It may be noted that the gain-bandwidth product of the integrator would be inversely proportional to T, and would be relatively small in practice, much smaller than the switching frequency. The minimum required slew rate of the integrator output would be determined by the hysteresis gap of the Schmitt trigger, the switching frequency, and the duty cycle, and would be typically moderate or small. For example, for a hysteresis gap 100 mV, a 1 MHz switching frequency, and a 10% duty cycle, the slew rate would need to be a moderate 1 V/μs or larger, while for the same switching frequency and the duty cycle, but a 10 mV hysteresis gap, the slew rate would need to be only 100 mV/μs.

The op-amp 6 provides a feedback of the output voltage Vout to the input of the Schmitt trigger, to compensate for time variability of the load. In this particular example, the op-amp 6 is configured as a difference amplifier that outputs voltage proportional to the difference between the output voltage Vout and twice the reference voltage 2Vref, and thus this feedback is given by a difference between the output voltage Vout and twice the reference voltage 2Vref. This is done to simply ensure that the output of the amplifier remains in the neighborhood of the virtual ground Vcc/2 during normal operation, and not for measuring the difference between the output and the reference. Thus a constant bias voltage somewhat different from Vref may be supplied.

It may be noted that the slew rate of the difference amplifier may need to be of the same order as (or higher then) the slew rate of the integrator output, to ensure a fast response to the dynamic changes in the load. It may also be noted that, while the bandwidth of the difference amplifier may need to be much larger than the bandwidth of the output LC circuit, for a high-gain amplifier it may be beneficial that this bandwidth remains (much) smaller than the switching frequency, so that the ripple voltage is not unduly amplified. As a practical "rule of thumb" guideline, the bandwidth of the difference amplifier may be chosen as $\approx 1/\sqrt{LC}$, and thus would be relatively small. In the example of FIG. 35, this bandwidth may be reduced by placing a (small) capacitor in parallel to the negative feedback resistor of the op-amp 6.

The (comparator) op-amp 7 is configured as a Schmitt trigger, with the hysteresis gap determined by the value of the positive feedback resistor (labeled $\gamma$) and the voltage Vcc.

As may be seen in FIG. 35, the input to the Schmitt trigger comprises (1) the integrated difference between the switching voltage Vsw and twice the reference voltage 2Vref (part of the output of the op-amp 5), (2) the feedback of the output voltage Vout (the output of the op-amp 6), and (3) the integrated difference between the output voltage Vout and twice the reference voltage 2Vref (part of the output of the op-amp 5). As discussed in Section 4.3, the latter voltage is an optional signal to compensate, if needed, for a non-zero inductor DCR.

As discussed in Sections 1.3, 3.1, and 4.1, the input to the Schmitt trigger may additionally comprise an optional frequency control signal (FCS) that may stabilize or dither switching frequency without significantly affecting the output.

The output of the Schmitt trigger provides a control (logic) signal to the driving circuit 8 that controls the MOSFET transistor acting as a high-side switch (first throw of the switch), and turns this transistor "on" or "off" depending on the output of the Schmitt trigger.

In the example of FIG. 35, an asynchronous configuration of a buck converter is used, and a Schottky diode is used for the low-side switch (second throw of the switch). As discussed in Section 4.2, at low/zero load currents (in discontinuous mode) such a converter would slow down/stop switching, entering a Power Save Mode (PSM), while maintaining a regulated output.

Figure 36:
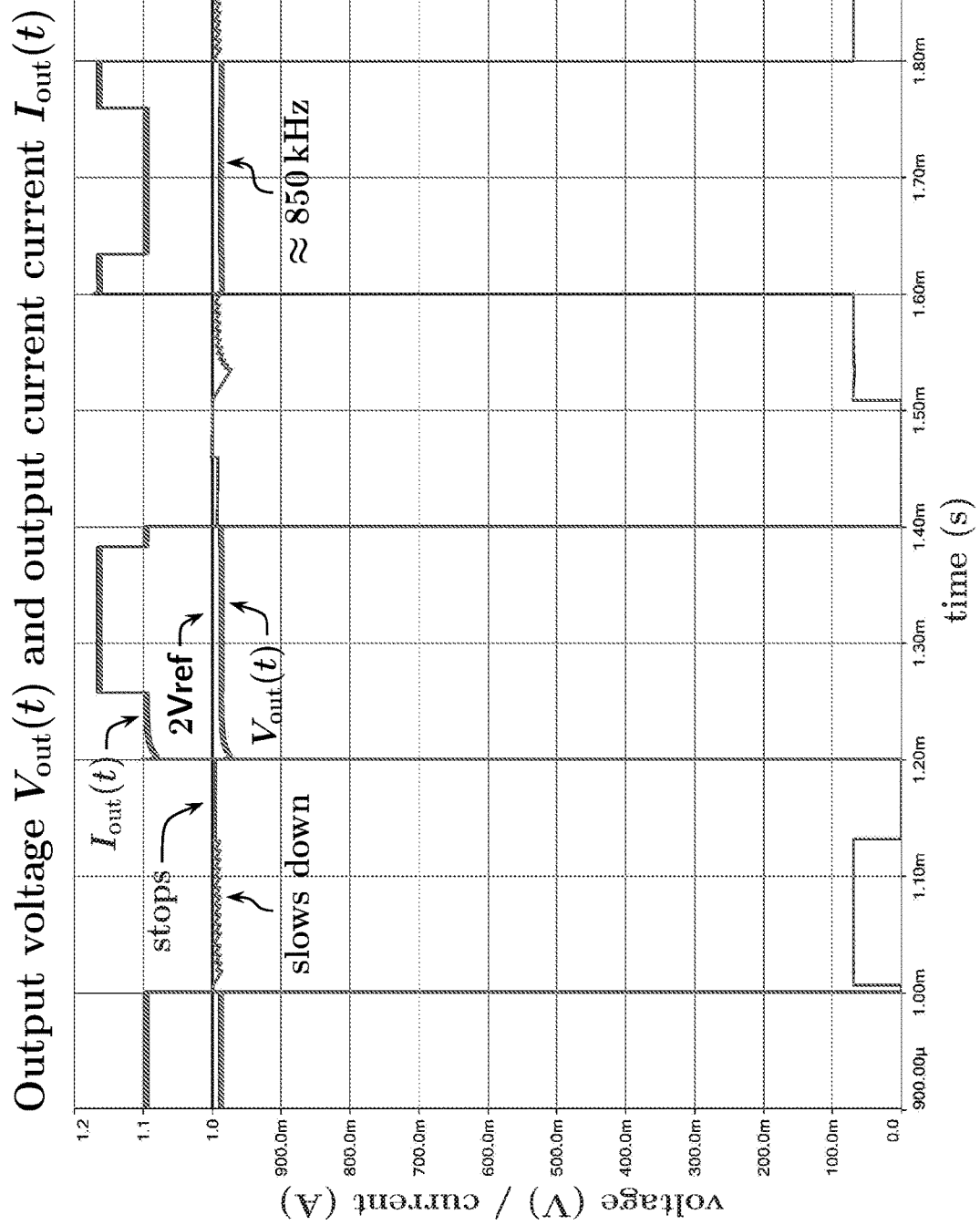
FIG. 36. Example of the output voltage $V_{out}(t)$ and the output current $I_{out}(t)$ of the circuit shown in FIG. 35 converting a 24±4 V input voltage Vin down to 1 V Vout (Vref=0.5 V).

FIG. 36 provides an example of the output voltage $V_{out}(t)$ and the output current $I_{out}(t)$ of the circuit shown in FIG. 35 converting a 24±4 V input voltage Vin down to 1 V Vout (Vref=0.5 V). The circuit parameters are as follows: r=10 kΩ, β=10, κ=3, γ=100; Vcc=5 V, Cint=360 pF, L=1.5 µH (100 mΩ DCR), C=68 µF (5 mΩ ESR), and the nominal switching frequency is about 850 kHz.

One may see in FIG. 36 that at low/zero load currents (in discontinuous mode) this converter slows down/stops switching, while maintaining a regulated output.

Figure 37:
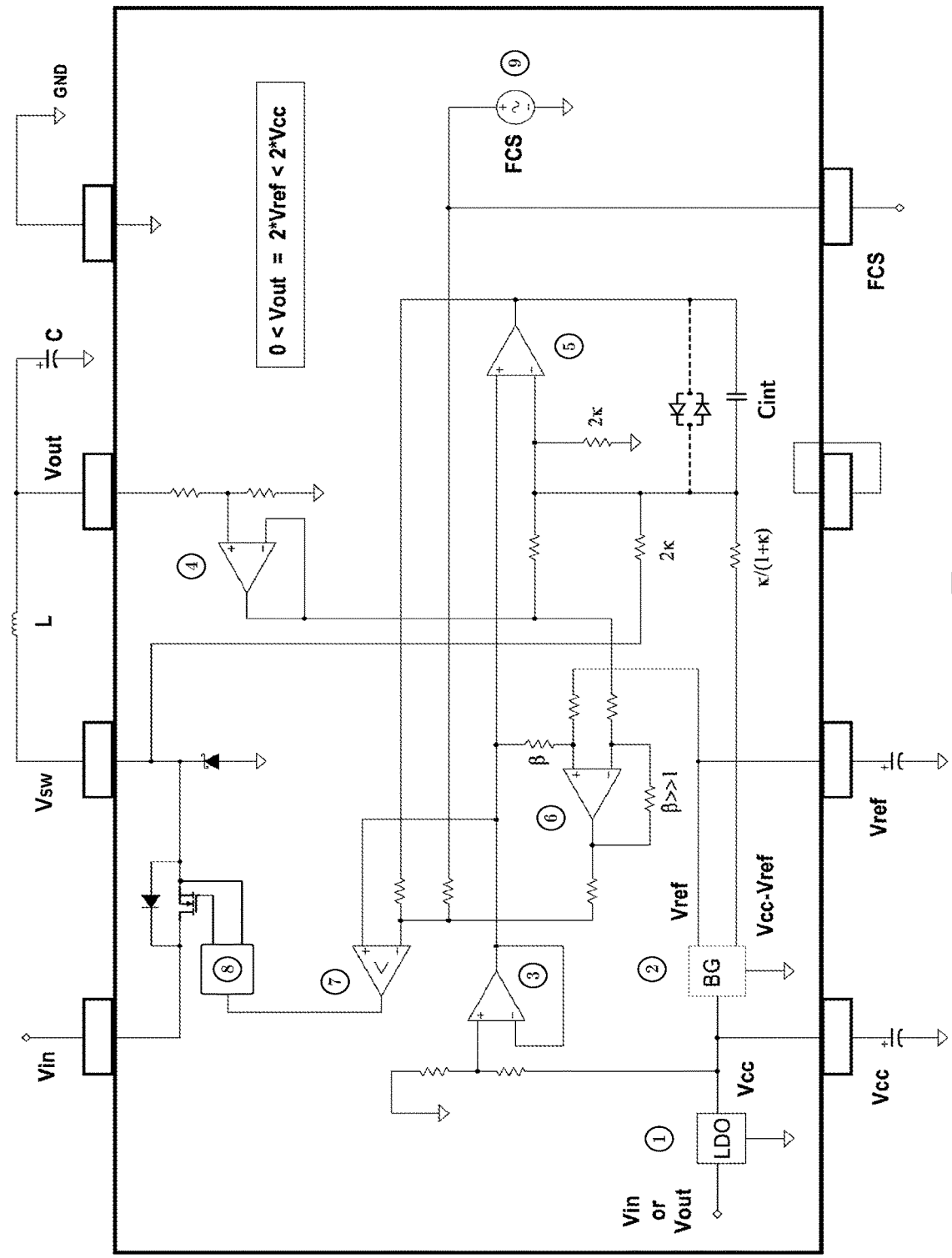
FIG. 37. Modification of the circuit shown in FIG. 35, where the Schmitt trigger is a comparator, and where the input to the comparator additionally comprises an FCS.

FIG. 37 illustrates a modification of the circuit shown in FIG. 35, where the Schmitt trigger is a comparator (op-amp 7), and where, as discussed in Sections 1.3, 3.1, and 4.1, the input to the comparator additionally comprises an FCS 9 that may stabilize or dither switching frequency without significantly affecting the output.

When a constant-frequency FCS is used, in a certain load range (in discontinuous mode, but sufficiently close to a continuous mode) such a converter may operate at reduced duty cycles, while maintaining the switching frequency set by the FCS. Thus a transition from a CCM to a DCM may be made without increase in the ripples of the output voltage.

The diodes shown in the integrator feedback in FIG. 37 may improve the integrator recovery time for the conditions when the load current is zero or nearly zero, and/or when the source voltage drops below the reference voltage.

Figure 38:
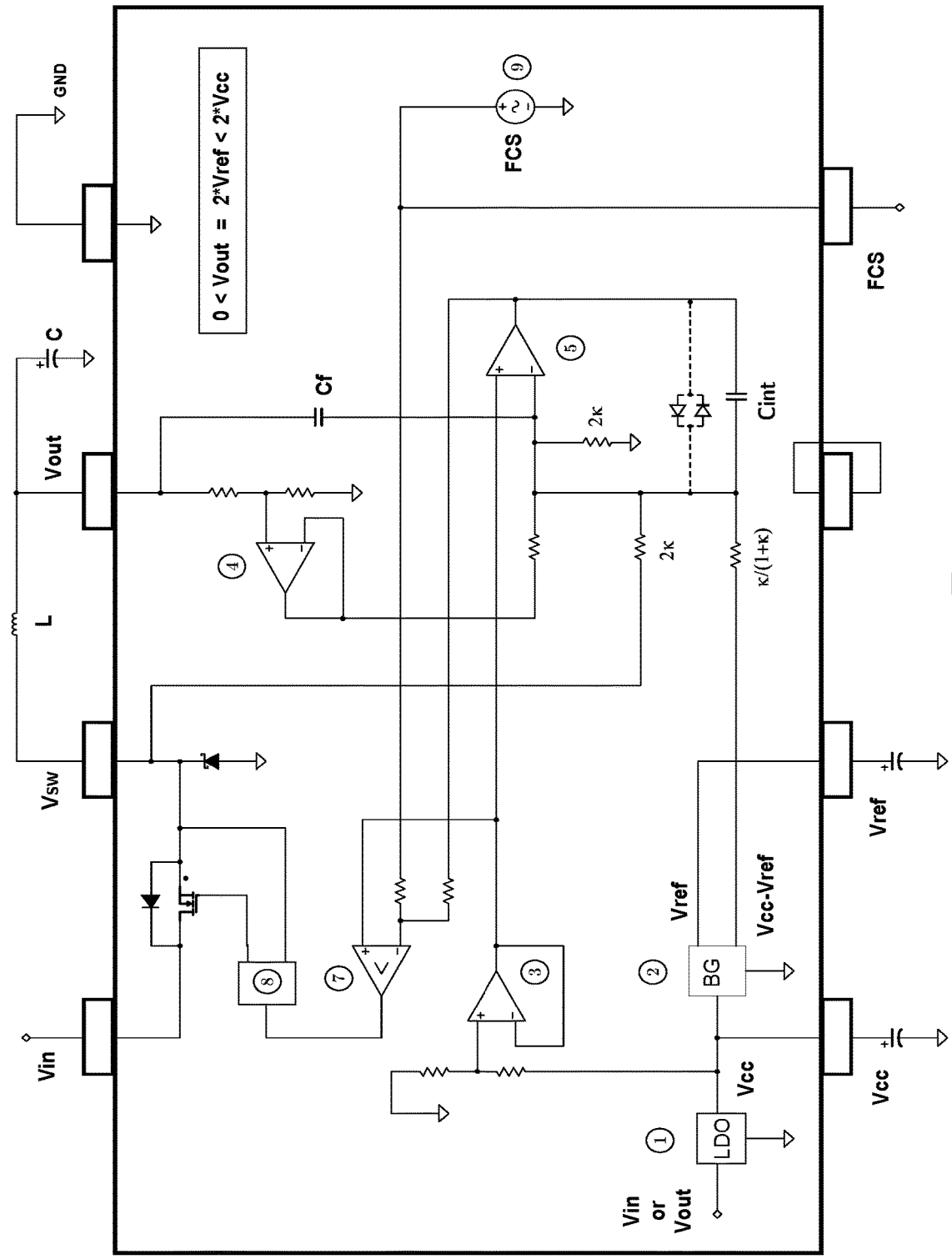
FIG. 38. Modification of the circuit shown in FIG. 37, where compensation for time variability of the load is performed in a manner illustrated in panel II of FIG. 25.

FIG. 38 illustrates a modification of the circuit shown in FIG. 37. In this figure, instead of supplying a proportional feedback of the output voltage Vout to the input of the comparator, a signal proportional to a time derivative of the output voltage is supplied, by means of the capacitor Cf, to the integrator input. Thus compensation for time variability of the load is performed in a manner illustrated in panel II of FIG. 25.

5 SMVM Controllers for Boost and Buck-Boost Converters

The SMVM regulation topology may be adapted for control of other types of switched-mode DC-DC converters, such as boost and buck-boost converters (see, for example, panels II and III of FIG. 1). For example, FIG. 39 summarizes three different SMVM-based controller configurations, used in a buck (panel I), a boost (panel II), and a buck-boost (panel III) converter.

Figure 39:
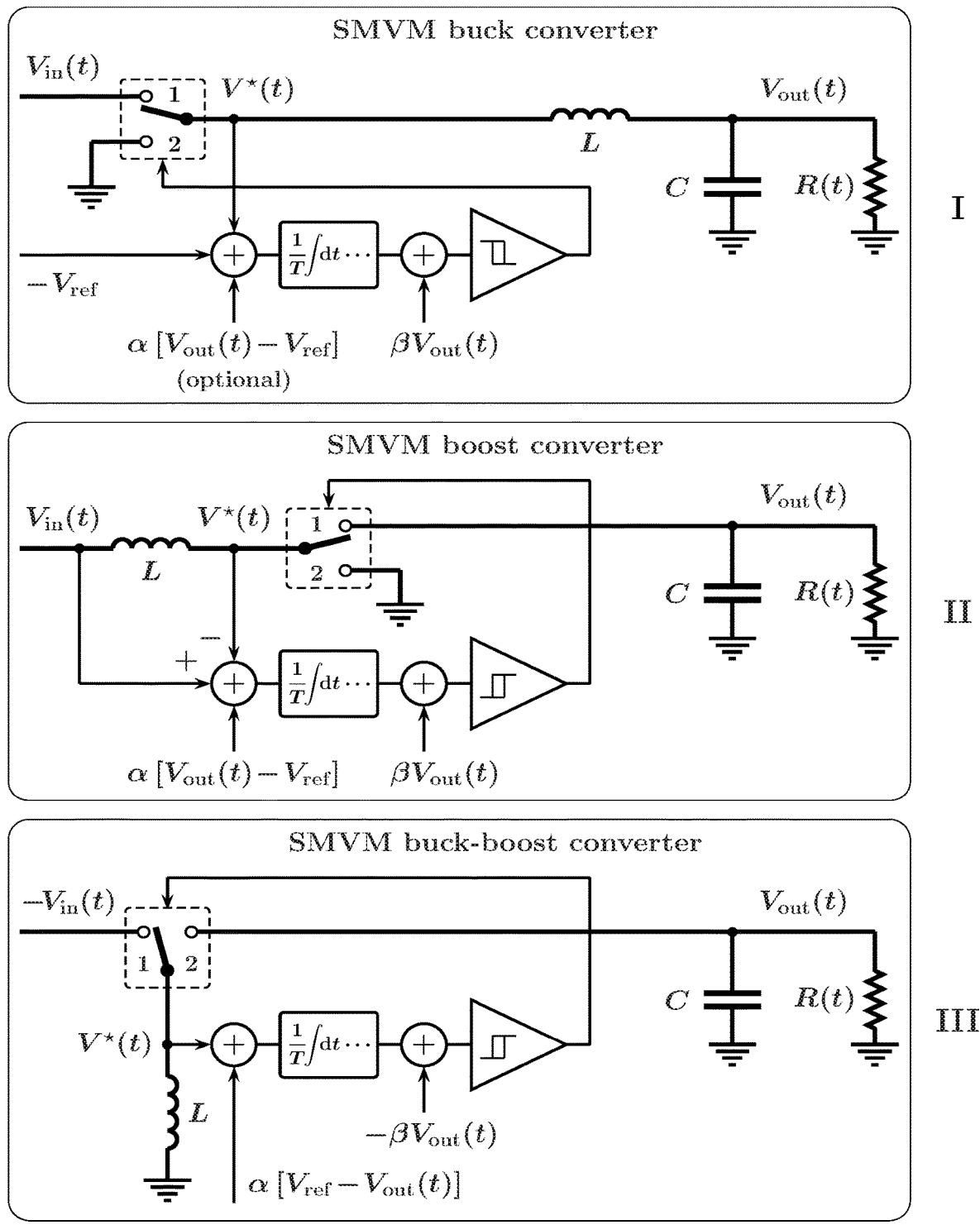
FIG. 39. Summary of three different SMVM-based controller configurations, used in a buck (panel I), a boost (panel II), and a buck-boost (panel III) converter.

Controllers used in all converters shown in FIG. 39 comprise an integrator followed by a Schmitt trigger, so that the input to the Schmitt trigger comprises the output of the integrator.

Further, as one may see in FIG. 39, in all controllers the input to the integrator comprises a voltage proportional to the switching voltage V*(t) (the voltage at the pole of a switch).

It may be noted that digital implementations of SMVM-based controllers may not be appropriate, since accurate digital sampling of the switching voltage V*(t), especially in a wide range of duty cycles, may require unreasonably high sampling rate (for example, two orders of magnitude higher than the switching frequency).

As one may see in FIG. 39, in all controllers the input to the integrator also comprises a voltage proportional to the reference voltage $V_{ref}$.

In all controllers shown in FIG. 39 the input to the Schmitt trigger comprises a feedback of the output voltage $V_{out}(t)$. This voltage added to the input of the Schmitt trigger provides compensation for time variability of the load.

In the controllers for the boost converter (panel II), and for the buck-boost converter (panel III), the input to the integrator comprises a voltage proportional to a difference between the output voltage $V_{out}(t)$ and the reference voltage $V_{ref}$. The input to the integrator in the buck converter (panel I) may also (optionally) comprise such a difference (between the output voltage $V_{out}(t)$ and the reference voltage $V_{ref}$). In the buck converter, this added voltage provides compensation for the inductor DCR.

As one may see in FIG. 39, the input to the integrator in the boost converter (panel II) additionally comprises the input (source) voltage $V_{in}(t)$.

As one may see in FIG. 39, an SMVM controller in a buck converter (panel I) generally ensures that an average of the switching voltage V*(t) would be effectively equal to the reference voltage $V_{ref}$. An SMVM controller in a boost converter (panel II) generally ensures that, in a steady state, an average of the switching voltage V*(t) would be effectively equal to the input (source) voltage $V_{in}(t)$. An SMVM controller in a buck-boost converter (panel III) generally ensures that an average of the switching voltage V*(t) would be effectively equal to zero during stable operation.

Providing an additional voltage proportional to a difference between the output voltage $V_{out}(t)$ and the reference voltage $V_{ref}$ to the integrator input in all converters shown in FIG. 39 further ensures that, in a steady state, an average of the output voltage $V_{out}(t)$ would be effectively equal to the reference voltage $V_{ref}$.

Examining FIG. 39, one may realize that, if the converters shown in the figure are viewed in terms of control theory, then the SMVM controllers, as shown, may be considered as proportional-derivative (PD) controllers.

Indeed, in a steady state and for a constant $V_{ref}$, the average outputs of the regulators would be equal to the reference voltage $V_{ref}$ supplied to the "input" of the controllers (the input of the integrator), and the term $\alpha[V_{out}(t)-V_{ref}]$ would be a proportional control term. Further, supplying the voltage $\beta V_{out}(t)$ to the input of the Schmitt trigger would be equivalent to supplying a derivative control term $\beta T \dot{V}_{out}(t)$ to the controller input.

However, since the controllers shown in FIG. 39 comprise an integrator followed by a Schmitt trigger, so that the input to the Schmitt trigger comprises the output of the integrator, one does not need to perform a derivative action that may require high bandwidth and may be excessively sensitive to measurement noise and non-idealities of the components (for example, the capacitor ESR). Instead, only a proportional term $\beta V_{out}(t)$ would need to be provided to the controller.

Figure 40:
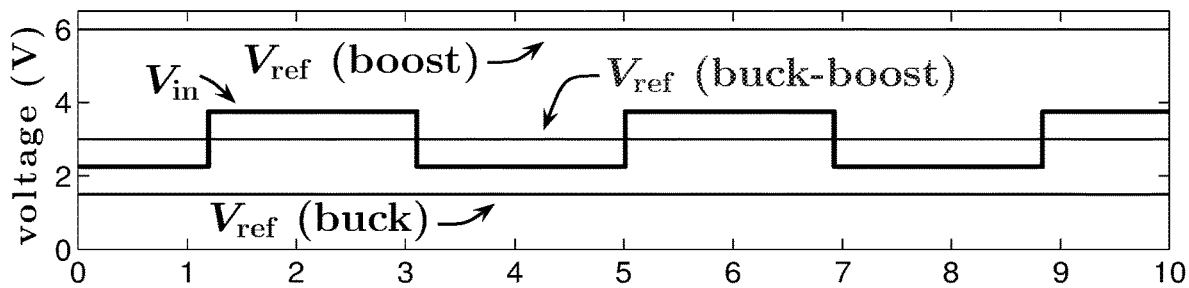
FIG. 40. Illustration of the performance of the converters shown in FIG. 39.
Figure 40:
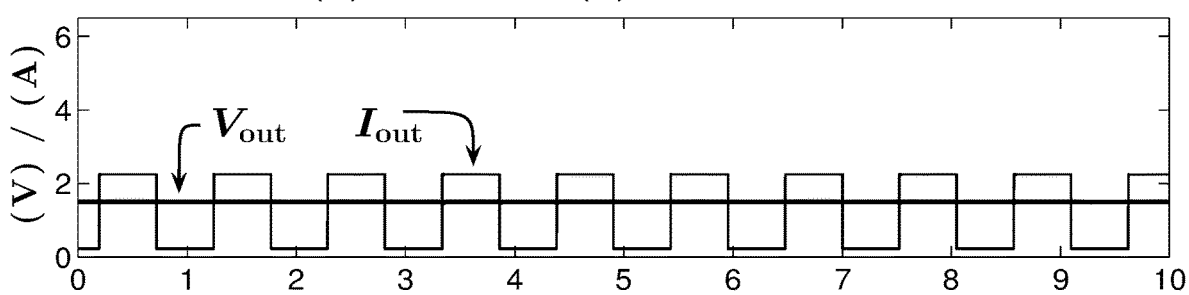
Figure 40:
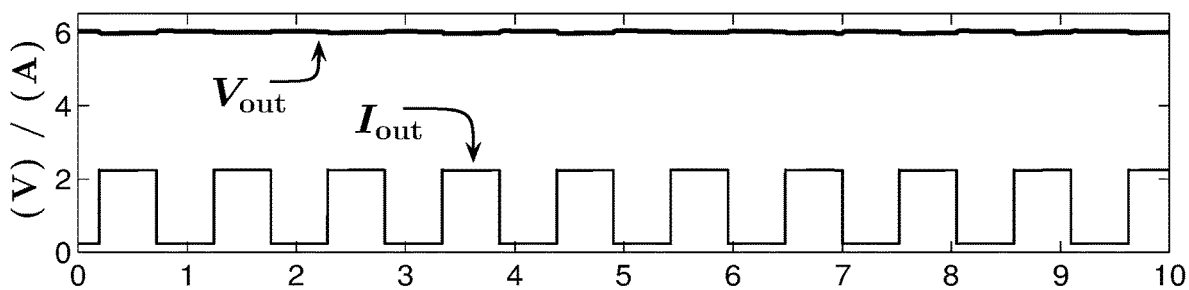
Figure 40:
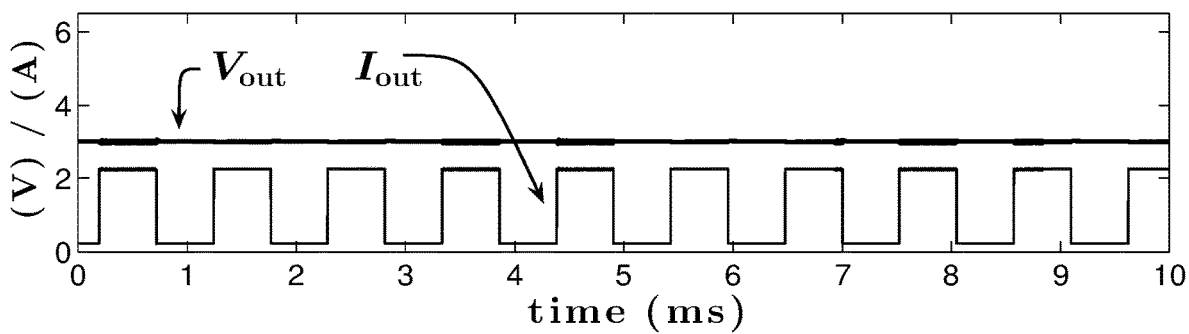

FIG. 40 illustrates the performance of the converters shown in FIG. 39. One may see in FIG. 40 that the output voltage $V_{out}(t)$ of SMVM-based converters is effectively independent from the input voltage $V_{in}(t)$ (which is an inherent feature of SMVM-based converters), and that these converters are highly tolerant to large (from maximum to near zero, and vice versa) and/or rapid changes in the load current.

Figure 41:
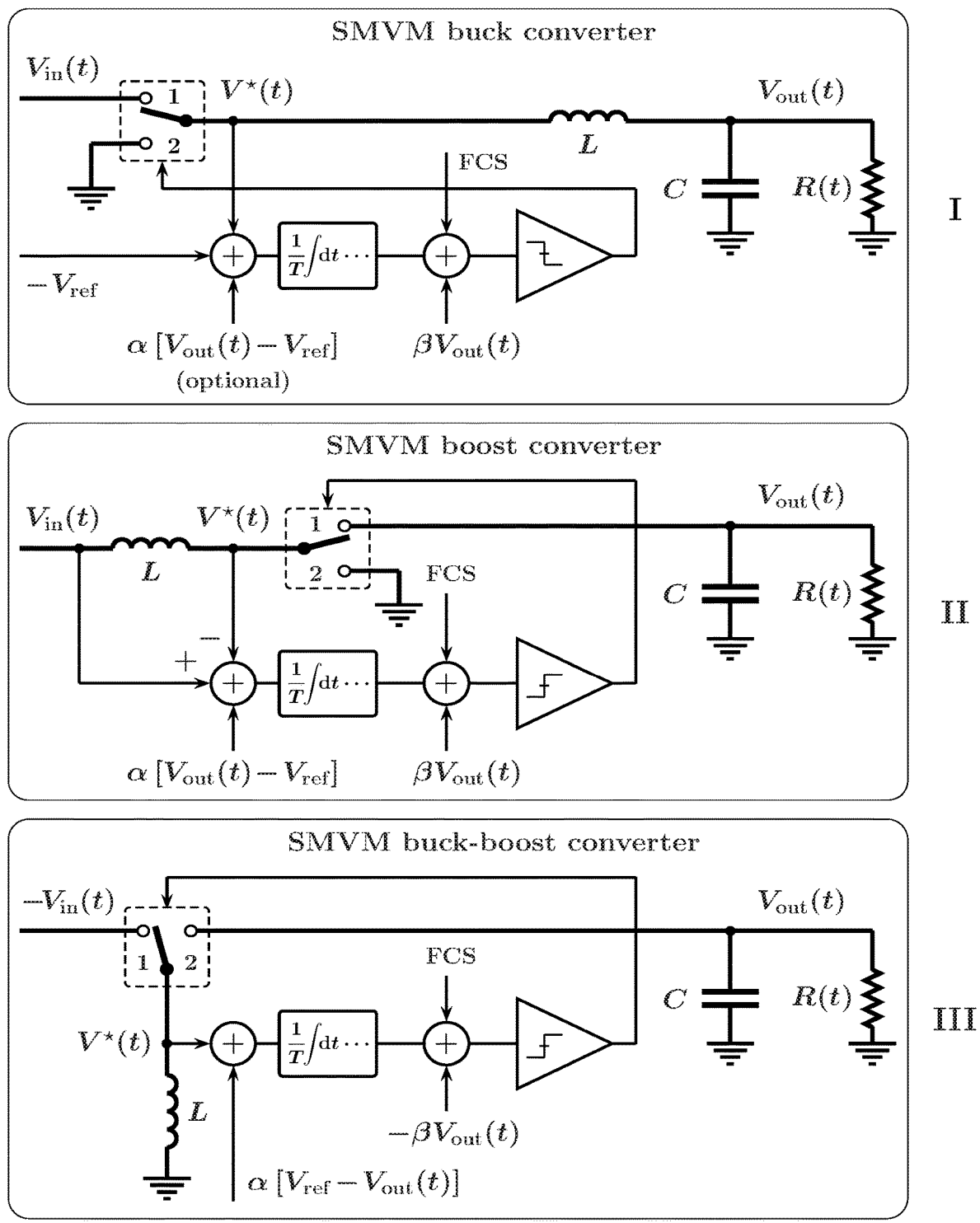
FIG. 41. Summary of three different SMVM-based controller configurations, where the Schmitt trigger is a comparator, and where the input to the comparator additionally comprises an FCS.

Further, as discussed in Sections 1.3, 3.1, and 4.1, the input to the Schmitt trigger in the SMVM controllers used in the converters shown in FIG. 39 may additionally comprise an optional frequency control signal (FCS) that may stabilize or dither switching frequency without significantly affecting the output, as illustrated in FIG. 41. Note that, as shown in the figure, when an FCS is used, a comparator may be used instead of a Schmitt trigger.

Figure 42:
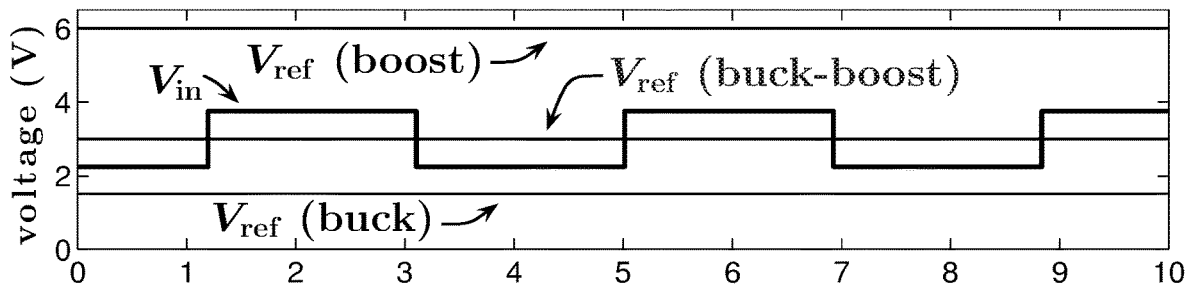
FIG. 42. Illustration of the performance of the converters shown in FIG. 41.
Figure 42:
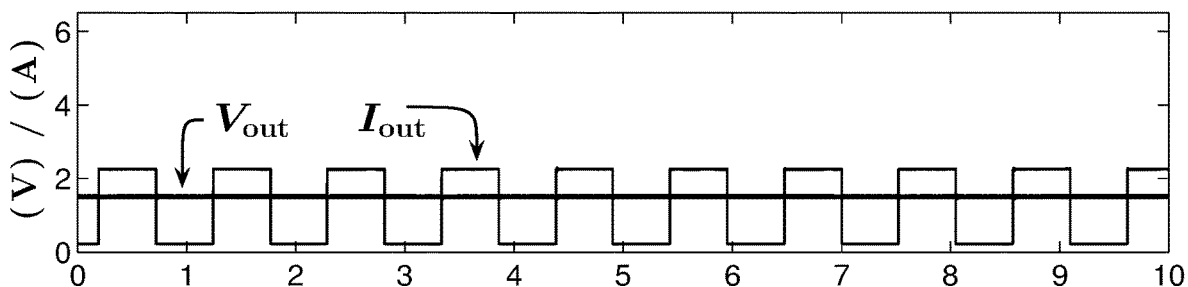
Figure 42:
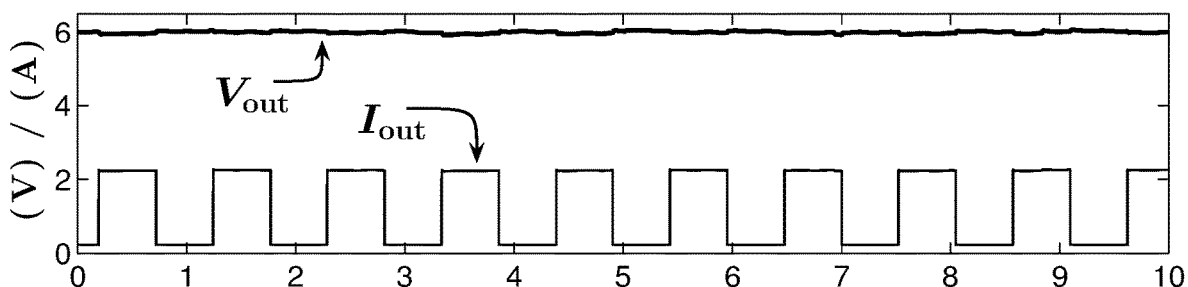
Figure 42:
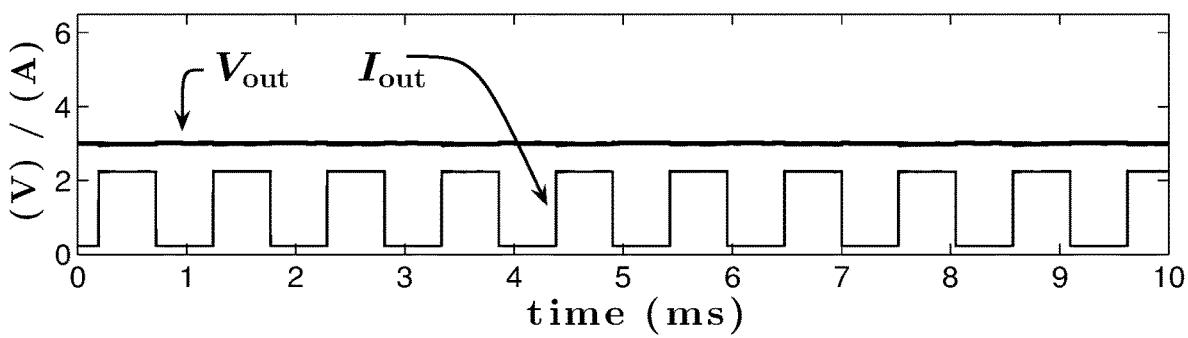

FIG. 42 illustrates the performance of the converters shown in FIG. 41 for the FCS with frequency 500 kHz, and may be compared with the example of FIG. 40.

One skilled in the art will now recognize that the SMVM topology may be similarly adapted for control of other types of isolated and non-isolated switched-mode DC-DC converters, for example, the Ćuk [3] and SEPIC [11] converters, or various bridge converters.

Figure 43:
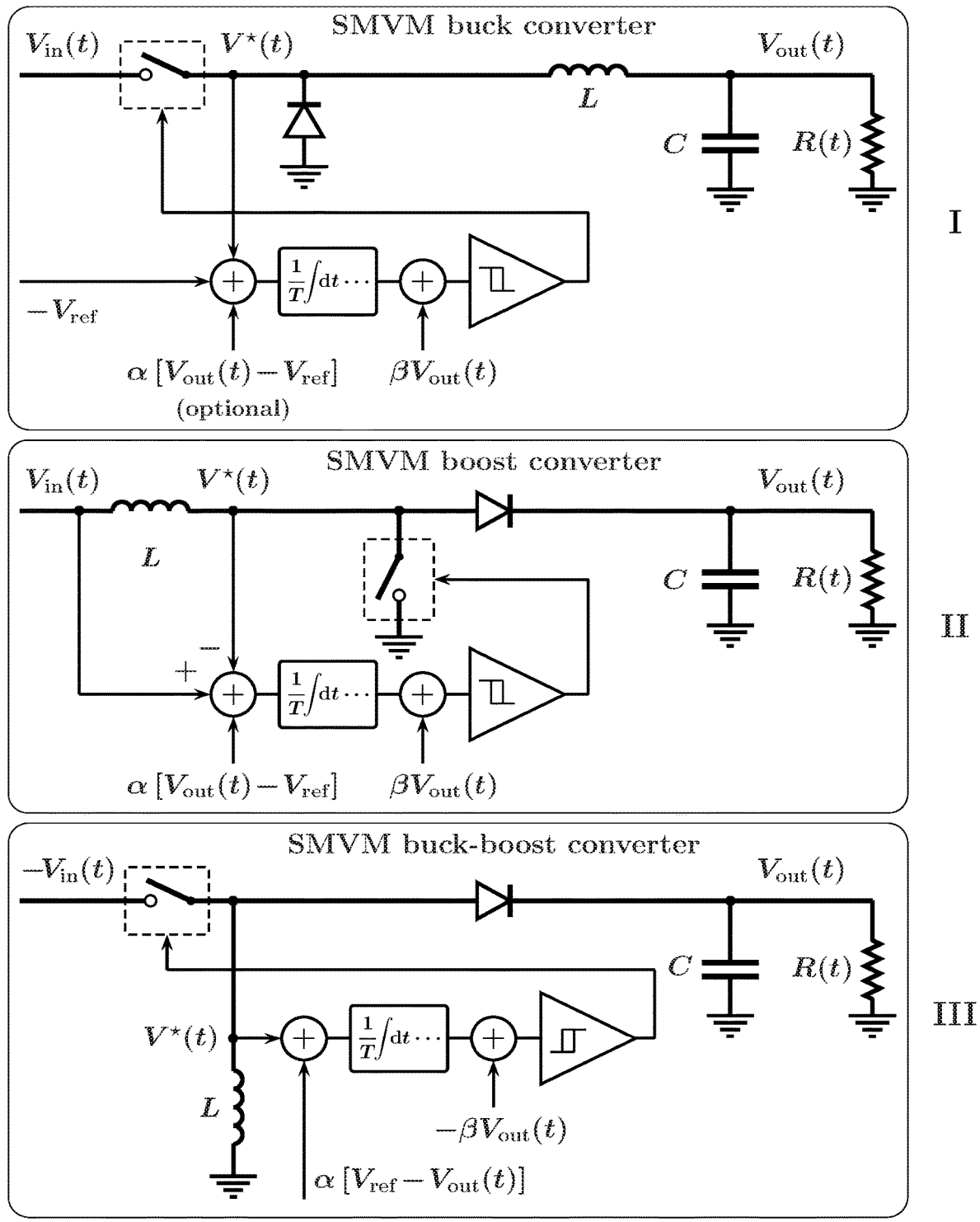
FIG. 43. Asynchronous configurations of the SMVM converters shown in FIG. 39.

It may be further shown that the SMVM controller topologies disclosed herein would remain unchanged for asynchronous configurations, as illustrated in FIG. 43, and, neglecting the change in the ripple voltage, the main relations between the output and the reference voltages would still hold.

One may see that while the power stages of the asynchronous configurations differ from those of the synchronous configurations shown in FIG. 39 (as one of bi-directional throws of the switch (throw 1 in the boost converter, and throw 2 in the buck and buck-boost converters) is replaced by a diode), the topologies and the signaling relations of the SMVM controllers would remain the same. At low/zero load currents (in discontinuous mode) such asynchronous controllers would slow down/stop switching (even if an FCS is added to the input of the Schmitt trigger, as in FIG. 41, for example), entering a Power Save Mode (PSM), while maintaining regulated outputs.

6 Synchronization of Multiple SMVM-Based Converters Among Themselves or with Other Devices The switching noise of an SMPS may cause interference with functions of a system, as well as unwanted interactions between different components of the system, and thus switching frequency synchronization of an SMPS with other components of a system, and/or different power converters in a system, may be desired. A system may be, for example, an electronic system such as a low-power portable system. A component of such a system may be, for example, a liquid-crystal display, a microprocessor, a memory, a sensor, a radio frequency component such as an amplifier, a universal serial bus transceiver, an audio component, a hard drive, or other component.

By appropriately configuring timing relations in a switching voltage of a switching converter, or among the switching voltages of multiple switching converters, one may improve operational properties of a system. Operational properties may include performance specifications, communication channel capacity, power consumption, battery life, reliability, and any combinations of the operational properties, and improving operational properties may comprise increasing the performance specifications, increasing the channel capacity, reducing the power consumption, increasing the battery life, increasing reliability, and achieving any combinations of these improvements.

A "free-running" (without an FCS) SMVM-based converter would, in general, have a variable switching frequency that may depend, for example, on the input and reference voltages, the value of the integrator time constant, the value of the hysteresis gap of the Schmitt trigger, and on the voltage drops across the throws of the switch. An FCS, however, may control the switching frequency without significantly affecting the output, and thus may be used to synchronize multiple SMVM converters among themselves and/or with other devices, and/or may dither or interleave the switching frequencies/phases.

Since supplying an FCS to the input of the comparator rather than the integrator would have an advantage of the FCSs having smaller amplitudes, slew rates, and/or bandwidths, in this section we may assume that an FCS is supplied to the input of the comparator rather than the integrator.

It may be important to note that, while a large variety of periodic FCSs may be used to fix the switching frequency of an SMVM-based converter, an "asymmetric" FCS with a short rise or fall time may be preferred, since it may ensure that the rising or falling edges of the switching voltage would be synchronized with the respective edges of the FCS (or vice versa for an inverting comparator). This may further improve the frequency synchronization and reduce the jitter, and/or provide other benefits as illustrated below.

Figure 44:
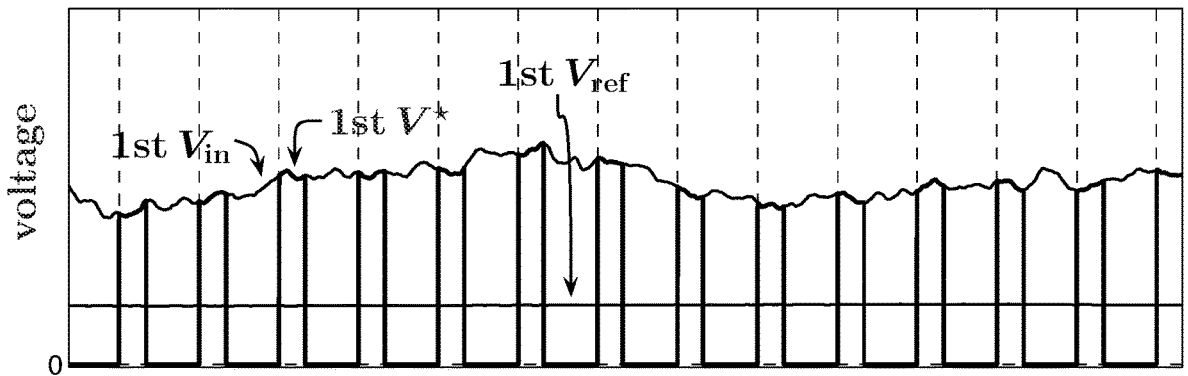
FIG. 44 Example of synchronizing the leading (rising) edges of the switching voltages of two different SMVM buck converters.
Figure 44:
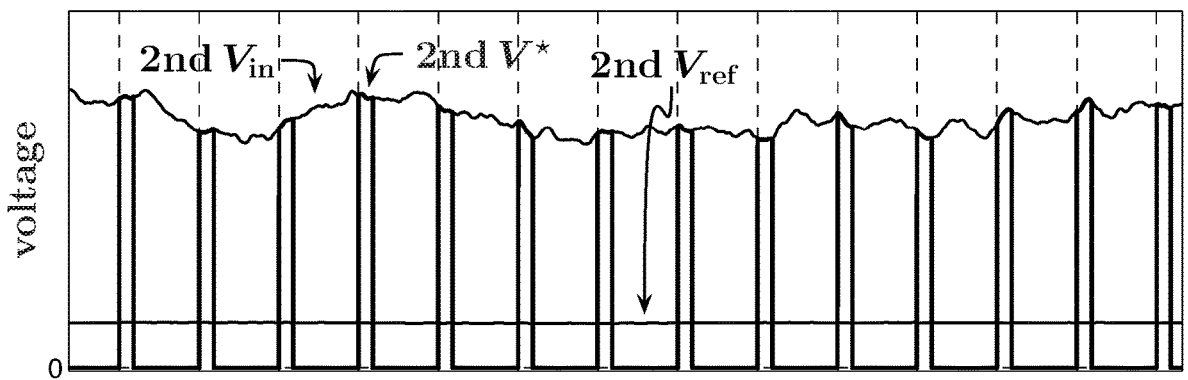
Figure 44:
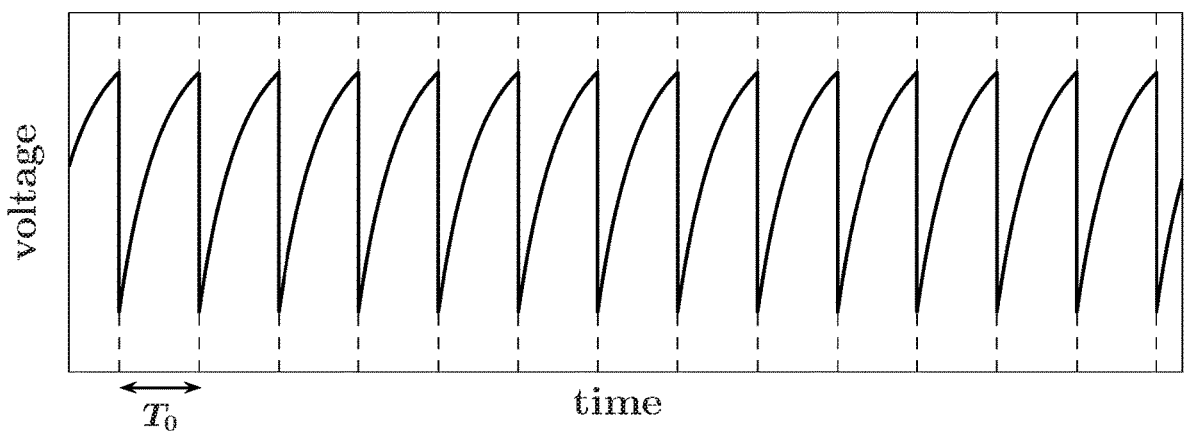

FIG. 44 provides an example of synchronizing the leading (rising) edges of the switching voltages of two different SMVM buck converters. The FCS voltage common to both converters is shown in the lower panel of the figure, and the source ($V_{in}$), reference ($V_{ref}$), and switching ($V^*$) voltages for the first and the second converters are shown in the upper and the middle panels, respectively. One may see in the figure that, while the duty cycle in both converters changes with the change in the source voltage, the switching period remains the same (and equal to the period $T_0$ of the FCS), and the rising edges of the switching voltages in both converters are synchronized with the falling edges of the FCS.

Figure 45:
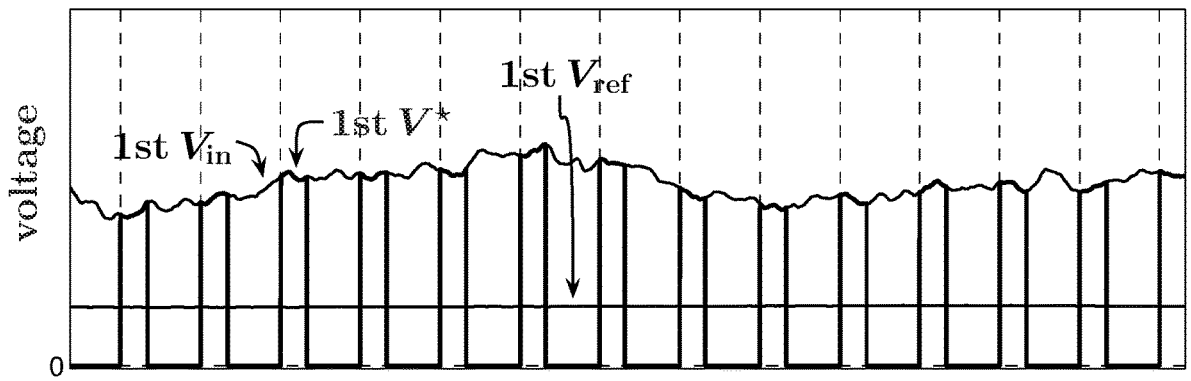
FIG. 45. Example of synchronizing the leading (rising) edges of the switching voltage in an SMVM buck converter with the trailing (falling) edges of the switching voltage in another SMVM buck converter.
Figure 45:
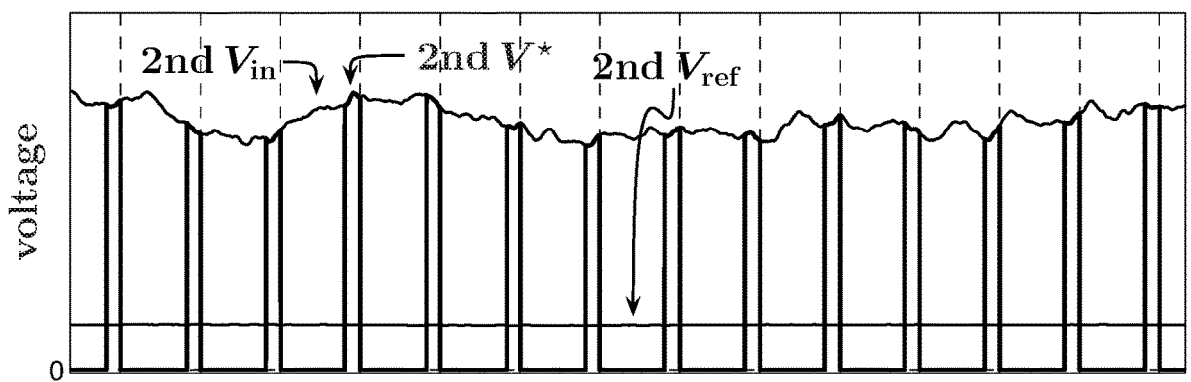
Figure 45:
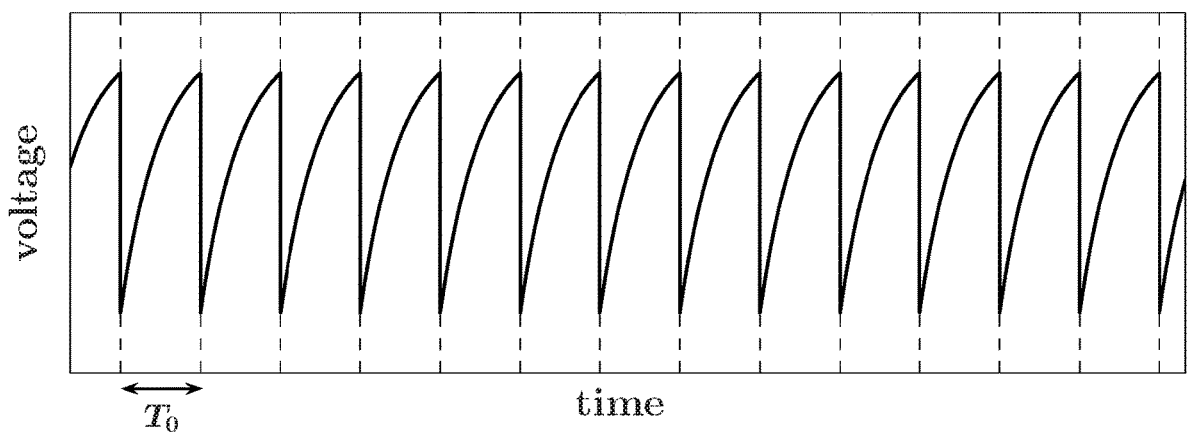

If the FCS voltage supplied to the second converter is inverted (so that the falling edges become the rising edges), then, as illustrated in FIG. 45, the leading (rising) edges of the switching voltage in the 1st converter would be synchronized with the trailing (falling) edges of the switching voltage in the 2nd converter. In this example, if both the first and the second source voltages $V_{in}$ are the same voltage drawn from the same source, then, in addition to synchronizing the converters, the deviation in the source current would be reduced, since the converters would be less likely to draw current at the same time.

Figure 46:
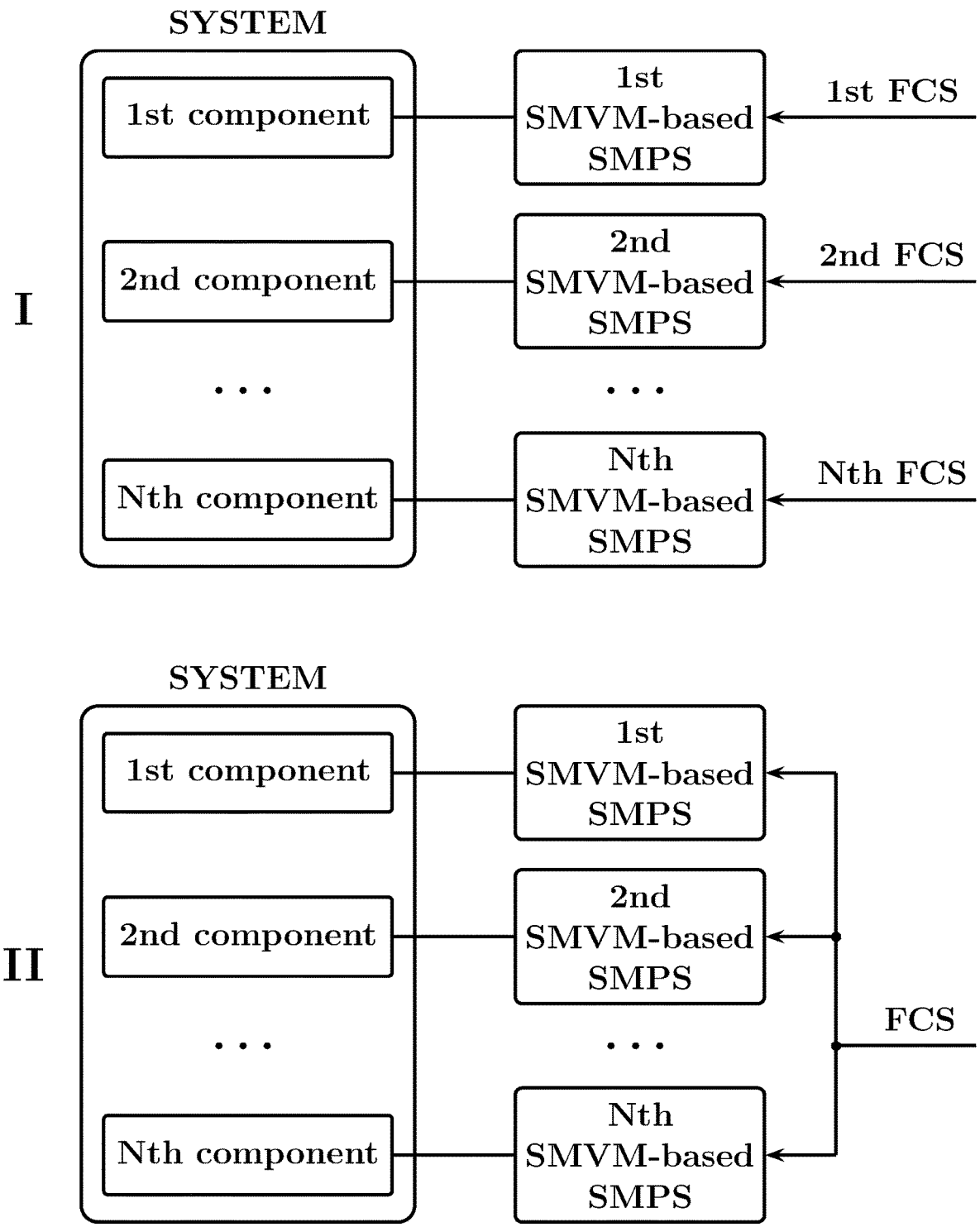
FIG. 46. Synchronization of multiple SMVM converters among themselves and/or with other devices.

When two or more converters are used to power different components in a system, then, as illustrated in FIG. 46, FCSs may be used to synchronize multiple SMVM converters among themselves and/or with other devices, and/or to dither or interleave the switching frequencies/phases.

For example, FCSs may provide synchronization in an interleaved mode, so that the switching voltages have desired timing relations. This is illustrated in panel I of FIG. 46, where, for example, the FCSs may be of the same frequency but differ in shape and/or phase relations. For example, the 2nd FCS may be proportional to an inverted 1st FCS (so that the rising edges become the falling edges), and the Nth FCS may be proportional to a delayed version of the 1st FCS (e.g., delayed by a half of period, i.e., by $T_0/2$).

Panel II of FIG. 46 illustrates synchronization in a synchronous mode. In this example, the rising or falling edges of the 1st converter may be synchronized with the rising or falling edges of the other converters, and which edges (rising or falling) of a particular converter are synchronized would depend on what type of comparator is used in an SMVM (inverting or non-inverting), and which comparator output level (low or high) turns on a particular throw of the switch in a converter.

One skilled in the art will now recognize that a large variety of synchronization modes may be used to achieve desired timing relations among the switching voltages of multiple SMVM-based converters.

7 Digital Implementations of SMVM Controllers

While the SMVM development relies on analog methodology, in many practical deployments low computational cost field-programmable gate array (FPGA) implementations may be a preferred choice, offering on-the-fly control reconfigurability and resistance to on-board electromagnetic interference (EMI). However, to benefit from the analog concept, a sampling rate in a digital SMVM implementation would need to be significantly higher (e.g., by two or more orders of magnitude) than the switching frequency.

Figure 47:
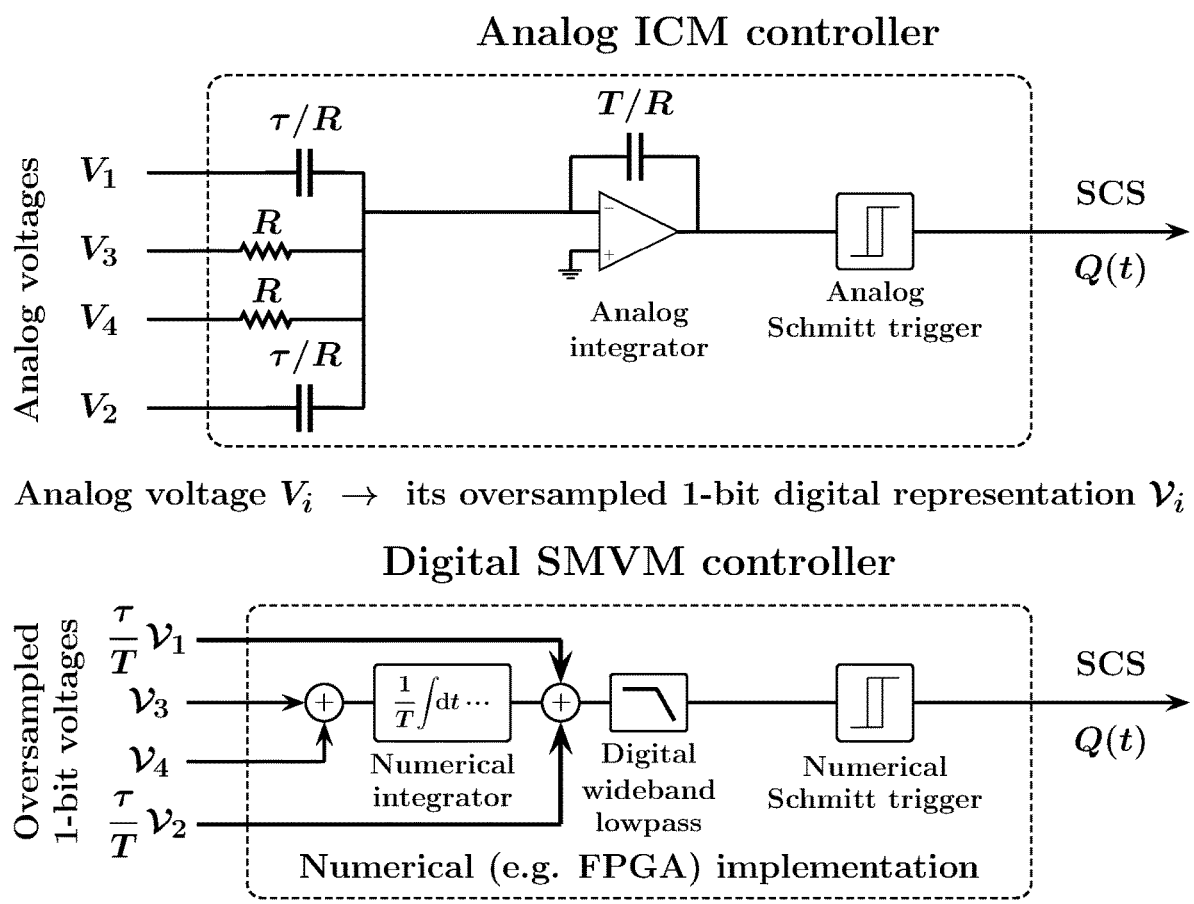
FIG. 47. Analog and digital SMVM implementations.

Since the SMVM algorithm does not use products/ratios of the inputs, and/or their nonlinear functions such as coordinate transformations, instead of using high-resolution analog-to-digital converters (ADCs), the desired "effectively analog" controller bandwidth may be easily achieved by using simple 1-bit $\Delta\Sigma$ modulators [1, 4] (e.g., 1st order $\Delta\Sigma$ modulators), as illustrated in FIG. 47.

In the figure, the wideband lowpass filter preceding the numerical Schmitt trigger may be a finite impulse response (FIR) or an infinite impulse response (IIR) filter with the bandwidth of order of, or sufficiently higher than (e.g., an order of magnitude higher than), the typical switching frequency. An IIR filter (e.g., a 2nd order IIR lowpass Bessel filter) may be used in order to both reduce the group delay and lower the computational and memory requirements. Provided that the sampling rate of the $\Delta\Sigma$ modulators is sufficiently high (e.g., two or three orders of magnitude higher than the typical switching frequency), the performance of such a digital SMVM controller may be effectively equivalent to that of the respective analog controller, as illustrated in FIG. 48.

For example, if the sampling frequency of a $\Delta\Sigma$ modulator is 20 MHz, and the typical switching frequency is 40 kHz, the bandwidth of the wideband lowpass filter preceding the numerical Schmitt trigger may be approximately 200 kHz.

Figure 48:
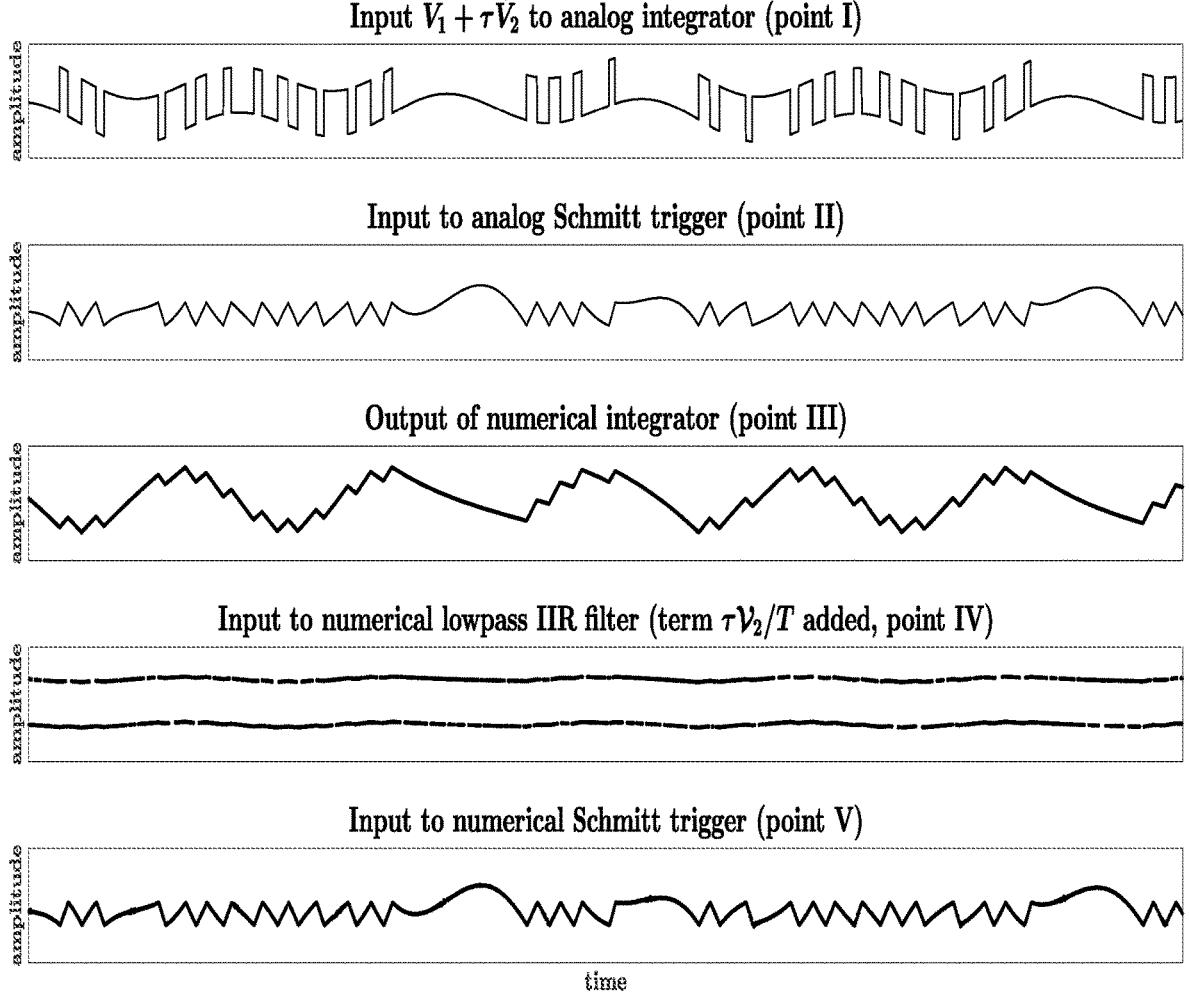
FIG. 48. Illustration of effective equivalence of analog and digital SMVM implementations.
Figure 49:
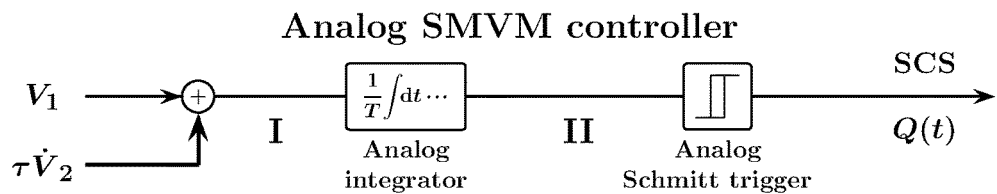
FIG. 49. Illustration of effective equivalence of analog and digital SMVM implementations for oversampled digital representations of analog voltages (without lowpass filtering in the digital implementation).
Figure 49:
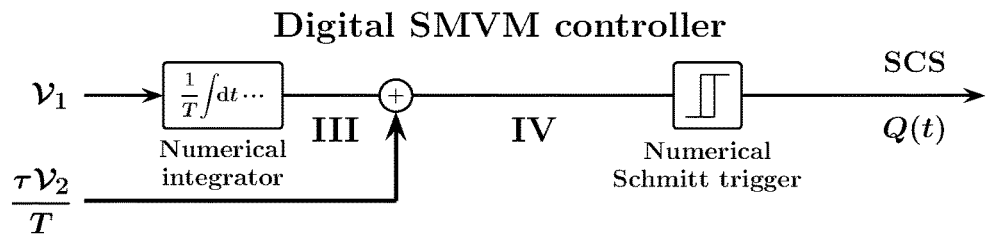
Figure 49:
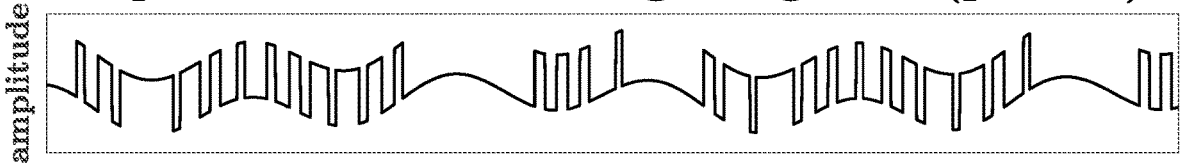
Figure 49:
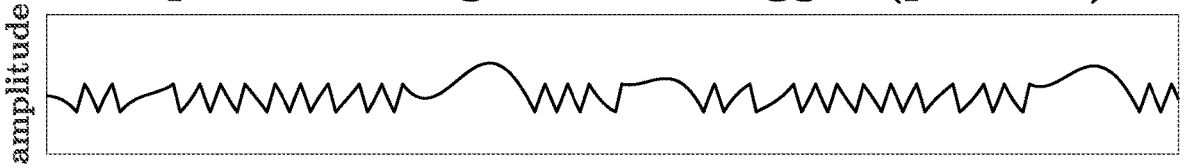
Figure 49:
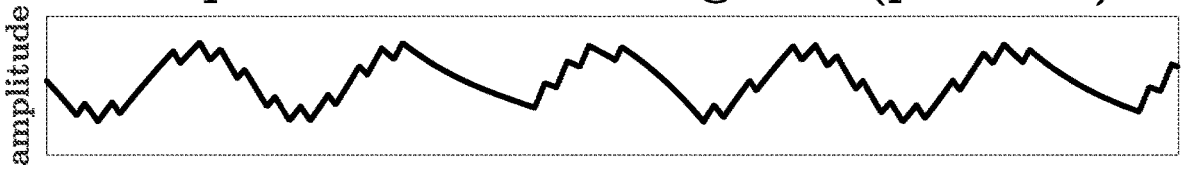
Figure 49:
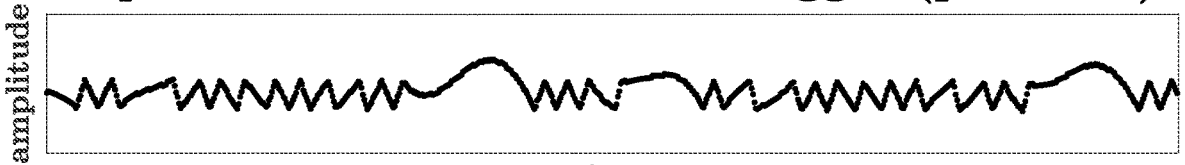

In FIGS. 47, 48 and 49, a numerical integrator may compute a "numerical antiderivative" as follows: "IntOut(i)=IntOut(i−1)+IntIn(i)*dt", where "dt" is the sampling time interval.

Note that, instead of evaluating numerical derivatives of $V_1$ and $V_2$ and adding them to the input of the numerical integrator, it may be simpler, as shown in FIG. 47, to add $\tau(V_1+V_2)$ directly to the integrator output.

A second order analog lowpass filter may be described by the following differential equation:

$$\zeta(t)=z(t)-\tau\dot{\zeta}(t)-(TQ)^2\ddot{\zeta}(t), \quad (49)$$

where $z(t)$ and $\zeta(t)$ are the input and the output signals, respectively, $\tau$ is the time parameter of the filter (inversely proportional to the corner frequency $f_0$, $\tau \approx 1/(2\pi Q f_0)$), Q is the quality factor, and the dot and the double dot denote the first and the second time derivatives, respectively. For the 2nd order Bessel filter $Q=1/\sqrt{3}$.

When the signal sampling rate is sufficiently high (e.g. the sampling interval is much smaller than the time parameter), a finite-difference solution of equation (49) would sufficiently well approximate the analog filter.

An example of such a numerical algorithm for a 2nd order IIR lowpass Bessel filter may be given by the following MATLAB function:
function zeta=Bessel_2nd_order(z,dt,tau) zeta=zeros(size (z));
zeta(1)=z(1);
T1sq=0.5*dt*tau*sqrt(3); T2sq=tau2;
dtsq=dt2;
zeta(2)=(2*T2sq*zeta(1)+zeta(1)*(T1sq−T2sq))/(T2sq+ T1sq); for i=3:length(z);
dZ=z(i−1)−zeta(i−1);
zeta(i)=(dtsq*dZ+2*T2sq*zeta(i−1)+zeta(i−2)*(T1sq− T2sq))/(T2sq+T1sq); end
return In this example, "z" is the input signal, "zeta" is the output, "tau" is the time parameter of the filter, and "dt" is the sampling interval.

In the example of FIG. 48, the digital wideband lowpass filter preceding the numerical Schmitt trigger is a numerical 2nd order IIR lowpass Bessel filter.

An example of an algorithm for an inverting numerical Schmitt trigger may be given by the following MATLAB function:
function y=SchmittTriggerInv(x,h0,dh,y_old) if x<h0, y=1; else if x>h0+dh, y=0; else y=y_old;
end return In this example, "x" is the input signal, "y" is the output, "h0" is the lower threshold of the trigger, and "dh" is the hysteresis gap.

One skilled in the art will recognize from the above description that an SMVM controller may be implemented in a digital signal processing apparatus performing numerical functions that include numerical integration function, lowpass filtering function, and numerical Schmitt trigger function.

One skilled in the art will also recognize that oversampled modulators with the amplitude resolution higher than 1 bit may be used to obtain digital representations of the analog voltages for digital SMVM controllers. For example, the quantizers in such modulators may be realized with N-level comparators, thus the modulators would have $\log_2(N)$-bit outputs. A simple comparator with 2 levels would be a 1-bit quantizer, a 3-level quantizer may be called a "1.5-bit" quantizer, a 4-level quantizer would be a 2-bit quantizer, a 5-level quantizer would be a "2.5-bit" quantizer. A higher quantization level would allow for a wider-bandwidth lowpass filtering.

Further, provided that the sampling rate of the ADCs is sufficiently high, ADCs with even higher amplitude resolution (e.g., 6-bit or higher) may be used to obtain digital representations of the analog voltages for digital SMVM controllers. When the ADC amplitude resolution is sufficiently high (e.g., 6-bit or higher), the lowpass filtering function may become optional, and only numerical integration function and numerical Schmitt trigger function would be needed to implement a digital SMVM controller. This is illustrated in FIG. 49 for 8-bit digital representations of the analog voltages.

8 Additional Comments

It should be understood that the specific examples in this disclosure, while indicating preferred embodiments of the invention, are presented for illustration only. Various changes and modifications within the spirit and scope of the invention should become apparent to those skilled in the art from this detailed description. Furthermore, all the mathematical expressions, diagrams, and the examples of hardware implementations are used only as a descriptive language to convey the inventive ideas clearly, and are not limitative of the claimed invention.

Further, one skilled in the art will recognize that the various equalities and/or mathematical functions used in this disclosure are approximations that are based on some simplifying assumptions and are used to represent quantities with only finite precision. We may use the word "effectively" (as opposed to "precisely") to emphasize that only a finite order of approximation (in amplitude as well as time and/or frequency domains) may be expected in hardware implementation.

Throughout the specification and in the claims the word "proportional" is used in its narrow "mathematical" interpretation: If one variable or quantity is a product of the other variable and a constant (a "proportionality constant"), the two are said to be directly proportional. The word "proportional" was chosen instead of, e.g., "having a constant ratio" to avoid ambiguity of the word "ratio" as applied to zero-valued quantities.

If the product of two variables or quantities is a constant, the two are said to be inversely proportional.

Moreover, all numerical quantities in this description and in the claims are to be understood as modified by the word "about" or "effectively" to emphasize that only a finite order of approximation may be expected in a practical implementation.

A "numerical derivative" of a quantity $x(t)$ sampled at discrete time instances $t_k$ such that $t_{k+1}=t_k+dt$ should be understood as a finite difference expression approximating a "true" derivative of $x(t)$. One skilled in the art will recognize that there exist many such expressions and algorithms for estimating the derivative of a mathematical function or function subroutine using discrete sampled values of the function and perhaps other knowledge about the function. However, due to high sampling rates, for digital implementations of SMVM controllers described in this disclosure simple two-point numerical derivative expressions may be used. For example, a numerical derivative of $x(t_k)$ may be obtained using the following expressions:

$$\dot{x}(t_k)=(xt_{k+1})-x(t_k)/dt,$$

$$\dot{x}(t_k)=(xt_k)-x(t_{k-1})/dt, \text{ or}$$

$$\dot{x}(t_k)=2dt(xt_{k+1})-x(t_{k-1}) \quad (50)$$

Further, the quantities proportional to numerical derivatives may be obtained using the following expressions:

$$\dot{x}(t_k) \propto x(t_{k+1})-x(t_k),$$

$$\dot{x}(t_k) \propto x(t_k)-x(t_{k-1}), \text{ or}$$

$$\dot{x}(t_k) \propto x(t_{k+1})-x(t_{k-1}) \quad (51)$$

REFERENCES

[1] G. I. Bourdopoulos, A. Pnevmatikakis, V. Anastassopoulos, and T. L. Deliyannis. *Delta-Sigma Modulators: Modeling, Design and Applications*. Imperial College Press, London, 2003.

[2] R. Bracewell. *The Fourier Transform and Its Applications*, chapter "Heaviside's Unit Step Function, H(x)", pages 61-65. McGraw-Hill, New York, 3rd edition, 2000.

[3] S. Ćuk and R. D. Middlebrook. A general unified approach to modelling switching-converter power stages. In *Proceedings of the IEEE Power Electronics Specialists Conference*, pages 73-86, Cleveland, Ohio, 8 Jun. 1976.

[4] Y. Geerts, M. Steyaert, and W. M. C. Sansen. *Design of Multi-Bit Delta-Sigma A/D Converters*. The Springer International Series in Engineering and Computer Science. Springer US, 2006.

[5] L. Guo. *Design and implementation of digital controllers for buck and boost converters using linear and nonlinear control methods*. PhD thesis, Auburn University, 2006.

[6] Internet information on: "Electronic Devices & SMPS Books". http://www.smpstech.com/books/booklist.htm.

[7] S. Maniktala. Voltage-mode, current-mode (and hysteretic control). November 2012. Microsemi Technical Note TN-203.

[8] K. Marasco. How to apply DC-to-DC step-down (buck) regulators successfully. Analog Devices, Analog Dialogue 45-06 Back Burner, June 2011.

[9] M. H. Rashid. *Power Electronics Handbook*. Elsevier, 3rd edition, 2011.

[10] F. De Stasi and M. Jacob. Magnetic buck converters for portable applications. National Semiconductor, 2003.

[11] D. Zhang. Designing a SEPIC converter. May 2006, revised April 2013. Formerly National Semiconductor Application Note 1484, now Texas Instruments Application Report SNVA168E.

[12] H. Zumbahlen, editor. *Linear Circuit Design Handbook*, chapter 9—"Power Management". Newnes, 2008.

Regarding the invention being thus described, it will be obvious that the same may be varied in many ways. Such variations are not to be regarded as a departure from the spirit and scope of the invention, and all such modifications as would be obvious to one skilled in the art are intended to be included within the scope of the claims.

I claim:

1. An apparatus for controlling a switching power supply converting a source voltage into a supply output voltage, wherein said supply output voltage is indicative of a reference voltage, wherein said power supply comprises a switch providing a switching voltage controlled by a control signal, said switching power supply further comprising a digital signal processing apparatus performing numerical functions including:
   a) a numerical integrator function operable to receive an integrator input and to produce an integrator output, wherein said integrator output is proportional to a numerical antiderivative of said integrator input;
   b) a digital lowpass filter operable to receive a filter input and to produce a filter output;
   c) a numerical Schmitt trigger characterized by a hysteresis gap and a reference level, and operable to receive a Schmitt trigger input and to produce said control signal; and wherein said integrator input comprises a first integrator input component proportional to a 1-bit digital representation of said switching voltage and a second integrator input component proportional to a 1-bit digital representation of said reference voltage, wherein said filter input comprises a first filter input component proportional to said integrator output, and wherein said Schmitt trigger input comprises said filter output.

2. The apparatus of claim 1 wherein said integrator input further comprises a third integrator input component, and wherein said third integrator input component is selected from the group consisting of:
   a signal proportional to a 1-bit digital representation of said supply output voltage,
   a signal proportional to a 1-bit digital representation of said source voltage,
   a signal proportional to a numerical derivative of a 1-bit digital representation of said supply output voltage,
   and any combinations thereof.

3. The apparatus of claim 1 wherein said filter input further comprises a second filter input component, and wherein said second filter input component is selected from the group consisting of:
   a signal proportional to a 1-bit digital representation of said supply output voltage,
   a signal proportional to a numerical derivative of a 1-bit digital representation of said supply output voltage,
   and any combinations thereof.

4. The apparatus of claim 2 wherein said filter input further comprises a second filter input component, and wherein said second filter input component is selected from the group consisting of:
   a signal proportional to a 1-bit digital representation of said supply output voltage,
   a signal proportional to a numerical derivative of a 1-bit digital representation of said supply output voltage,
   and any combinations thereof.

5. The apparatus of claim 3 wherein said filter input further comprises a third filter input component, wherein said third filter input component is a digital representation of a frequency control signal, and wherein the spectral composition of said switching voltage is indicative of said frequency control signal.

6. The apparatus of claim 5 wherein said frequency control signal is selected from the group comprising: a random signal, a periodic signal, and any combinations thereof.

7. The apparatus of claim 5 wherein said frequency control signal comprises a periodic signal characterized by a fundamental frequency and consisting of a monotonically increasing segment characterized by a rise time and a monotonically decreasing segment characterized by a fall time.

8. The apparatus of claim 7 wherein said rise time is much smaller than said fall time or wherein said fall time is much smaller than said rise time.

9. The apparatus of claim 4 wherein said filter input further comprises a third filter input component, wherein said third filter input component is a digital representation of a frequency control signal, and wherein the spectral composition of said switching voltage is indicative of said frequency control signal.

10. The apparatus of claim 9 wherein said frequency control signal is selected from the group comprising: a random signal, a periodic signal, and any combinations thereof.

11. The apparatus of claim 9 wherein said frequency control signal comprises a periodic signal characterized by a fundamental frequency and consisting of a monotonically increasing segment characterized by a rise time and a monotonically decreasing segment characterized by a fall time.

12. The apparatus of claim 11 wherein said rise time is much smaller than said fall time or wherein said fall time is much smaller than said rise time.

\* \* \* \* \*